US011500265B2

(12) United States Patent
Semmlinger et al.

(10) Patent No.: US 11,500,265 B2
(45) Date of Patent: Nov. 15, 2022

(54) HARMONIC LIGHT-GENERATING METASURFACE

(71) Applicants: William Marsh Rice University, Houston, TX (US); Academia Sinica, Taipei (TW)

(72) Inventors: Michael Semmlinger, Houston, TX (US); Ming-Lun Tseng, Taipei (TW); Jian Yang, Houston, TX (US); Ming Zhang, Houston, TX (US); Din Ping Tsai, Taipei (TW); Liangliang Dong, Houston, TX (US); Arash Ahmadivand, Houston, TX (US); Peter Nordlander, Houston, TX (US); Naomi Jean Halas, Houston, TX (US)

(73) Assignees: WILLIAM MARSH RICE UNIVERISTY, Houston, TX (US); ACADEMIA SINICA, Taipei (TW)

( * ) Notice: Subject to any disclaimer, the term of this patent is extended or adjusted under 35 U.S.C. 154(b) by 0 days.

(21) Appl. No.: 17/281,814

(22) PCT Filed: Oct. 1, 2019

(86) PCT No.: PCT/US2019/054082
§ 371 (c)(1),
(2) Date: Mar. 31, 2021

(87) PCT Pub. No.: WO2020/072502
PCT Pub. Date: Apr. 9, 2020

(65) Prior Publication Data
US 2022/0011646 A1    Jan. 13, 2022

Related U.S. Application Data

(60) Provisional application No. 62/739,730, filed on Oct. 1, 2018.

(51) Int. Cl.
*G02F 1/35* (2006.01)
*G02F 1/37* (2006.01)

(52) U.S. Cl.
CPC ............... *G02F 1/37* (2013.01); *G02F 1/353* (2013.01); *G02F 1/354* (2021.01); *G02F 2202/30* (2013.01)

(58) Field of Classification Search
CPC . G02F 1/353; G02F 1/354; G02F 1/37; G02F 2202/30
See application file for complete search history.

(56) References Cited

U.S. PATENT DOCUMENTS 9,733,545 B2 * 8/2017 Belkin ............... G02F 1/3501
10,054,839 B1 * 8/2018 Brener ............... G02F 1/3526
11,137,663 B2 * 10/2021 Neshev ............... G02F 1/3534

OTHER PUBLICATIONS

Basharin et al., "Dielectric Metamaterials with Toroidal Dipolar Response", Mar. 27, 2015, Phys. Rev. X. 5, pp. 011036-1 to 011036-11. (Year: 2015).*

(Continued)

*Primary Examiner* — Daniel Petkovsek
(74) *Attorney, Agent, or Firm* — Osha Bergman Watanabe & Burton LLP

(57) ABSTRACT

A harmonic light-generating metasurface includes a base substrate and a plurality of structures, that include nonlinear material, that are disposed in a pattern on a surface of the base substrate. Each structure of the plurality of structures individually supports a magnetic dipole mode. An electromagnetic field enhancement of the magnetic dipole mode induces generation of a harmonic signal by the plurality of structures. Alternatively, a harmonic light-generating metasurface, includes a base substrate, a supporting substrate that includes a nonlinear material, and a plurality of paired structures disposed in a pattern on a surface of the supporting substrate. Each paired structure, of the plurality of paired (Continued)

structures, collectively supports a toroidal dipole mode. An electromagnetic field enhancement of the toroidal dipole mode penetrates the supporting substrate to induce generation of a harmonic signal by the supporting substrate.

20 Claims, 54 Drawing Sheets

(56) References Cited

OTHER PUBLICATIONS

Kaelberer et al., "Toroidal Dipolar Response in a Metamaterial", Dec. 10, 2010, Science, vol. 330, pp. 1510-1512. (Year: 2010).*
Dong et al., "Toroidal dipole response in a multifold double-ring metamaterial", published May 25, 2012, Optics Express, vol. 20, No. 12, pp. 13065-13070. (Year: 2012).*
Ahmadivand et al., "Toroidal Dipole-Enhanced Third Harmonic Generation of Deep Ultraviolet Light Using Plasmonic Meta-atoms", Dec. 21, 2018, Nano Lett. 2019, 19, pp. 605-611. (Year: 2018).*
International Search Report issued in International Application No. PCT/US2019/054082 dated Dec. 16, 2019 (3 pages).
Written Opinion issued in International Application No. PCT/US2019/054082 dated Dec. 16, 2019 (7 pages).
Semmlinger, Michael et al. "Vacuum Ultraviolet Light-Generating Metasurface" Nano Letters, vol. 18, No. 9, Aug. 1, 2018 (Aug. 1, 2018) pp. 5738-5743, XP55648959 (6 pages).
Liu, Sheng et al. "An all-dielectric metasurface as a broadband optical frequency mixer" Nature Communications, vol. 9, No. 1. Jun. 28, 2018 pp. 1-6, XP55650518 (6 pages).
Aouani, Heykel et al. "Unveiling the Origin of Third Harmonic Generation in Hybrid ITO-Plasmonic Crystals" Advanced Optical Materials, vol. 3, No. 8, Mar. 30, 2015 (Mar. 30, 2015), pp. 1059-1065, XP055649209 (7 pages).
Xu, Lei et al. "Boosting third-harmonic generation by a mirror-enhanced anapole resonator" Light: Science & Applications, vol. 7, No. 1, Jul. 25, 2018 (Jul. 25, 2018), XP055649148 (8 pages).
Basharin, Alexey A. et al. "Extremely high Q-factor metamaterials due to anapole excitation" Physical Review B, vol. 95, No. 035104, Jan. 1, 2017 (Jan. 1, 2017), pp. 35104-1, XP55649399 (10 pages).
Krasnok, Alexander et al. "Nonlinear metasurfaces: a paradigm shift in nonlinear optics" Materials Today, vol. 21, No. 1, Jan. 1, 2018 (Jan. 1, 2018), pp. 8-21, XP55650244 (14 pages).
Wang, Lei et al. "Shaping the third-harmonic radiation from silicon nanodimers" Nanoscale, vol. 9, No. 6, Jan. 1, 2017 (Jan. 1, 2017), pp. 2201-2206, XP55649143 (6 pages).

Melentiev, Pavel N. et al. "Split Hole Resonator: A Nanoscale UV Light Source" American Chemical Society, Nano Lett. 2016, 16, 1138?1142 (5 pages).
Konishi, Kuniaki et al. "Polarization-Controlled Circular Second-Harmonic Generation from Metal Hole Arrays with Threefold Rotational Symmetry" Physical Review Letters, American Physical Society, 112, 135502, 2014 (5 pages).
Makarov, S. V. et al. "Self-adjusted all-dielectric metasurfaces for deep ultraviolet femtosecond pulse generation" Nanoscale, 2016, 8, 17809 (6 pages).
Melentiev, P.N. et al. "Third harmonic generation in the short-wavelength UV range by a single plasmonic nanostructure" 2016 Quantum Electron. 46 414 (6 pages).
Ratzsch, Stephan et al. "Influence of the oxygen plasma parameters on the atomic layer deposition of titanium dioxide" Nanotechnology 26 (2015) 024003 (13 pages).
Li, Guixin et al. "Continuous control of the nonlinearity phase for harmonic generations" Nature Materials, vol. 14, No. 6, (15 pages).
Husna, Jamilah et al. "Influence of Annealing Temperature on the Properties of ZnO Thin Films Grown by Sputtering" Energy Procedia 25 ( 2012 ) 55-61 (7 pages).
Tian, Guang-Lei et al. "Effect of Microstructure of TiO2 Thin Films on Optical Band Gap Energy" 2005 Chinese Phys. Lett. 22 1787 (4 pages).
Das, Susanta Kumar et al. "Highly efficient THG in TiO2 nanolayers for third-order pulse characterization" Aug. 29, 2011 / vol. 19, No. 18/ Optics Express 16985 (11 pages).
Grinblat, Gustavo et al. "Enhanced Third Harmonic Generation in Single Germanium Nanodisks Excited at the Anapole Mode" American Chemical Society, Nano Lett. 2016, 16, 4635?4640 (6 pages).
Chen, Wei Ting et al. "A broadband achromatic metalens for focusing and imaging in the visible" Nature Nanotechnology 13 (3) (Jan. 1): 220-226 (31 pages).
Schlickriede, Christian et al. "Imaging through nonlinear metalens using second harmonic generation" Advanced Materials, vol. 30, Issue8 Feb. 22, 2018 1703843 (12 pages).
Wang, Shuming et al. "A broadband achromatic metalens in the visible" Nature Nanotechnology vol. 13, Mar. 2018, 227-232 (6 pages).
Zhao, Xu et al. "Solid-phase photocatalytic degradation of polyethylene plastic under UV and solar light irradiation" Journal of Molecular Catalysis A: Chemical 268 (2007) 101-106 (6 pages).
Shibanuma, Toshihiko et al. "Efficient Third Harmonic Generation from Metal?Dielectric Hybrid Nanoantennas" American Chemical Society, Nano Letters • Mar. 2017 (6 pages).
Sivis, Murat et al. "Generation and Bistability of aWaveguide Nanoplasma Observed by Enhanced Extreme-Ultraviolet Fluorescence" Physical Review Letters, 111, 085001 2013 (6 pages).
O'Brien, Kevin et al. "Predicting nonlinear properties of metamaterials from the linear response" Nature Materials, vol. 14, Apr. 2015, 379-383 (5 pages).

* cited by examiner

Without Longpass Filter

With Longpass Filter

FIG. 4R
FIG. 4S
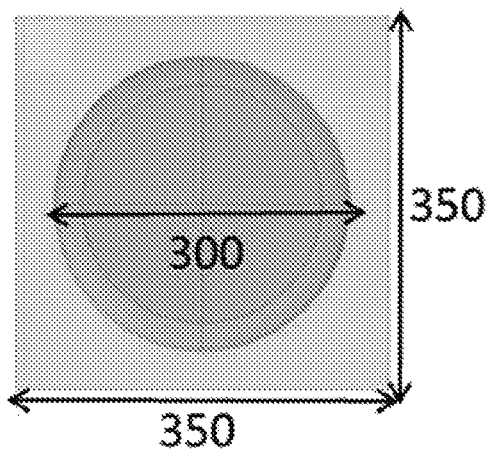
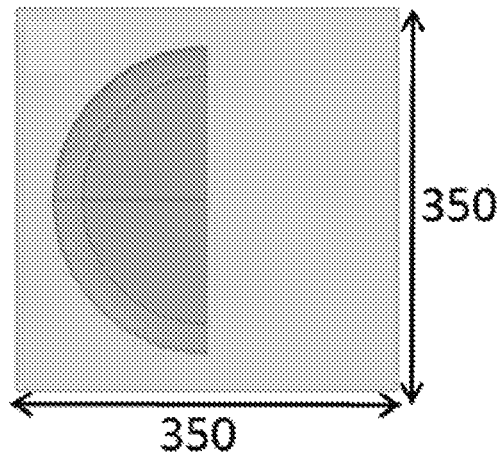
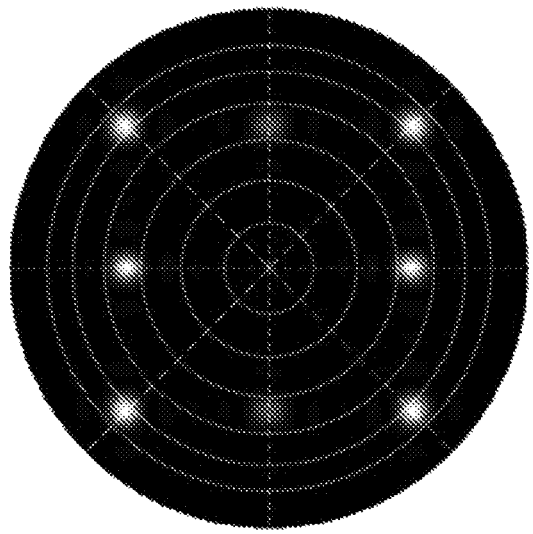
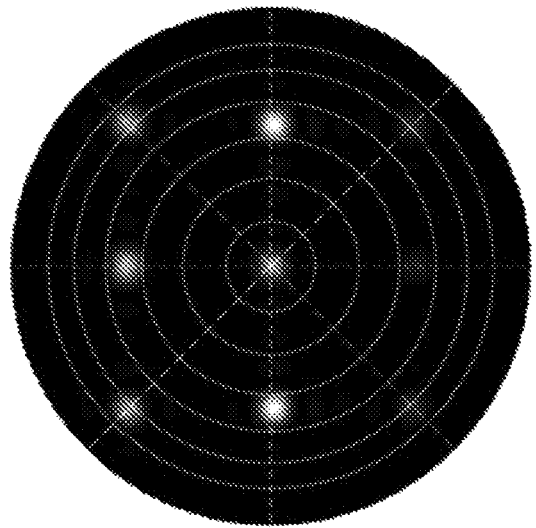

Electric field enhancement

Top view  Side view

Magnetic field enhancement

Top view  Side view

Without corrections    With corrections

Temperature distribution

Peak power density = 10 GW/cm²

HARMONIC LIGHT-GENERATING METASURFACE

CROSS-REFERENCE TO RELATED APPLICATIONS

This is a national stage application of International Patent Application No. PCT/US2019/054082, filed on Oct. 1, 2019, which claims priority from U.S. Provisional Application No. 62/739,730, filed on Oct. 1, 2018. The contents of these applications are incorporated herein in their entirety.

STATEMENT REGARDING FEDERALLY SPONSORED RESEARCH OR DEVELOPMENT

The invention was made with government support under: Grant Number ECCS-1610229 awarded by the National Science Foundation (NSF); and Grant Number FA9550-15-1-0022 awarded by the Air Force Office of Scientific Research (AFOSR); and Grant Number HDTRA1-16-1-0042 awarded by the Defense Threat Reduction Agency (DTRA). The government has certain rights in the invention.

BACKGROUND

Light generation in the vacuum ultraviolet (VUV) through the visible regime has important applications in many fields, ranging from device fabrication to photochemistry, from environmental remediation to microscopy and spectroscopy. Methods to produce light frequently utilize high harmonic generation in media such as rare gases, solids, or atomic vapors. Other methods include excimer lasers, free electron lasers, supercontinuum generation in photonic crystal fibers, and conventional nonlinear crystals. However, these methods require large and expensive optical systems, special experimental facilities (e.g., vacuum chambers), or special optical configurations (e.g., prism-coupling) and are often limited by the limited transparency of optical components. Furthermore, nonlinear optical crystals that support harmonic light generation (e.g., second harmonic generation and third harmonic generation) in certain wavelength regimes (e.g., VUV and UV wavelengths) are quite rare. The field of optics will benefit significantly from manufacturable materials, substrates, optical systems, and methods that enable straightforward harmonic light generation. The invention was also made with private support under: Grant Numbers C-1220 and C-1222 awarded by the Robert A. Welch Foundation.

SUMMARY

One or more embodiments of the invention are directed to a harmonic light-generating metasurface comprising: a base substrate; and a plurality of structures, comprising a nonlinear material, that are disposed in a pattern on a surface of the base substrate. Each structure of the plurality of structures individually supports a magnetic dipole mode. An electromagnetic field enhancement of the magnetic dipole mode induces generation of a harmonic signal by the plurality of structures.

One or more embodiments of the invention are directed to a method of manufacturing a harmonic light-generating metasurface, the method comprising: disposing a film of nonlinear material on a side of a substrate; patterning the film to create a plurality of structures on a surface of the base substrate. Each structure of the plurality of structures individually supports a magnetic dipole mode. An electromagnetic field enhancement of the magnetic dipole mode induces generation of a harmonic signal by the plurality of structures.

One or more embodiments of the invention are directed to a harmonic light-generating metasurface comprising: a base substrate; a supporting substrate comprising a nonlinear material; and a plurality of paired structures disposed in a pattern on a surface of the supporting substrate. Each paired structure, of the plurality of paired structures, collectively supports a toroidal dipole mode. An electromagnetic field enhancement of the toroidal dipole mode penetrates the supporting substrate to induce generation of a harmonic signal by the supporting substrate.

One or more embodiments of the invention are directed to a method of manufacturing a harmonic light-generating metasurface, the method comprising: disposing a supporting substrate comprising a nonlinear material on a base substrate; and patterning a plurality of paired structures on a surface of the supporting substrate. Each paired structure, of the plurality of paired structures, collectively supports a toroidal dipole mode. An electromagnetic field enhancement of the toroidal dipole mode penetrates the supporting substrate to induce generation of a third harmonic signal by the supporting substrate.

Other aspects and advantages of one or more embodiments disclosed herein will be apparent from the following description and the appended claims.

BRIEF DESCRIPTION OF DRAWINGS

FIGS. 4Q-4S are schematics of example structures and graphs of the associated radiation pattern according to one or more embodiments.

FIG. 9AA is a graph of linear transmission versus wavelength according to one or more embodiments.

FIGS. 9BB and 9CC are graphs of dipole strength versus wavelength according to one or more embodiments.

DETAILED DESCRIPTION

Figure 1:
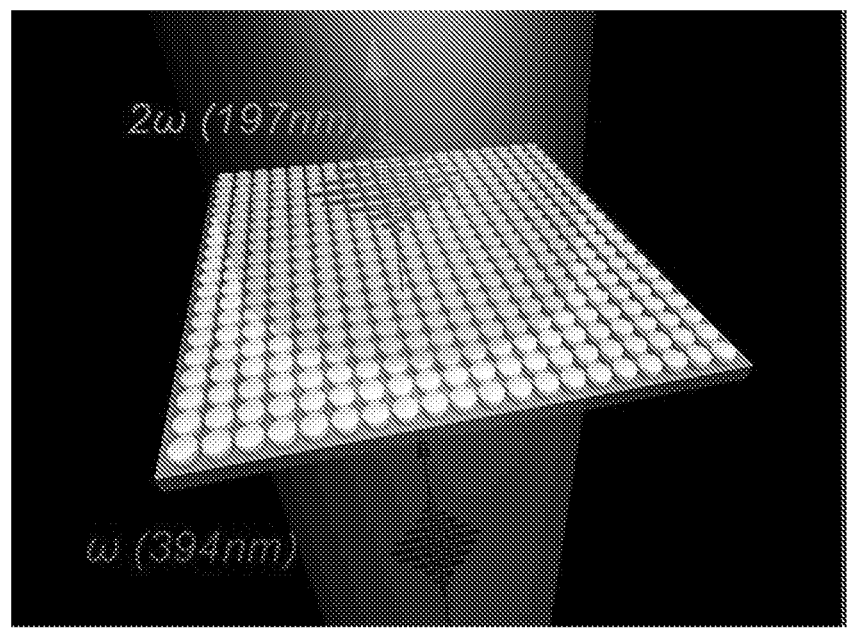
FIG. 1 is a schematic according to one or more embodiments.

Specific embodiments of the invention will now be described in detail with reference to the accompanying figures Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect of the characteristic was intended to provide.

In general, embodiments described herein relate to a harmonic light-generating metasurface and a method of manufacturing a harmonic light-generating metasurface. Vacuum ultraviolet (VUV) light may be electromagnetic radiation with a wavelength between 100 nm and 200 nm, but one or more embodiments described herein are not limited to generating VUV or UV light and may generate other wavelengths of light.

A harmonic light-generating metasurface, or metasurface, can be an optically active interface between two dielectric media comprising an array or pattern of structures (i.e., meta-atoms). Optical activity can comprise generating, focusing, redirecting, bending, absorbing, or modulating the phase or polarization of light, but is not limited to these effects. The plurality of structures may be low loss optical resonators that are smaller than the incident wavelength of the light (i.e., subwavelength), but are not limited to this size range. The plurality of structures may be dielectric or metallic in composition, but are not limited to these classes of materials. In one or more embodiments, the plurality of structures are all-dielectric with low inherent absorption, a high damage threshold, and resonant modes that strongly confine the electromagnetic fields and create electromagnetic field enhancements inside the plurality of structures.

ZnO Harmonic Light-Generating Metasurface for Vacuum Ultraviolet Light Generation In one or more embodiments, a harmonic light-generating metasurface includes a base substrate and a plurality of structures, comprising a nonlinear material, that are disposed in a pattern on a surface of the base substrate. Each structure of the plurality of structures individually supports a magnetic dipole mode or resonance. An electromagnetic field enhancement of the magnetic dipole mode induces generation of a harmonic signal by the plurality of structures. A harmonic signal may be a second harmonic signal, a third harmonic signal, or other higher order nonlinear signal, but is not limited to these signals.

FIG. 1 is a schematic according to one or more embodiments described herein in which incident light of frequency $\omega$, corresponding to a fundamental wavelength $\lambda$, illuminates the harmonic light-generating metasurface along an optical path by first passing through the base substrate. In one or more embodiments, the incident light may illuminate the harmonic light-generating metasurface before passing through the base substrate. In one or more embodiments, the base substrate may be silica, fused silica, or glass substrate, but is not limited to these materials. The substrate may be transparent to light of frequency $\omega$ to maximize transmission through the substrate.

In one or more embodiments, the incident light interacts with the plurality of structures of the harmonic light-generating metasurface by exciting magnetic dipole mode in the plurality of structures. The electromagnetic field enhancements of the resonant magnetic dipole mode efficiently accesses the bulk nonlinearity of the structure because of strong electromagnetic field confinement. A combination of bulk and surface nonlinearity of the nonlinear material in the plurality of structures generates a harmonic signal. In one or more embodiments, a second harmonic signal of frequency $2\omega$ and wavelength $\lambda/2$ is emitted from the harmonic light-generating metasurface. In one or more embodiments, a third harmonic signal of frequency $3\omega$ and wavelength $\lambda/3$ is emitted from the harmonic light-generating metasurface.

Figure 2A:
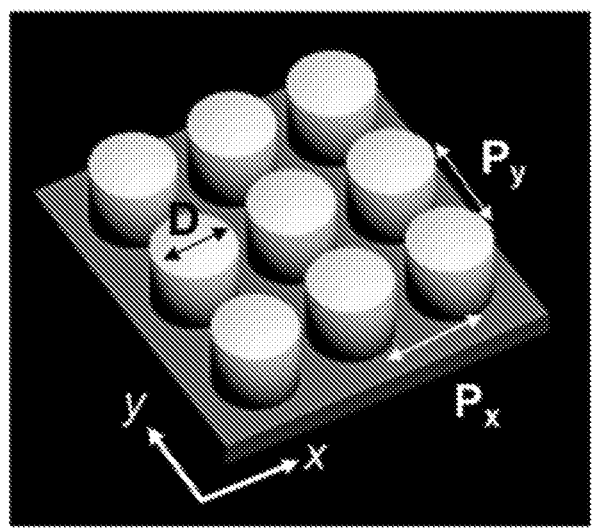
FIG. 2A is a schematic according to one or more embodiments.

FIG. 2A is a schematic according to one or more embodiments described herein in which the harmonic light-generating metasurface comprises a square array of cylindrical discs of diameter D and height h (not shown). In one or more embodiments, the patterned structure of a unit cell may be a square, a triangular, a dimer, a trimer, an n-mers, or the like. The square array is rectilinear (i.e., comprised of linear coordinate axes) designed with a pitch $P_x$ along an x-axis and a pitch $P_y$ along a y-axis, wherein the x-axis and y-axis are perpendicular. In one or more embodiments, the pattern of the plurality of structures may be: rectilinear with orthogonal coordinate axes; rectilinear with non-orthogonal coordinate axes (e.g., hexagonal coordinate axes); polar (i.e., based on polar coordinate axes); an irregular pattern; or a three dimensional pattern, but is not particularly limited to these patterns. In one or more embodiments, the plurality of structures are uncovered on the surface and exposed to an environment above the surface. In one or more embodiments, absorption of the generated harmonic signal by the environment above the surface may be minimized by removing absorptive material from the environment above the surface.

Figure 2B:
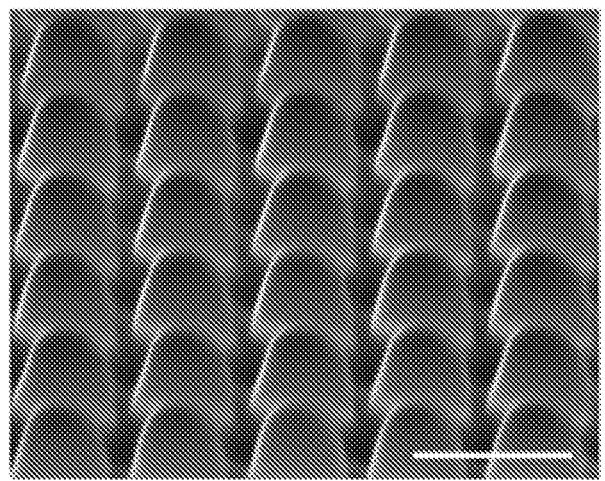
FIG. 2B is a tilted scanning electron micrograph of an example in accordance with one or more embodiments. Scale bar is 300 nm.

FIG. 2B is a tilted scanning electron micrograph of an example in accordance with one or more embodiments described herein in which the nonlinear material is a patterned, two-dimensional periodic array of ZnO (002)-orientation nanoresonators. The scale bar is 300 nm. In one or more embodiments, the nonlinear material may be a wide-bandgap semiconductor or a metal oxide with a non-zero second order nonlinear susceptibility, $\chi^{(2)}$ or a non-zero third order nonlinear susceptibility, $\chi^{(3)}$, but is not particularly limited to these classes of materials. For example, the nonlinear material may be ZnO, ZnO with (002)-orientation, an III-IV semiconductor, an II-VI semiconductor, a nitride, an aluminum nitride, a gallium nitride, a boron nitride, a stacked quantum well structure, diamond, or $TiO_2$, but is not particularly limited to these materials. In one or more embodiments, bandgap of the nonlinear material may be greater than 2.2 eV and less than 6.4 eV, but the bandgap is not particularly limited to this range. In one or more embodiments, the bandgap of the nonlinear material may be between 3 eV and 5.5 eV, or between 3 and 4 eV. In one or more embodiments, the bandgap of the nonlinear material may be less than 2.2 eV or greater than 6.4 eV. The bandgap of the nonlinear material may be direct or indirect, but is not limited to these categories. In one or more embodiments, the plurality of structures are uncovered on the surface of a base substrate and are exposed to an environment above the surface.

Figure 2C:
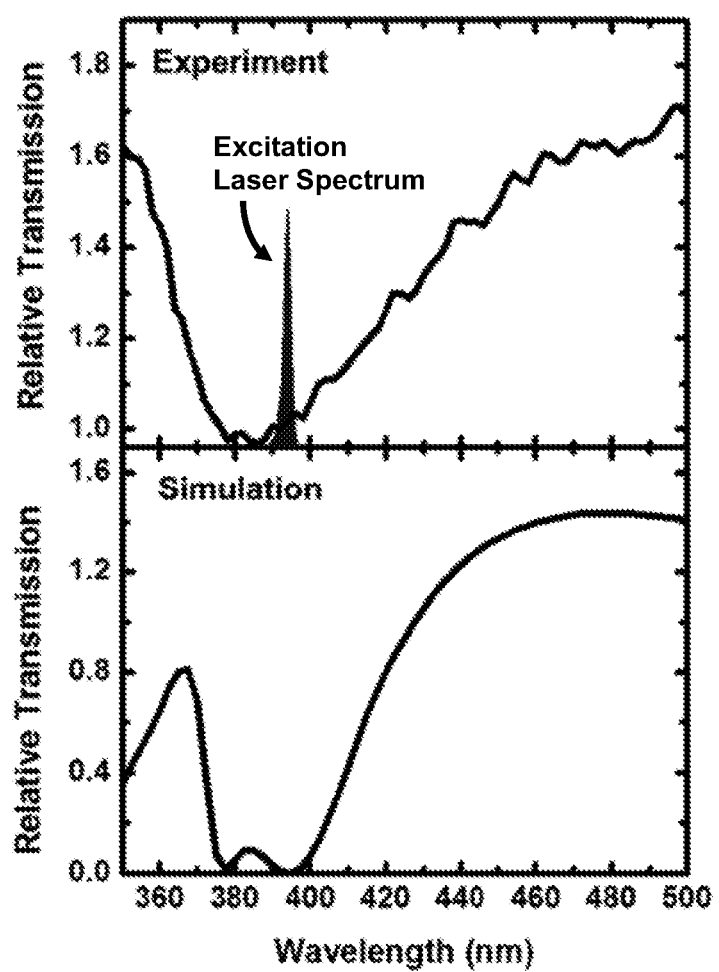
FIG. 2C is a graph comparing of experimental and simulated relative transmission spectrum according to one or more embodiments.

FIG. 2C is a graph comparing of experimental and simulated relative transmission spectrum according to one or more embodiments described herein. In one or more embodiments, the incident light is supplied by a pump or excitation laser, as exemplified by the 394 nm excitation laser spectrum in FIG. 2C. The incident light may be supplied by a Ti:Sapphire laser, dye-laser, gas laser, solid state laser, excimer laser, supercontinuum laser, or another suitable coherent light source or optical system to induce generation of the harmonic signal, but is not limited to these sources. The incident light may be supplied by an incoherent light source such as an incandescent bulb, light emitting diode, arc-lamp, or other suitable incoherent light source or optical system to less efficiently induce generation of the harmonic signal. In one or more embodiments, the wavelength of the incident light may coincide with the central wavelength of the magnetic dipole mode, but is not limited to any particular wavelength range.

In one or more embodiments, the wavelength of the incident light is not limited to any particular wavelength range. In one or more embodiments, the wavelength of the incident light may be greater than 100 nm and less than 560 nm, but is not particularly limited to this wavelength range. In one or more embodiments, the wavelength of the incident light may be between 150 nm and 500 nm, or between 200 nm and 450 nm. In one or more embodiments, the wavelength of the incident light may be less than 100 nm or greater than 560 nm.

In a non-limiting example, the incident light may be supplied by a mode locked, ultrafast Ti:Sapphire laser comprising a seed laser (e.g., Coherent Mira 900) and an amplifier (e.g., Coherent RegA 9000) that together produce ultrafast pulses with a temporal width of about 205 fs at a repetition rate of 250 kHz and a center wavelength of 788 nm. Both the seed laser and the amplifier may be pumped by a pump laser (e.g., Coherent Verdi) with a power of 5 W. An optical parametric amplifier (e.g., Coherent OPA 9400) may be used to generate a 394 nm beam which may be focused onto the sample with a 40 mm focal length UV fused silica lens.

The relative transmission may be defined as the ratio of the transmission intensity of a patterned metasurface of the nonlinear material relative to the transmission intensity of an unstructured film of the same nonlinear material. The unstructured film may have a thickness equal to the patterned structures. Because the unstructured film does not have any patterned structures, the incident light is not strongly confined and cannot excite a resonant magnetic dipole mode in the unstructured film. Without a resonant mode, the nonlinear material cannot benefit from electromagnetic field enhancements. In one or more embodiments, the nonlinear material may have near-zero extinction, i.e., the combined optical loss due to scattering and absorption, at the fundamental wavelength of the incident light.

Figure 2D:
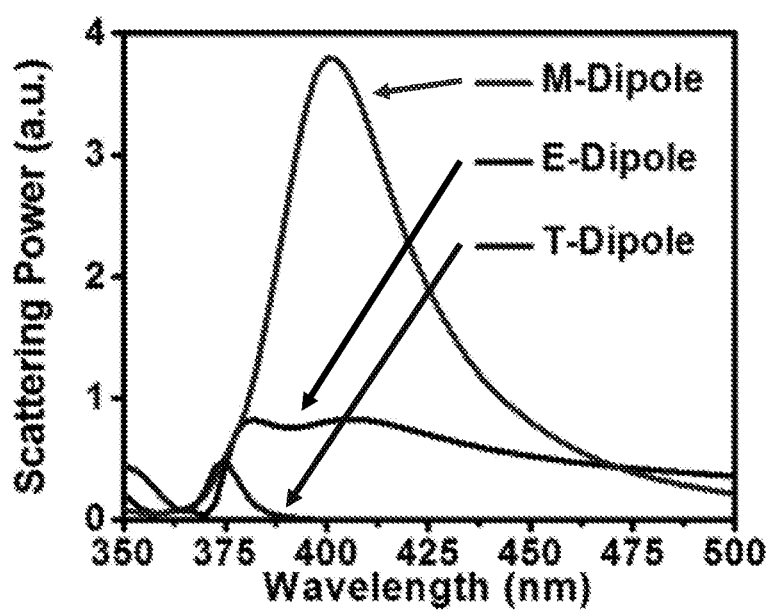
FIG. 2D is a graph of the scattering power of various modes according to one or more embodiments.

FIG. 2D is a graph of the scattering power of various modes according to one or more embodiments described herein. The size and shape of the individual structures of the plurality of structures may be tuned to support a magnetic dipole mode (M-dipole), an electric dipole mode (E-dipole), and a toroidal dipole mode (T-dipole), but is not limited to supporting these modes. The center wavelength of the magnetic dipole mode is around 394 nm, but is not particularly limited to this wavelength range. In one or more embodiments, the center wavelength of the magnetic dipole mode may be greater than 100 nm and less than 560 nm, but is not particularly limited to this wavelength range. In one or more embodiments, the center wavelength of the magnetic dipole mode may be between 150 nm and 500 nm, or between 200 nm and 450 nm. In one or more embodiments, the center wavelength of the magnetic dipole mode may be less than 100 nm or greater than 560 nm. The center wavelength of the magnetic dipole mode may be centered or offset from the wavelength of incident light.

Figure 2E:
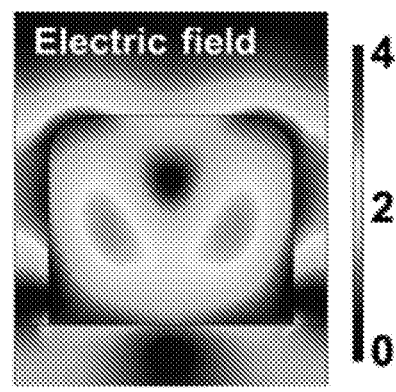
FIG. 2E is a graph of the electric field according to one or more embodiments.
Figure 2F:
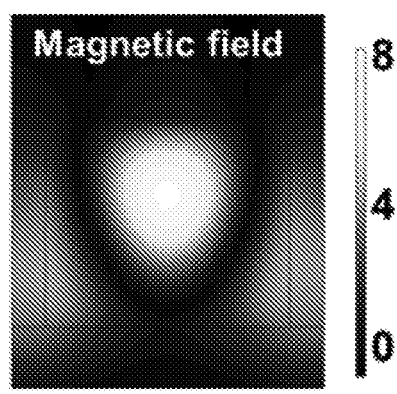
FIG. 2F is a graph of the magnetic field according to one or more embodiments.

FIG. 2E is a graph of the electric field (400 nm) within an individual structure according to one or more embodiments described herein. FIG. 2F is a graph of the magnetic field (400 nm) within an individual structure according to one or more embodiments described herein. In one or more embodiments, the magnetic dipole mode creates a magnetic hot-spot, i.e., a region of high field intensity, and a closed-loop electric field pattern with electric field enhancements within the individual structure.

In one or more embodiments, each individual structure may support a mode that interacts or hybridizes with the magnetic dipole mode to generate a high-order multi-pole mode, for example a Fano resonance, anapole resonance, and/or a supercavity mode. A higher-order multi-pole mode may more strongly confined electromagnetic fields and generate more intense electromagnetic field enhancements to more efficiently generate the harmonic signal. A higher-order multi-pole mode may result from the interference of two scattering modes that may not include a magnetic dipole mode.

Figure 3A:
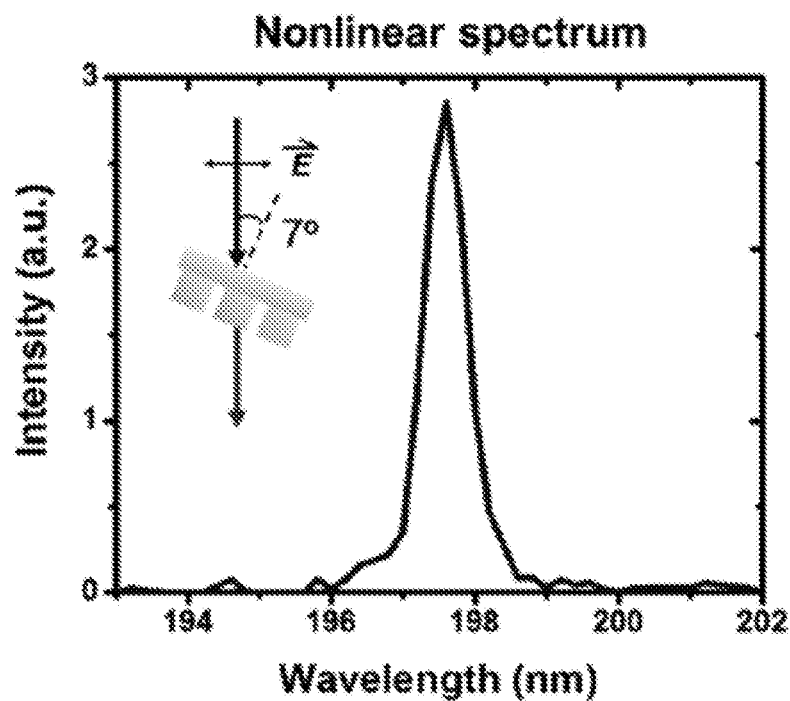
FIG. 3A is a graph of the nonlinear intensity spectrum according to one or more embodiments.

FIG. 3A is a graph of the nonlinear intensity spectrum according to one or more embodiments described herein. In one or more embodiments, a second harmonic signal is a sharp peak centered at 197 nm, which is half the wavelength of a 394 nm incident laser beam.

Figure 3B:
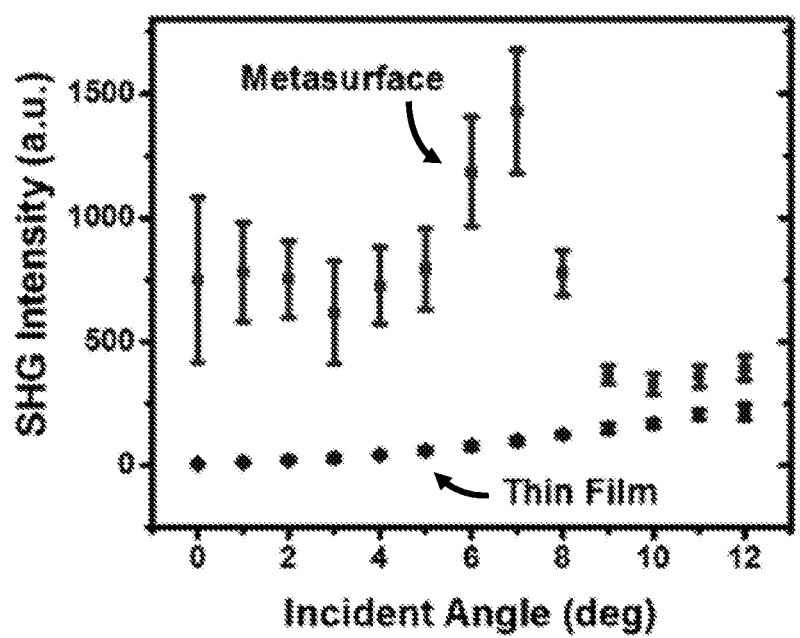
FIG. 3B is a graph of SHG intensity versus incidence angle according to one or more embodiments.

FIG. 3B is a graph of SHG intensity versus incidence angle according to one or more embodiments described herein. In one or more embodiments, the harmonic light-generating metasurface may be mounted on a rotational stage to set an incidence angle between 0° and 12°, but the incidence angle is not limited to this angular range. Increasing the incident angle may increase the harmonic signal by red shifting the center wavelength of the magnetic dipole mode to better overlap the wavelength of incident light. The red shift may be due to symmetry breaking and environmental dielectric effects of the base substrate.

Figure 3C:
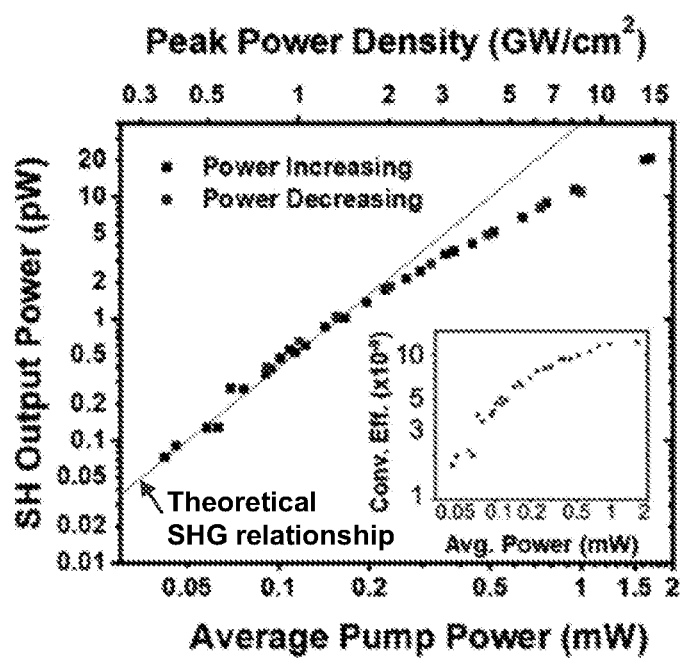
FIG. 3C is a graph of SHG output power versus average pump power according to one or more embodiments.

FIG. 3C is a graph of SHG output power versus average pump power according to one or more embodiments described herein. A log-log plot of the second harmonic signal intensity vs the pump power may be linear with a slope of 2. The log-log relationship is not required to be perfectly linear with a slope of 2 as defects and structural imperfections may cause heating, tuning, and other effects may cause the slope of the emission power law to slightly deviate from theoretical relationship (indicated gray line). In one or more embodiments, a durable all-dielectric nonlinear material may be used such that no hysteresis is exhibited when the power of the incident light is ramped up or ramped down.

To analyze a second harmonic generation efficiency, an effective nonlinear coefficient, $d_{eff}$, may be calculated according to Equation (1):

$$d_{eff} -- = \frac{n_w c w_0}{P(\omega)\omega l}\sqrt{\frac{1}{2}\pi n_{2\omega} c \epsilon_0 P(2\omega, l)} \quad (1)$$

where $n_\omega$ and $n_{2\omega}$ are the refractive indices at the fundamental and second harmonic frequencies, respectively, c is the speed of light, $w_0$ is the incident beam waist radius, P is the peak incident power, $\omega$ is the angular frequency of the fundamental harmonic, l is the interaction length, and $\epsilon_0$ is the vacuum permittivity. In this example, an average effective coefficient of 0.96 pm/V is achieved, for incident powers below 0.2 mW, which is larger than the value of an unstructured ZnO film under nominally equivalent conditions. In a Comparative Example described in Applied Physics B 2009, 97, (1), 9-25 by Chen et. al., Potassium Fluoroboratoberyllate (KBBF), one of the few existing crystals that has been used for coherent UV generation, has been reported to have a bulk nonlinear coefficient of 0.49 pm/V. However, in an optimized prism-coupled configuration at an incident angle of 54°, the effective nonlinear coefficient is reduced to 0.29 pm/V. Thus, the above non-limiting example of the harmonic light-generating metasurface shown in FIG. 3C has an effective nonlinear coefficient nominally three times larger than a prism-coupled KBBF crystal.

Figure 4A:
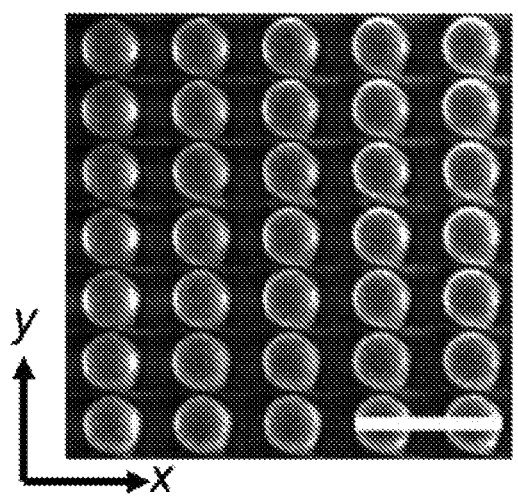
FIG. 4A is a scanning electron micrograph of an example in accordance with one or more embodiments. Scale bar is 1 µm.

In one or more embodiments, the pattern of the plurality of structures controls an emission profile of the harmonic signal generated by the harmonic light-generating metasurface. FIG. 4A is a scanning electron micrograph of an example described herein. The scale bar is 1 μm. In this example, the plurality of structures comprise ZnO [(002)-orientation] nanodiscs arranged in a square array with $P_x$=640 nm and $P_y$=450 nm. Each nanodisc structure has a height of 100 nm and of diameter of 375 nm.

Figure 4B:
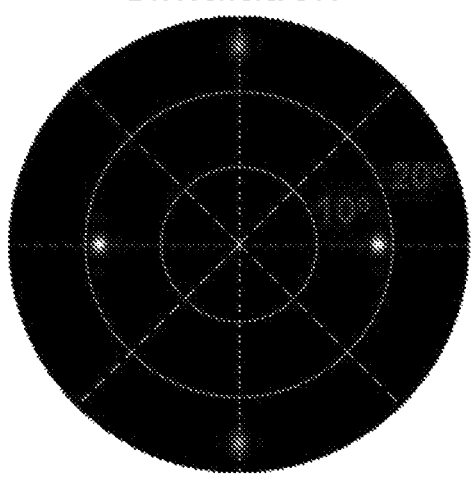
FIG. 4B is a graph of the simulated radiation pattern according to one or more embodiments.
Figure 4C:
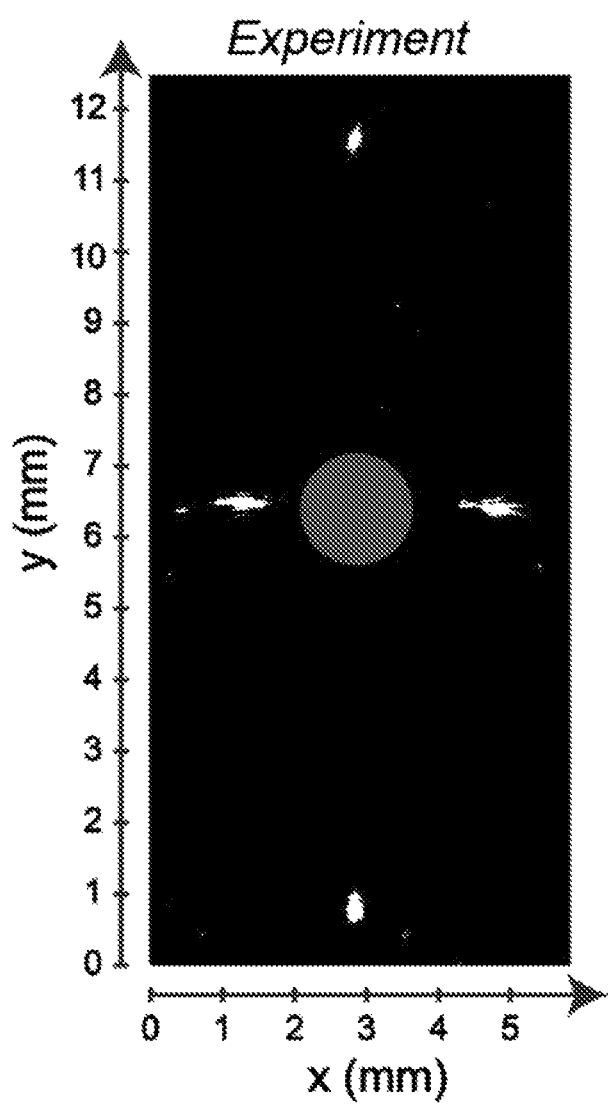
FIG. 4C is a graph of experimental radiation pattern according to one or more embodiments.

FIG. 4B is a graph of the simulated radiation pattern according to one or more embodiments described herein in which $P_x$=640 nm and $P_y$=450 nm. FIG. 4C is a graph of experimental radiation pattern according to one or more embodiments described herein in which $P_x$=640 nm and $P_y$=450 nm. In this Example, the different periodicity of the plurality of structures along the x-axis and the y-axis create different first order diffraction modes of the harmonic signal along the x-axis and y-axis.

In one or more embodiments, more sophisticated designs and arrangements of the plurality of structures may manipulate the energy distribution and radiation direction of the harmonic signal. In one or more embodiments, a base substrate with a near-zero absorption coefficient for the wavelength of the harmonic signal may be used to effectively capture the reflective harmonic signal that is emitted into the base substrate, in addition to the transmissive harmonic signal that is emitted away from the base substrate.

Example of ZnO Harmonic Light-Generating Metasurface for Vacuum Ultraviolet Light Generation Vacuum ultraviolet (VUV) light has important applications in many fields, ranging from device fabrication to photochemistry, from environmental remediation to microscopy and spectroscopy. Methods to produce coherent VUV light frequently utilize high harmonic generation in media such as rare gases or atomic vapors; nonlinear optical crystals that support second harmonic generation into the VUV are quite rare. In one or more embodiments, an all-dielectric metasurface designed for the nonlinear optical may generate VUV light. Consisting of an array of zinc oxide nanoresonators, one or more embodiments of a harmonic light-generating metasurface exhibit a magnetic dipole resonance at a wavelength of 394 nm. When excited with ultrafast laser pulses at this wavelength, the second harmonic at 197 nm is readily generated. Manipulation of the design of the harmonic light-generating metasurface enables control over the radiation pattern.

Vacuum ultraviolet (VUV) light in the wavelength regime between 100 nm and 200 nm has many current and potential research and technological applications. For example, it can be used to study the electronic structure of crystals or to analyze chemical reaction mechanisms. Coherent VUV light has been produced using high harmonic generation in gases and also in solids. Conventional nonlinear crystals such as β-BaB2O4 (BBO) have been shown to efficiently generate visible and near UV light, but suffer from limited transparency in the VUV. Furthermore, growing and utilizing such crystals remains challenging. Often special experimental configurations such as prism coupling are required to achieve phase matching. Developing manufacturable materials that enable straightforward coherent VUV light generation is clearly an important challenge.

In one or more embodiments, an all-dielectric harmonic light-generating metasurface provides an alternative to nonlinear crystals. The harmonic light-generating metasurface may comprise low loss optical resonators (called metaatoms) and may generate second and third harmonic signals via second harmonic generation (SHG) an third harmonic generation (THG), respectively. Unlike their plasmonic counterparts, all-dielectric metasurfaces do not suffer from inherent absorption, and therefore have much higher laser damage thresholds. Moreover, the resonance modes of all-dielectric metasurfaces are generally strongly confined inside the low-loss resonators allowing efficient access to the bulk nonlinearity of the constituent dielectric material. In one or more embodiments, an all-dielectric harmonic light-generating metasurface may be designed to generate VUV light using SHG. In one or more embodiments, the harmonic light-generating metasurface may comprise a square array of meta-atoms fabricated from zinc oxide on a silica substrate, the metasurface is designed to support a magnetic dipole resonance mode at a fundamental wavelength of 394 nm. ZnO may be selected based upon the nonlinear properties as well as the near-zero extinction coefficient at the fundamental wavelength. Under near-normal incident illumination, the substantial enhancements introduced by the resonant harmonic light-generating metasurface allow generation of second harmonic (SH) radiation at 197 nm. In one or more embodiments, the design of the harmonic light-generating metasurface may be modified or varied to control and manipulate this diffraction pattern.

As shown in FIG. 1, in one or more embodiments, the harmonic light-generating metasurface comprises a two-dimensional periodic array of ZnO [(002)-orientation] nanoresonators fabricated on a glass substrate. The geometric design parameters of the metasurface unit cell of the harmonic light-generating metasurface are shown in FIG. 2A. To fabricate the harmonic light-generating metasurface, a 150-nm sputtered ZnO film may be nano-patterned using a focused ion beam (FIB) system (see Example Methods for ZnO Harmonic Light-Generating Metasurface for Vacuum Ultraviolet Light Generation, below) or any other appropriate nano-patterning method (e.g., etching, stamping, etc.). A scanning electron microscope (SEM) image of the array is shown in FIG. 2B. The metasurface shows an optical resonance close to the pump wavelength of 394 nm (the top panel of FIG. 2C), however the optical resonance is not limited to any particular wavelength.

To understand the resonance properties, a detailed electromagnetic mode analysis was performed using finite element method simulations (see Example Methods for ZnO Harmonic Light-Generating Metasurface for Vacuum Ultraviolet Light Generation, below). The simulated transmission spectrum is shown in the bottom panel of FIG. 2C. The discrepancies may originate from sample imperfections or gallium ion implantation introduced during the fabrication process. By calculating the relative strength of the multipoles in a harmonic light-generating metasurface, insight of the resonance qualities of the harmonic light-generating metasurface may be obtained. The relative strength of the leading multipoles around the excitation wavelength is shown in FIG. 2D. Near the fundamental frequency, the magnetic dipole resonance is strongest. As shown in FIGS. 2E and 2F, respectively, the electric and magnetic field distributions inside the meta-atom further confirm the nature of this resonance mode. They show a clear magnetic hotspot and a closed-loop electric field pattern, both characteristics of a magnetic resonance.

The SHG properties of the metasurface may be measured by nonlinear spectroscopy, using a frequency-doubled Ti:Sapphire femtosecond laser as the excitation source (see Example Methods for ZnO Harmonic Light-Generating Metasurface for Vacuum Ultraviolet Light Generation, below). The 394 nm beam was focused onto the harmonic light-generating metasurface through the substrate side with a fused silica lens. The harmonic light-generating metasurface was mounted on a rotational stage to precisely control the incident angle. Additional CaF2 lenses were used to collect the second harmonic, VUV signal. The VUV signal was guided to a UV monochromator, and detected with a photomultiplier tube (PMT). The SHG spectrum generated by the metasurface is shown in FIG. 3A. A sharp peak centered at nominally 197 nm was observed when using a p-polarized pump beam with a 7° incident angle from normal. This slightly abnormal incident angle may be used since it shows an increase of about a factor of two compared to normal incidence, as shown in FIG. 3B. Since the efficiency of SHG is highly sensitive to the field enhancement in the nanostructure at the basic frequency, this increase could be associated with the slight mismatch between the resonance position and the pump wavelength under normal incidence, as shown in FIG. 2C. Increasing the incident angle red shifts the magnetic dipole resonance closer to the pump wavelength. In addition, induced symmetry breaking with increasing incident angle may also contribute to this enhancement. In comparison, a bare ZnO film has a much weaker response, close to the noise level. More information about the incident angle dependence of both the metasurface and the bare thin film can be found in the Example Methods for ZnO Harmonic Light-Generating Metasurface for Vacuum Ultraviolet Light Generation section, below.

Notably, the wavelength of the SHG signal is slightly larger than half of the excitation wavelength. This discrepancy is most likely caused by a slight center wavelength difference between the excitation laser and the metasurface resonance. To confirm that the signal is indeed associated with SHG in the harmonic light-generating metasurface, the power dependence may be compared with the signal intensity. A log-log plot of the SHG intensity vs the pump power is shown in FIG. 3C. For powers below 0.2 mW incident fundamental power, the data points follow the inserted solid line (Theoretical SHG relationship) line with a slope of two (indicating a quadratic power dependence). For values above 0.2 mW, the slope of the emission power law is slightly reduced. This may be associated with heating from defects inside the metasurface. As shown in FIG. 3C, when the laser power was gradually decreased, hysteresis was not observed in this power regime, indicating a good reversibility of the harmonic light-generating metasurface as a durable component for coherent VUV light generation. The harmonic light-generating metasurface also shows very good stability with extended exposure time (see Example Methods for ZnO Harmonic Light-Generating Metasurface for Vacuum Ultraviolet Light Generation section, below).

To further analyze the SHG efficiency, the effective nonlinear coefficient may be calculated according to Equation (1), above. At 7° incident angle, the harmonic light-generating metasurface has an average effective coefficient of 0.96 pm/V for pump powers below 0.2 mW, which is larger than the value of an unstructured ZnO thin film (nominally 0.20 pm/V). Moreover, the effective coefficient of the metasurface slightly declines to 0.66 pm/V for powers above this 0.2 mW (see Example Methods for ZnO Harmonic Light-Generating Metasurface for Vacuum Ultraviolet Light Generation section for more detailed discussion). Due to the small interaction length, perfect phase matching may be assumed. The quantum efficiency of the detector and the transmission of all optical components in the detection path were considered in the calculation as well. As discussed above with reference to the Comparative Example of Chen, Potassium Fluoroboratoberyllate (KBBF), one of the few existing crystals that has been used for coherent VUV generation, has been reported to have a bulk nonlinear coefficient of 0.49 pm/V. However, KBBF is commonly used in a prism-coupled configuration to achieve phase matching. At an incident angle $\theta 0=54°$ for example, the effective coefficient of KBBF reduces to 0.29 pm/V. The non-limiting example of a harmonic light-generating metasurface, according to one or more embodiments of the invention, presented here has an effective coefficient nominally three times larger than a prism-coupled KBBF crystal. Furthermore, due to the absorptive nature of the glass substrate in the VUV regime, only the transmissive nonlinear signal can be detected. In the nonlinear simulations, the backward zero order signal is found to be nominally 79% of the forward zero order one. Therefore, in one or more embodiments, the effective nonlinear coefficient could be even larger if a different substrate was used and the nonlinear signals in both directions were collected.

By manipulating the lattice constants of the harmonic light-generating metasurface, the diffraction pattern of the generated VUV signal may be controlled. This ability to generate VUV light in complex radiation patterns controlled by harmonic light-generating metasurface geometry may lead to novel components for VUV wavefront manipulation, and may yield new and useful applications in nanopatterning and nanofabrication. In one or more embodiments, the metasurface array period is adjusted to 640 nm and 450 nm in the x and y directions, respectively, as shown in FIG. 4A. The theoretical and experimental first order diffraction modes are shown in FIGS. 4B and 4C, respectively. By modifying the periods along the x- and y-axis of the harmonic light-generating metasurface, the VUV spot separation can be seen to be different along the two axes. More details regarding measurement and image analysis for the nonlinear diffraction pattern experiment can be found in the Example Methods for ZnO Harmonic Light-Generating Metasurface for Vacuum Ultraviolet Light Generation section, below. In one or more embodiments, a more sophisticated design and meta-atom arrangement may be employed to manipulate the energy distribution and radiation direction of the nonlinear signal even further.

In summary, in this non-limiting example according to one or more embodiments of the invention, SHG at 197 nm was realized in an all-dielectric ZnO harmonic light-generating metasurface designed to have magnetic dipole resonances at the excitation wavelength. The magnetic resonance confines the incident energy to inside the material enabling efficient bulk SHG generation. Due to its compact size, the harmonic light-generating metasurface may be readily integrated into ultrafast laser systems for tabletop VUV light sources without the need for complex experimental configurations or phase matching. In one or more embodiments, the efficiency of the harmonic light-generating metasurface may be further improved by introducing a more complex or high-order multipole resonance (e.g., a Fano-type resonance, anapole resonance, and/or a supercavity mode). Furthermore, the harmonic light-generating metasurface can spatially manipulate the generated VUV light. In one or more embodiments, the harmonic light-generating metasurface may be efficiently fabricated using CMOS fabrication processes, laser nanofabrication, nanoimprinting, nanostencil lithography techniques, or any other appropriate nanofabrication technique. In one or more embodiments, the harmonic light-generating metasurface may be used in promising VUV applications which are difficult to realize using conventional components, such as multiple spot scanning systems for imaging and material analysis, and high-end multifunctional VUV sources for spectroscopy, lithography, and microscopy.

Example Methods for ZnO Harmonic Light-Generating Metasurface for Vacuum Ultraviolet Light Generation In one or more embodiments, the design and simulation of the harmonic light-generating metasurface may be performed as follows. The harmonic light-generating metasurface geometry may be chosen to exhibit a resonance at the fundamental in order to generate field enhancement. The linear simulations may be performed using the Finite Element Method, however any other appropriate simulation method (e.g., finite difference time domain (FDTD) simulations) may also be used. A plane wave incidence from the glass slide may be simulated and the transmission calculated by integrating the Poynting vectors on a plane parallel to the substrate at the air side. Perfect matched layers may be applied in the vertical direction to prevent reflection. In the horizontal direction, a periodic boundary condition may be used. Slight differences in the refractive index of ZnO may be used, depending on the preparation method and the adopted substrate. In light of this, a modified refractive index of ZnO may be used in all simulations.

In one or more embodiments, nonlinear simulations of the SHG process may be performed, for example, in a two-step method. First, a linear simulation at the basic frequency may be performed to obtain the electric field distributions within the nanoparticles of the harmonic light-generating metasurface. The near field distributions may then be used to determine the nonlinear polarizations using a nonlinear tensor formulation or any appropriate method. In a second step, a linear simulation at the SH frequency may be performed. The nonlinear polarizations may be used as radiation sources, and the far field propagation may be simulated to obtain the detected SHG.

In one or more embodiments, fabrication of the harmonic light-generating metasurface may be performed as follows. To fabricate the ZnO metasurface, a 150 nm sputtered ZnO film with (002)-orientation on a soda lime glass substrate may be used. A Cr layer (e.g., 5 nm thick), as a conductive layer for nanofabrication, may be evaporated on the top of the ZnO film at an appropriate base pressure (e.g., less than $5 \times 10^{-6}$ Torr). The harmonic light-generating metasurface may then be patterned with a focused ion beam system, however any appropriate nanofabrication method (e.g., etching) may also be used. To define the ZnO nanostructures, a commercial software may used to precisely control the scan path of the ion beam. In one or more embodiments, the beam current may be 51 pA with an acceleration voltage of 30 kV and the gallium ion beam dose applied on the sample may be 23 $\mu C/cm^2$.

Figure 4D:
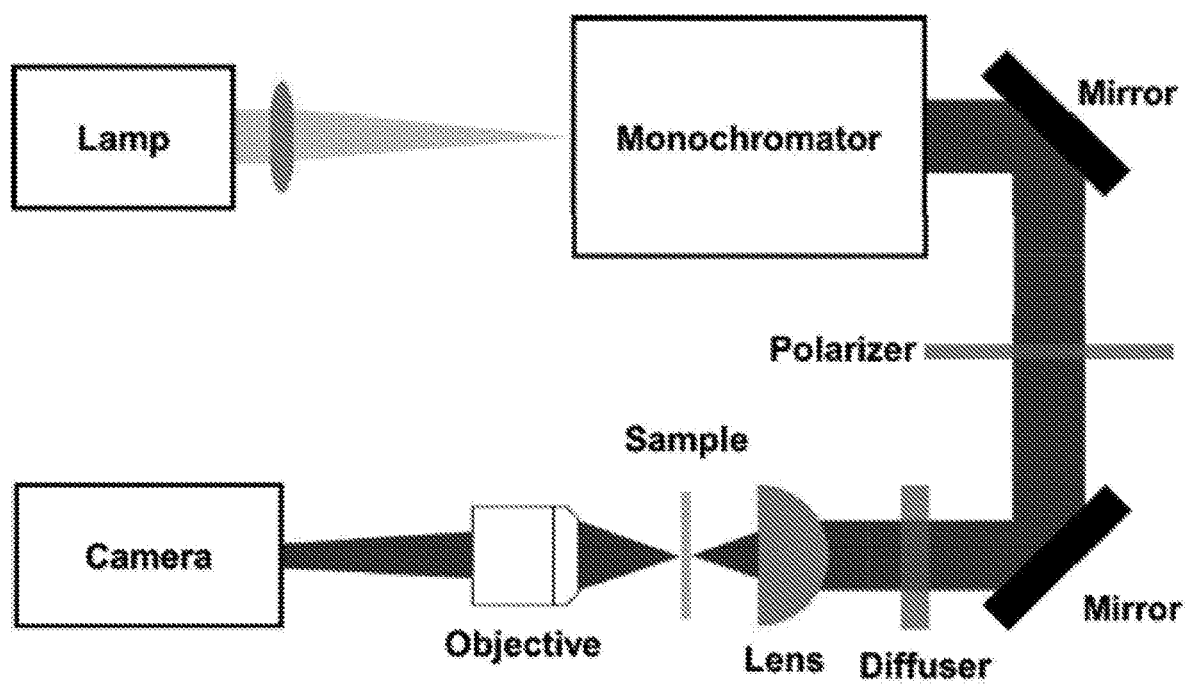
FIGS. 4D-4F are schematics according to one or more embodiments.

In one or more embodiments, linear measurements of the harmonic light-generating metasurface may be performed as follows. To characterize the optical response of the ZnO metamaterial in the vicinity of its fundamental frequency, a transmission measurement may be performed, however other appropriate measurements (e.g., reflection, darkfield, or any combination thereof) may also be used. A schematic is shown in FIG. 4D. In short, a continuum laser-driven light source combined with a 1200 grooves/mm scanning monochromator may be utilized to produce the excitation beam. The excitation beam may then be focused on the sample with a fused silica lens. The transmitted rays may be collected by an objective and guided to a charge-coupled device. The relative transmission spectrum of the metasurface may be retrieved by comparing the signals from the harmonic light-generating metasurface and an adjacent bare (e.g., non-patterned) film at different wavelengths. Similar to the linear measurements, the light may be passed through the substrate first. The incident peak power density on the sample may range between 0.3 and 15 GW/cm2 with a spot size of around 227 $\mu m^2$ (e.g., 8.5 µm beam waist radius). The peak power density may be estimated based on the spot size, the pulse width, and repetition rate of the laser. The transmitted linear and nonlinear signals may then be collected with two $CaF_2$ lenses (e.g., 40 mm focal length each). For the spectral scan, the light may then be guided to a deep UV monochromator. Several UV filters may be used to eliminate the pump signal. Two narrowband and one broadband filter, both centered at 200 nm, may be used. The narrowband/broadband filters may have a minimum peak transmission of 15% or 35%, and an out-of-band rejection of $(10^{-3}\text{-}10^{-4})/10^{-3}$. For the radiation pattern experiment, a fourth filter with center wavelength of 193 nm and a minimum peak transmission of 10% may be added. The wavelength step for the spectral scans may be 0.2 nm. Two bandpass filters may be used to reduce the linear signal. After the monochromator, the VUV light may be detected with a photomultiplier tube (PMT) chilled to around $-14°$ C. to minimize dark current. To further increase the signal to noise ratio, the current signal from the PMT may be fed into a lock-in amplifier. The reference frequency for the lock-in amplifier may be provided by an optical chopper placed in the laser path. The modulation frequency may be 2.2 kHz. For all non-spectral scans, a simplified setup (FIG. 4F) may be used.

In one or more embodiments, linear transmission measurements may be performed with the standard spectroscopy setup shown in FIG. 4D. A laser driven white light source (e.g., Energetic LDLS) may be used for excitation, however any appropriate broadband light source may be used. A specific wavelength may be selected with a scanning monochromator (e.g., Princeton Instruments Action SP2150) that utilizes a grating (e.g., 1200 groves/mm). After passing through a polarizer, the beam may be passed through a diffuser to increase uniformity, and may be focused on the sample via a fused silica lens (e.g., 40 mm focal length). The transmitted beam passed to the sample from the substrate side, may then be collected with a reflective objective (e.g., Edmund Optics, 15x/0.28), and finally focused onto a hyperspectral CCD camera (e.g., Princeton Instruments PIXIS 1024). The wavelength may be stepped in increments of 2 nm or any appropriate resolution. The relative transmission spectra may then be obtained by dividing the collected data from the sample, by that of the adjacent un-patterned substrate.

Figure 4E:
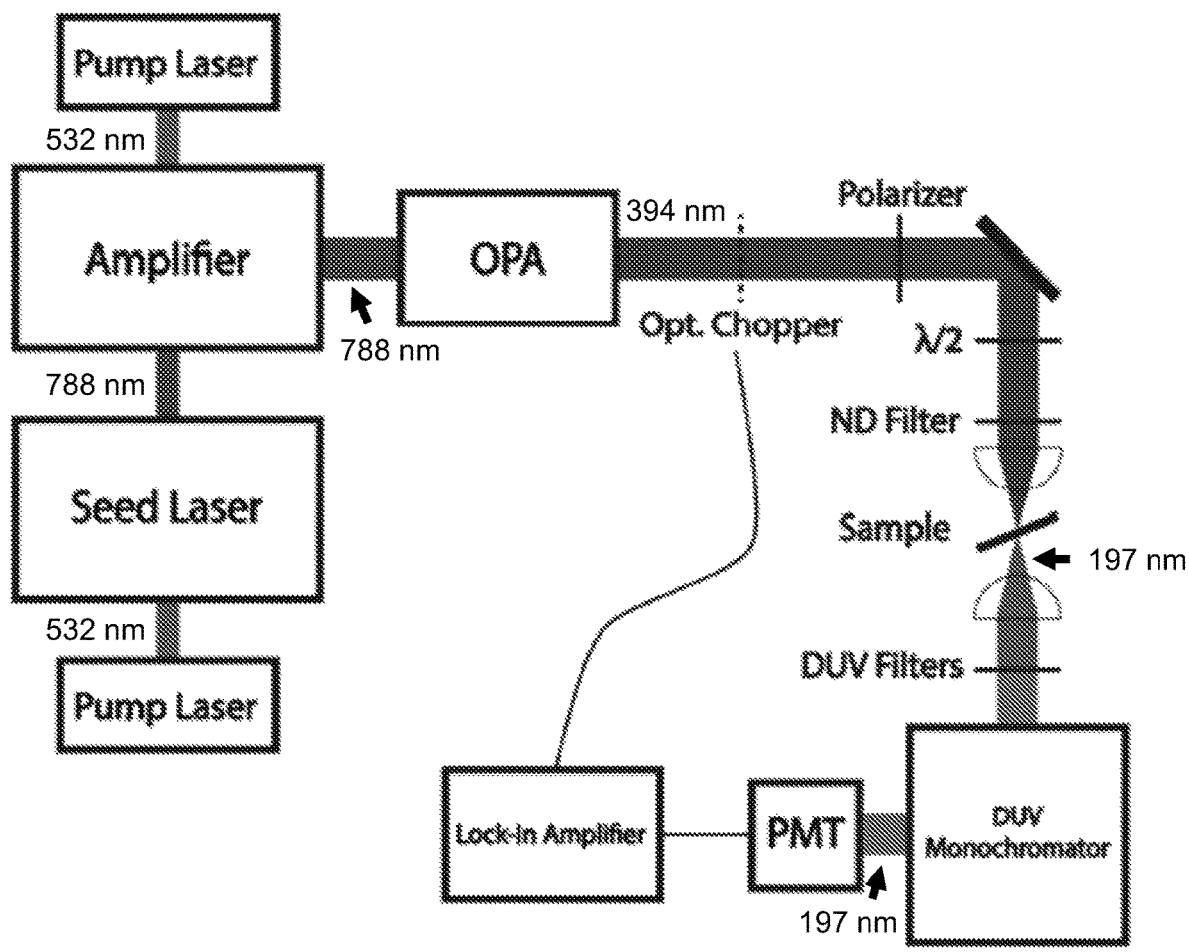

In one or more embodiments, nonlinear measurements of the harmonic light-generating metasurface may be performed as follows. The nonlinear measurements may be performed using a mode locked, ultrafast Ti:sapphire laser, as shown in FIG. 4E. The laser may comprise a seed laser and an amplifier that together produce ultrafast pulses (e.g., a temporal width of about 205 fs). The repetition rate may be 250 kHz, and the center wavelength around 788 nm. The system may be pumped by one or more pump lasers. To generate the second harmonic, an optical parametric amplifier (OPA) may be used. The produced 394 nm beam may be focused onto the sample with a UV fused silica lens (e.g., 40 mm focal length).

A deep UV (DUV) monochromator that filters the collected signal from the harmonic light-generating metasurface may be calibrated using the high energy spectrum from a white light source (blue side of the visible and near UV light). A calibration lamp (e.g., Newport Corporation, Hg(Ne)) may be used to verify that the calibration accurately predicted the correct wavelengths in the relevant wavelength regime. At each wavelength increment, five measurements of the PMT (e.g., Thorlabs PMTSS) current and the average laser power may be performed. First, the dark values may be subtracted. Second, the current values may be normalized by dividing by the power values squared. Finally, the five points may be averaged.

Figure 4F:
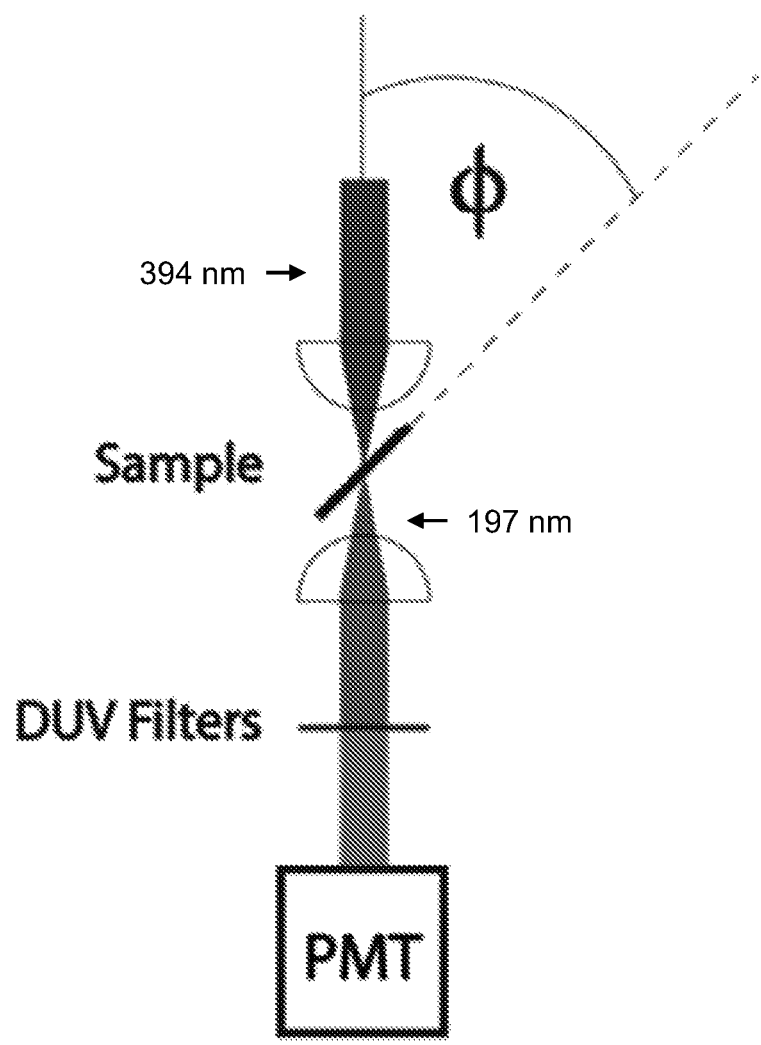
Figure 4G:
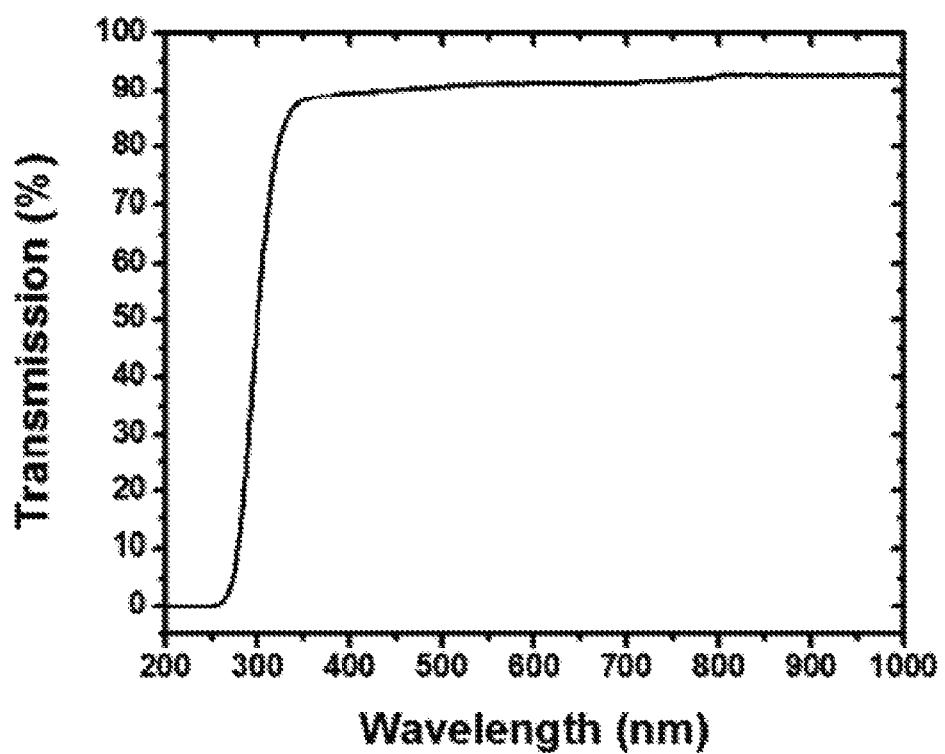
FIG. 4G is a graph of transmission for a glass slide filter according to one or more embodiments.

For all non-spectral measurements, including power and angle scans (change in incident angle f, measured from normal), a simplified measurement setup was used, as shown in FIG. 4F. Note that minimal optics may be used in the power dependence measurements to avoid extraneous effects. Three bandpass filters may be used to separate out the second harmonic (SH) signal instead of using a monochromator. This simplified setup may only use minimal optics which is not only convenient in operation but has the additional advantage that the attenuation of the SH signal by the optical components can be easily adjusted for in calculations, making it possible to accurately determine the conversion efficiency. In addition, a shorter path length may also help minimize absorption of the SH signal in air. To compensate for any remaining fundamental signal, measurements with a glass slide which acts as a long pass filter that blocks the SH signal, as shown in FIG. 4G, may be performed.

In one or more embodiments, data analysis of the nonlinear measurements may be performed as follows. At each data point ten measurements of the PMT current and the average laser power may be taken immediately after one another. First, the dark values may be subtracted. Second, the ten points may be averaged. Third, the PMT current measurements with the longpass filter may be subtracted from the ones without (i.e., the transmission of the glass was also compensated for). For power measurements these values may be plotted, where the peak power density may be estimated based on the spot size, the pulse width, and the repetition rate of the laser. The conversion efficiency may be estimated by taking into account the sensitivity of the PMT, as well as the transmission values of all relevant optical components. For the angle scan shown in FIG. 4H, the data may be analyzed using the same three steps described above, but in addition the current values were normalized by dividing by the power values squared. The effective nonlinear coefficient may be calculated using Equation (1) above. Within the points 0.042 mW to 0.196 mW, the average nonlinear coefficient is 0.96 pm/V. For lager powers (0.226 mW to 1.682 mW), where deviation from the quadratic power dependence can be observed, the average coefficient drops to 0.66 pm/V.

In one or more embodiments, selecting the right materials is crucial in the design of a harmonic light-generating metasurface. Two principles may be considered. The material may be lossless and have a high refractive index at the fundamental wavelength (e.g., 394 nm) to achieve strong light-matter interactions in subwavelength meta-atoms of the harmonic light-generating metasurface. For example, germanium and silicon and may be used in the fabrication of all-dielectric metasurfaces for harmonic generation from the near-IR to the visible. However, their relatively high optical losses in the visible make them unsuitable for harmonic light-generating metasurfaces in this wavelength regime. ZnO has both a high refractive index, as well as near-zero extinction coefficient (k~0) at the fundamental wavelength, and is therefore one appropriate material, although other appropriate materials may be used. Furthermore, ZnO may be efficiently prepared by conventional methods such as sputtering and chemical synthesis, making it promising for applications in nonlinear devices. For example, sputtered ZnO films on glass or fused silica substrates may be purchased commercially (e.g., from MTI corporation, USA (Item Numbers: ZnO on Glass—252507-150 nm and ZnO on Fused Silica—101005-100 nm).

Figure 4H:
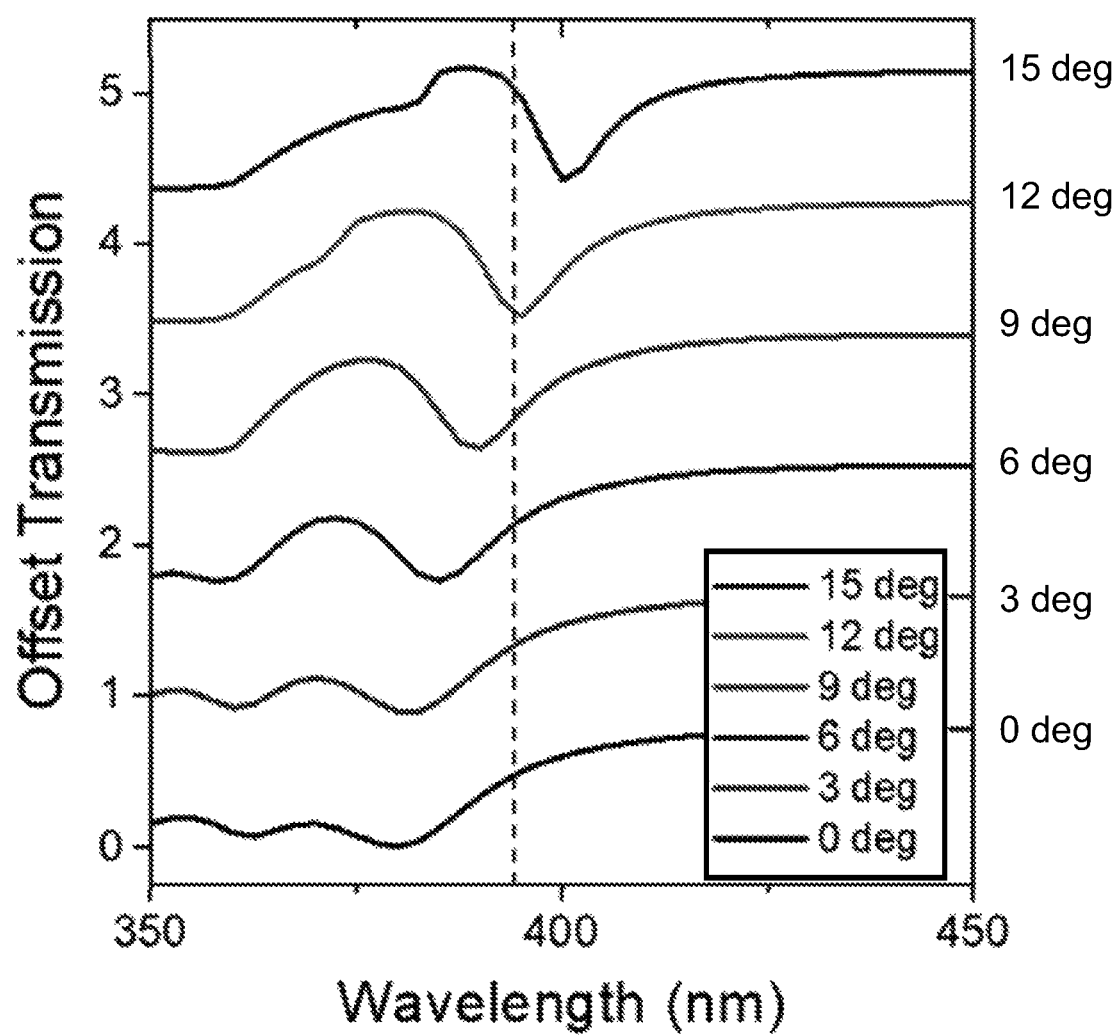
FIG. 4H is a graph of offset transmission according to one or more embodiments.

In one or more embodiments, incident angle dependence may be characterized as follows. FIG. 3B above shows the incident angle dependence of both a harmonic light-generating metasurface and a thin film. For the harmonic light-generating metasurface, a SHG signal intensity may peak at 7°. To understand the incident angle dependence line shape, two factors may be considered: symmetry breaking and resonance shifting. When the pump beam deviates from normal incidence, asymmetry is introduced and causes more constructive interference across the nanoresonator at the SHG wavelength. The increasing trend at high angles (from 10 to 12°) may be attributed to the increased symmetry breaking, while the transmission resonance shifting may cause the peak at 7°. This can be shown in simulation that the transmission resonance due to the magnetic mode red shifts with increasing incident angle, as shown in FIG. 4H. For example, FIG. 4H shows that for an incident angle between 9 and 12 deg, the resonance shifts to the fundamental wavelength (e.g., the dashed line at 394 nm). This is in relatively good agreement with the experimentally measured maximum at 7 deg. Since the SHG intensity is very sensitive to field enhancement, this slight resonance shift may play a role. Both factors combine to produce the observed incident angle dependence line shape.

Figure 4I:
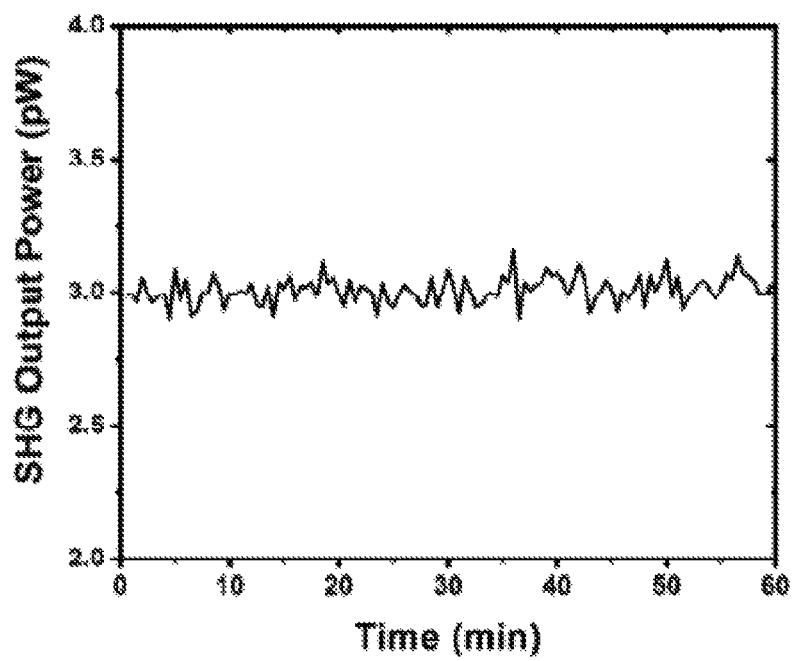
FIG. 4I is a graph of second harmonic generation output power versus time according to one or more embodiments.
Figure 4J:
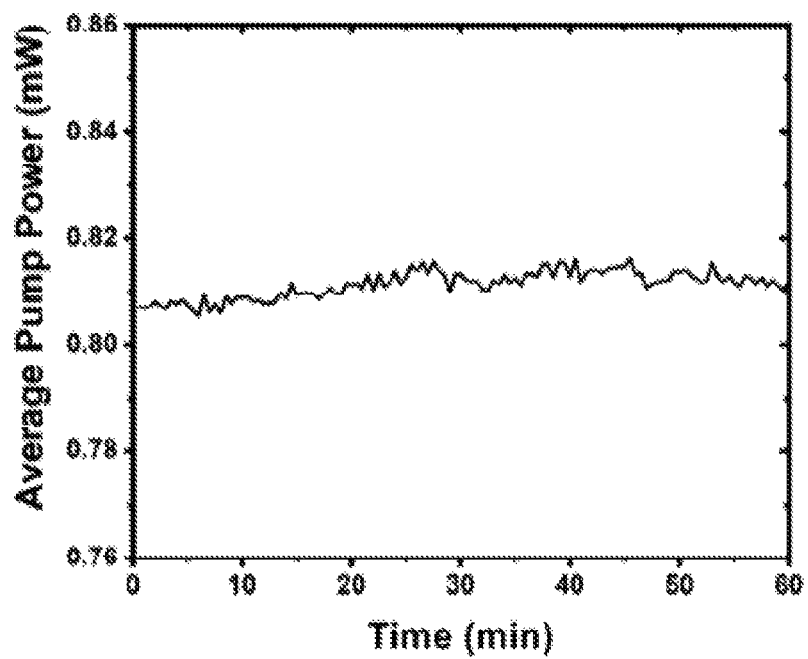
FIG. 4J is a graph of average pump power versus time according to one or more embodiments.

In one or more embodiments, the stability of the harmonic light-generating metasurface may be characterized as follows. FIGS. 4I and 4J show that the harmonic light-generating metasurface exhibits good stability under continuous exposure. In FIGS. 4I and 4J, the example harmonic light-generating metasurface had ZnO discs with a diameter of 185 nm, with periods Px=245 nm and Pie=245 nm. The ZnO thickness was 100 nm, on a silica substrate. A 3 nm Cr layer was added for conduction. Data points may be taken about every 30 seconds for one hour. The simplified setup shown in FIG. 4F was used. A dark measurement may be taken initially and subtracted from each data point, as well as a measurement with a longpass filter that may be subtracted proportionally. The measurements may be performed under normal incidence.

In one or more embodiments, the polarization of the second harmonic signal may be analyzed as follows. A 6 mm symmetry of the ZnO wurtzite crystal structure supports five nonzero elements of the second order nonlinear susceptibility tensor, as shown in d matrix notation in Equation (2) below.

$$d = \epsilon_0 \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix} \quad (2)$$

Therefore, for the thin film under p-polarized excitation, the incident field has components $E_x$ and $E_z$, and the nonlinear polarization will also be p-polarized, as shown in Equations (3) and (4) below:

$$P_x(2\omega) = 4d_{15}\epsilon_0 E_x(\omega)E_z(\omega) \quad (3)$$

$$P_z(2eu) = 2d_{31}\epsilon_0 E_x(\omega)^2 + 2d_{33}\epsilon_0 E_z(\omega)^2 \quad (4)$$

Under s-polarized excitation, the incident field only has the component $E_y$; so the nonlinear polarization will be in z direction, as shown in Equation (5) below:

$$P_z(2\omega) = 2d_{32}\epsilon_0 E_y(\omega)^2 \quad (5)$$

Figure 4K:
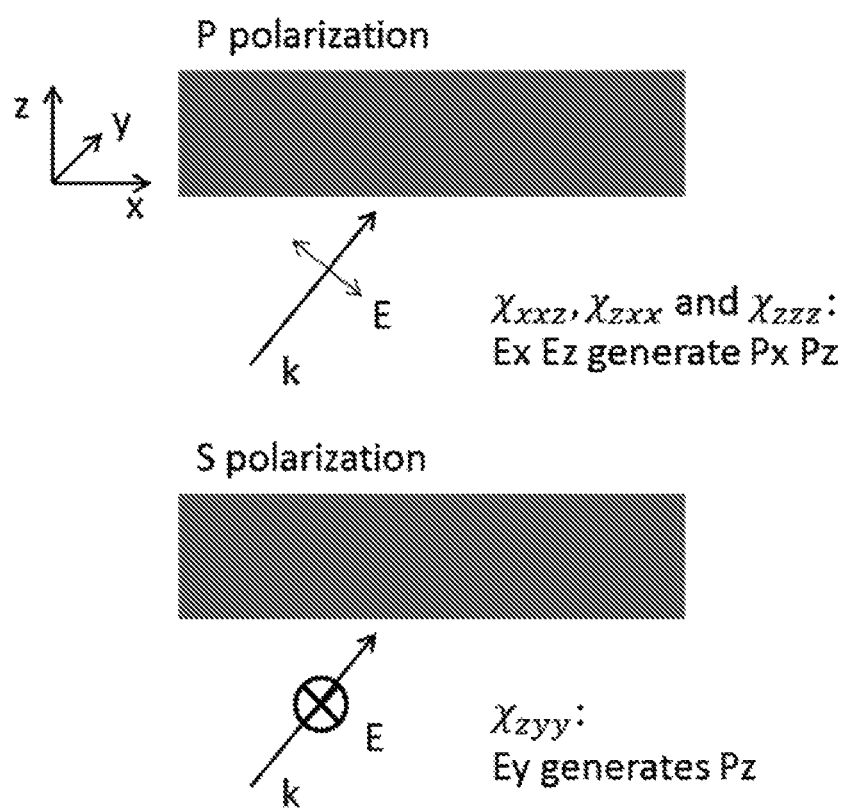
FIG. 4K is a graph of nonlinear polarization according to one or more embodiments.
Figure 4L:
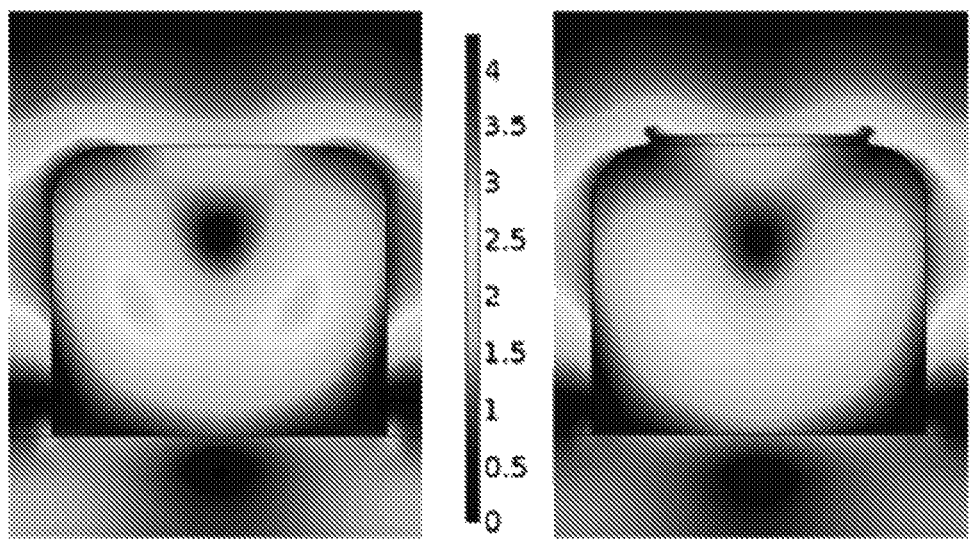
FIGS. 4L and 4M are graphs of the electric field profile with (right) and without (left) a Cr layer according to one or more embodiments.
Figure 4M:
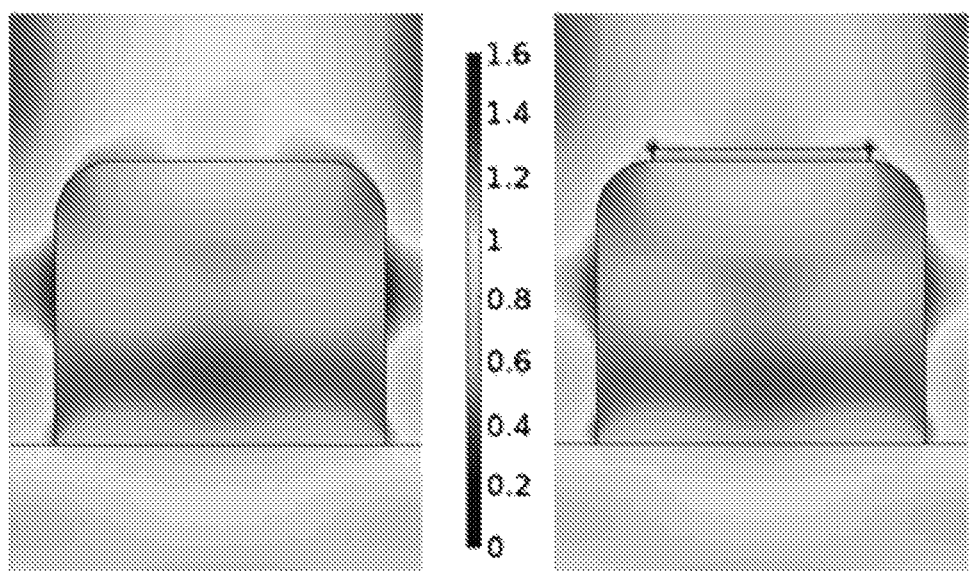

The nonlinear signal will also be p-polarized in this case, but the signal will be much lower compared with p-polarized excitation. Therefore, it can be concluded that the nonlinear signal will be p-polarized regardless of the polarization of the input signal, as shown in FIG. 4K.

Figure 4N:
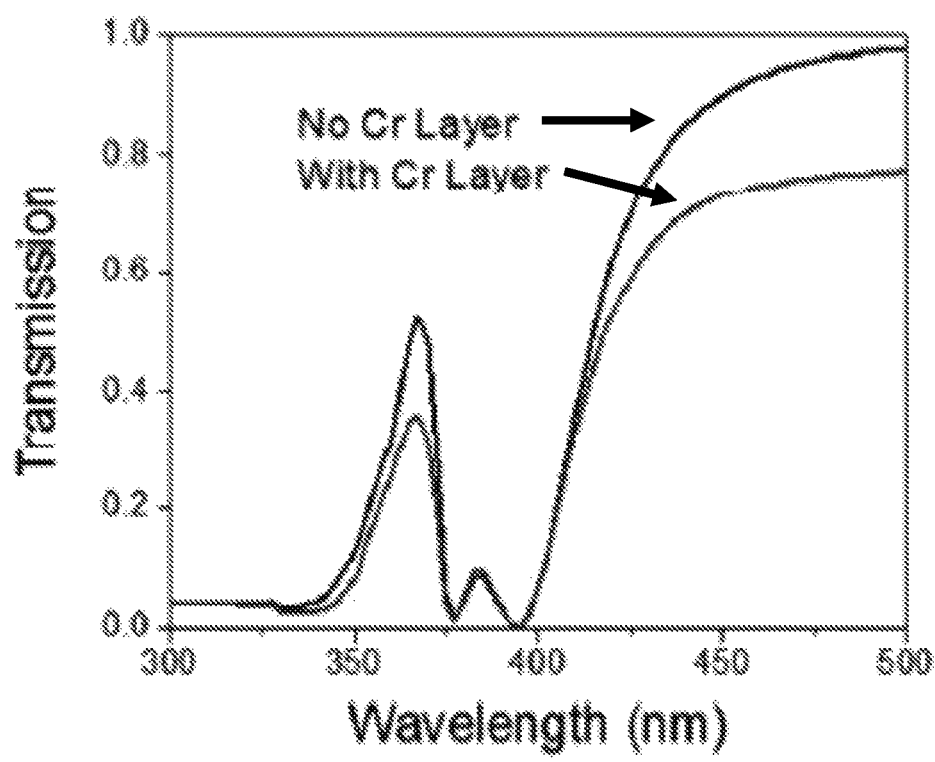
FIG. 4N is a graph of transmission versus wavelength according to one or more embodiments.

In one or more embodiments, the absorption in the chromium layer may be characterized as follows. Due the lossy nature of Cr at the SHG frequency, the thin Cr layer on the top of the metasurface may cause an extra loss of the SHG signal. Simulations indicate that for a ZnO thin film, a SH signal reduction of 75% may be expected. However, the linear and nonlinear response of the metasurface may not be strongly affected by the Cr layer, as shown in FIGS. 4L-4P. The electric field profile is plotted at the fundamental wavelength (e.g., 394 nm) without (FIG. 4L, left) and with (FIG. 4L, right) the Cr layer, and at the SHG wavelength (e.g., 197 nm) without (FIG. 4M, left) and with (FIG. 4M, right) the Cr layer. In FIG. 4N, a transmission spectrum without and with the Cr layer is shown. The lack of dependence on the Cr layer may be because the resonance mode at the fundamental and the field distribution at the doubled frequency are predominantly confined inside and on the side walls of the disc instead of on its top surface. It can be noted that this is quite different from plasmonic resonances, in which all field enhancement is generally located at the top/bottom surface and/or outside the nanostructures.

Figure 4O:
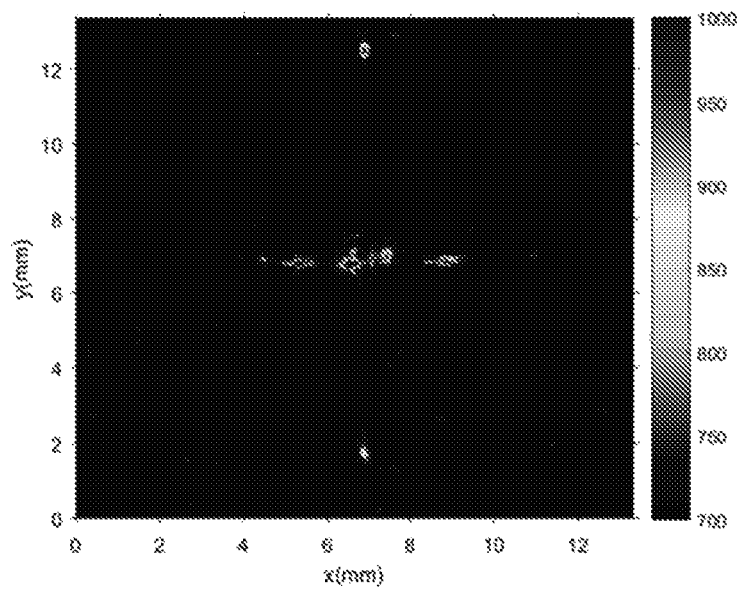
FIG. 4O is a radiation pattern image according to one or more embodiments.
Figure 4P:
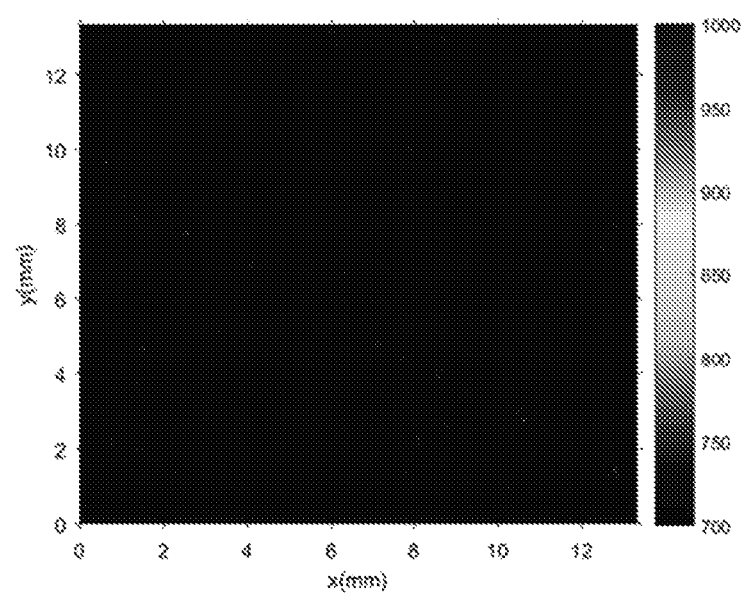
FIG. 4P is a filtered radiation pattern image according to one or more embodiments.

In one or more embodiments, the radiation pattern of the harmonic light-generating metasurface may be characterized as follows. The magnetic dipole sample used for the radiation pattern experiment comprises an array of disc shaped ZnO nanoresonator. However, the diameter and the periods are larger than the above-described embodiments, such that the radiation pattern can be more readily captured. Other minor differences minor difference with the above described embodiments include: a 150 nm thick ZnO thin film on a glass substrate (compared to a 100 nm ZnO thin film on a fused silica substrate above); a 3 nm Cr layer (compared to a 5 nm layer above); a simplified optical setup, similar to FIG. 4F, with a CCD camera (e.g., Princeton Instruments PIXIS 1024BUV) as a detector (compared to the PMT above); an integration time of 1000 seconds; an additional bandpass filter was added (four total) to reduce the exposure from the fundamental signal (compared to three total). FIG. 4O shows the radiation pattern image from FIG. 4C, but without the cover over the center. FIG. 4P shows the results from a similar measurement taken with a glass slide which acts as a longpass filter in the path. This confirms that the diffraction pattern comes from the SH signal.

Figure 4Q:
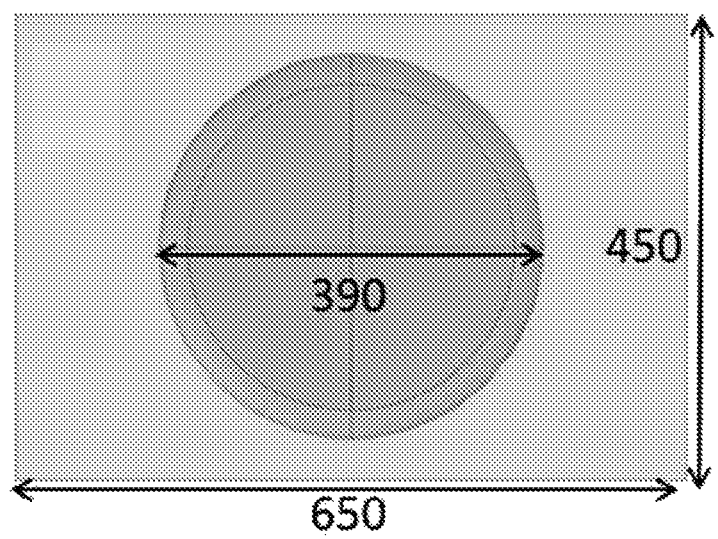
Figure 4Q:
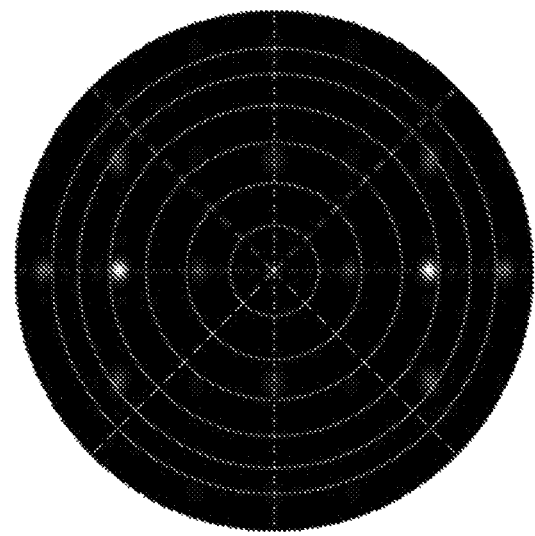

Furthermore, the radiation pattern may be manipulated by changing the design of the harmonic light-generating metasurface. FIG. 4Q shows the simulated diffraction pattern (simulated radiation pattern shown in FIG. 4Q, bottom) of a harmonic light-generating metasurface with D=390 nm, Px=650 nm, Py=450 nm (geometry shown in FIG. 4Q, top), with a large range of angles. FIG. 4R shows that the emission angles (simulated radiation pattern shown in FIG. 4R, bottom) may be manipulated by changing the lattice constants (D=300 nm, Px=350 nm, Py=350 nm shown in FIG. 4R, top) of the harmonic light-generating metasurface. Furthermore, as shown in FIG. 4S, by introducing symmetry breaking into the unit cell (e.g., by using half-discs with the same diameter and periods as FIG. 4R) the relative intensities between different diffraction orders may be adjusted.

In one or more embodiments, the origin of the saturation effect in power dependence measurement may be characterized as follows. The saturation effect in the power dependence can in principal result from several mechanisms such as local heating from ZnO defects and multiphoton absorption (in the metasurface layer or the substrate). To address this issue, calculations to estimate the influence of two-photon absorption in the ZnO metasurface and the glass substrate may be performed as described above. Conventional two-photon absorption coefficients for ZnO and glass may be used. The estimated values based on these calculations were around 1 mm and 3 cm for ZnO and glass, respectively. The calculated penetration depths may be much larger than the thicknesses of the materials used in the above-described embodiments (150 nm for ZnO and 0.7 mm for the glass substrate). It is unlikely that multiphoton absorption effects play a significant role in the saturation effect. Instead, the saturation effect may be attributed to local heating of the defects in the harmonic light-generating metasurface under high laser power illumination.

ZnO Vacuum Ultraviolet Metalens

In one or more embodiments, the harmonic light-generating metasurface may be used for ultraviolet light generation using second (SHG) and third harmonic generation (THG). For example, the harmonic light-generating metasurface may comprise artificial nanostructures made of zinc oxide (ZnO). Arrays of these nanostructures can be used for manipulation, specifically focusing and polarization control, of ultraviolet or other wavelengths light via SHG and microscopic phase modulation. In other words, the harmonic light-generating metasurface design, according one or more embodiments, cannot just generate, but at the same time also focus the generated light as a metalens.

As discussed above, ultraviolet light has important applications in many fields, ranging from device fabrication to photochemistry, from environmental remediation to microscopy and spectroscopy. Vacuum ultraviolet (VUV) light may be generated by using a ZnO-based harmonic light-generating metasurface and may perform simple manipulation of VUV light via diffraction. However, in order to move further towards real world devices, it may be important to achieve more sophisticated manipulation of VUV light like focusing and polarization control.

In one or more embodiments, the harmonic light-generating metasurface may be capable of generation, and more importantly, focusing and changing polarization of coherent VUV light. A harmonic light-generating metasurface may be an artificial photonic device comprising subwavelength nanostructures that can interact with incident light. Optical properties of harmonic light-generating metasurfaces may not only be decided by the constituent materials but also the geometric parameters. The harmonic light-generating metasurface according to one or more embodiments may comprise a two-dimensional array of ZnO nanostructures. By designing the nanostructure to possess three-fold rotational symmetries, the nanostructure may selectively generate SHG under circular polarization excitation while higher order nonlinear effects are suppressed. For example, the nanostructure may be a regular triangle, however any appropriate three-fold symmetry design may be used (e.g., hexagons). The triangle array may be designed to produce a magnetic dipole resonance close to an excitation wavelength (e.g., 394 nm).

Figure 5A:
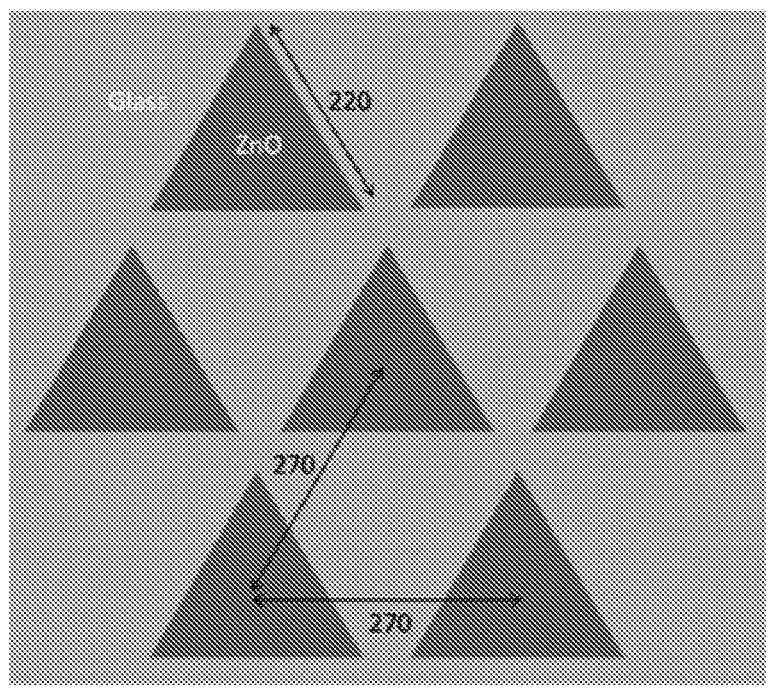
FIG. 5A is a schematic according to one or more embodiments.
Figure 5B:
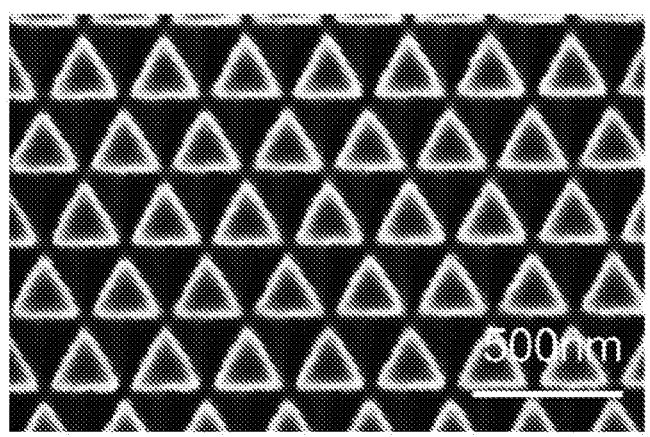
FIG. 5B is a scanning electron micrograph of an example in accordance with one or more embodiments. Scale bar is 500 nm.

FIGS. 5A and 5B are a schematic and scanning electron micrograph according to one or more embodiments described herein in which the pattern of the plurality of structures is a hexagonal rectilinear array of triangular prisms of ZnO with (002)-orientation. In one or more embodiments, the pattern may possess three-fold rotational symmetry, but is not limited to this degree of symmetry. The three-fold rotational symmetry may selectively generate a harmonic signal while other higher order effects are suppressed.

Figure 5C:
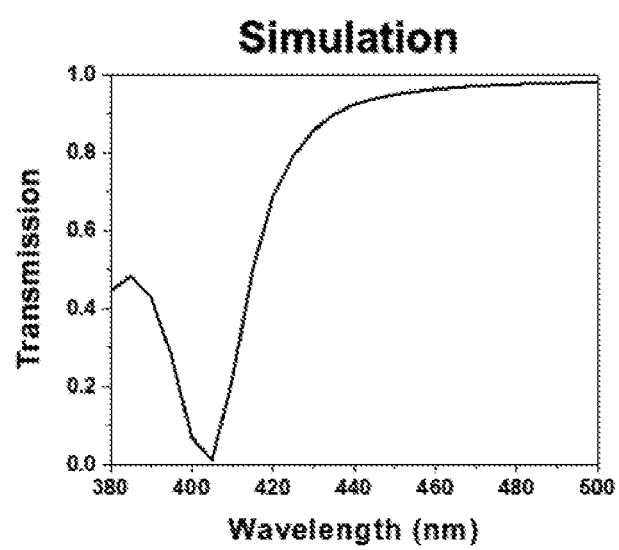
FIG. 5C is a graph of simulated relative transmission spectrum according to one or more embodiments.
Figure 5D:
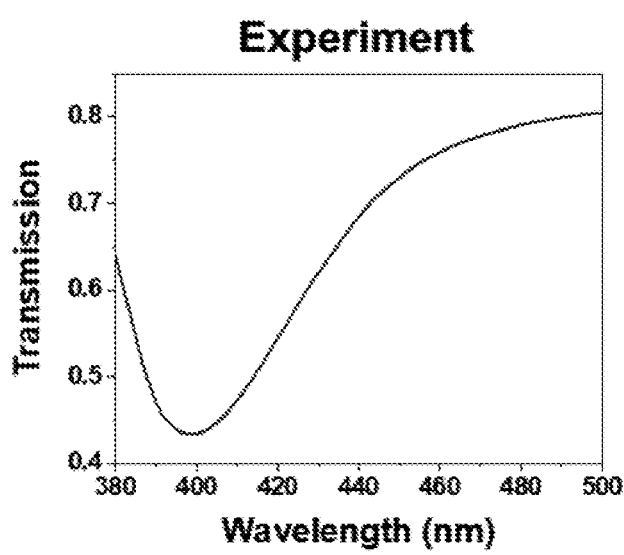
FIG. 5D is a graph of experimental relative transmission spectrum according to one or more embodiments.

FIGS. 5C and 5D, respectively, are graphs of simulated and experimental relative transmission spectrum according to one or more embodiments described herein. The excitation light may be circularly polarized. Furthermore, the size of the nanotriangles may be designed to produce a resonance close to the specific excitation wavelength. However, in principle the method may apply to other wavelengths as well. The size, shape, and composition of the triangular prisms and pitch of the hexagonal array may be tuned to control the center wavelength of the magnetic dipole mode of the triangular prism structure. The center wavelength of the magnetic dipole mode is around 394 nm, but is not particularly limited to this wavelength range. In one or more embodiments, the center wavelength of the magnetic dipole mode may be greater than 100 nm and less than 560 nm, but is not particularly limited to this wavelength range. In one or more embodiments, the center wavelength of the magnetic dipole mode may be between 150 nm and 500 nm, or between 200 nm and 450 nm. In one or more embodiments, the center wavelength of the magnetic dipole mode may be less than 100 nm or greater than 560 nm. The center wavelength of the magnetic dipole mode may be centered or offset from the wavelength of incident light.

Figure 6A:
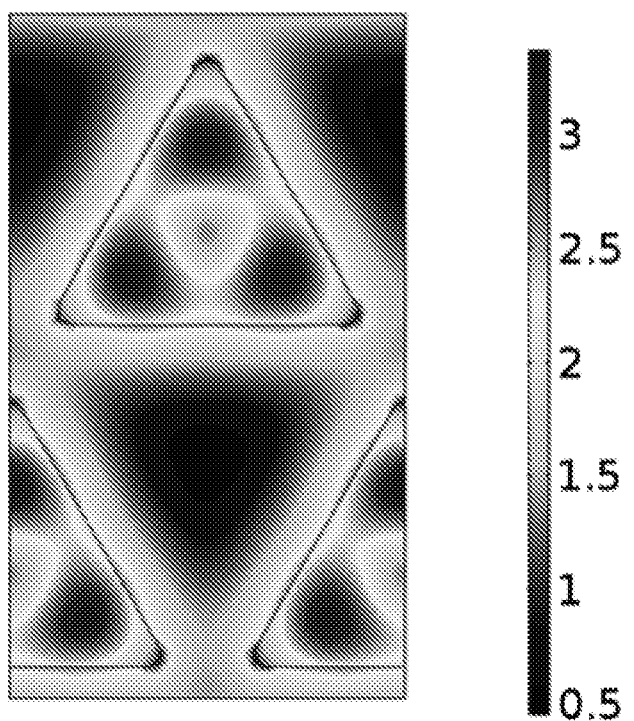
FIG. 6A is a graph of the simulated electric field enhancement according to one or more embodiments.

FIG. 6A is a graph of the electric field enhancement within an individual structure according to one or more embodiments described herein. In one or more embodiments, the magnetic dipole mode may lead to electric field enhancement inside the triangular nanostructures, and therefore may enhance the generated SH signal. In other words, the magnetic dipole mode may create a magnetic hot-spot, i.e., a region of high field intensity, and a closed-loop electric field pattern with electric field enhancements within the individual structure.

Figure 6B:
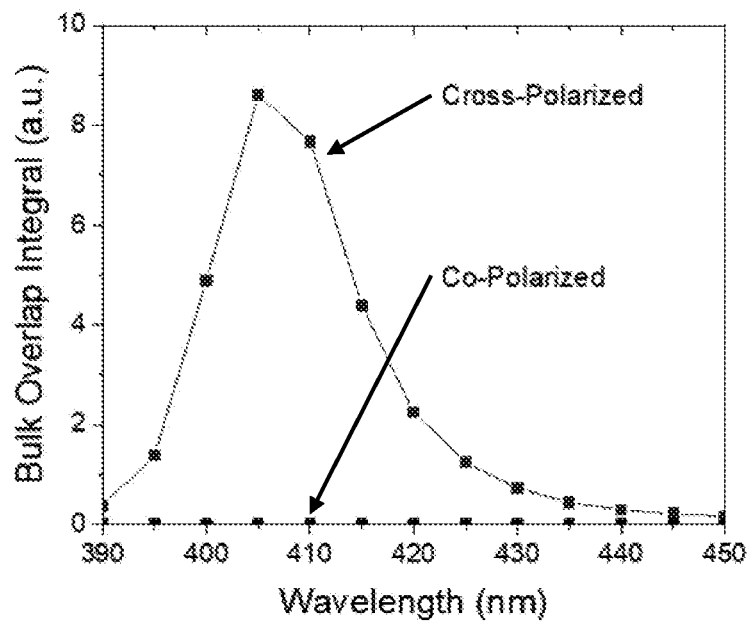
FIG. 6B is a graph of bulk overlap integral versus wavelength according to one or more embodiments.

FIG. 6B is a graph of bulk overlap integral versus wavelength according to one or more embodiments described herein. The bulk overlap integral may be the integral of the overlap of electric field distribution at both the fundamental and the harmonic frequencies. In other words, FIG. 6B shows the overlap integral of the fundamental and SHG fields with respect to wavelength. To calculate the overlap integral, the overlap of electric field distribution at both the fundamental and second harmonic frequencies may be calculated. The bulk overlap integral may be a figure of merit for predicting the strength of the produced harmonic signal.

In one or more embodiments, the harmonic signal may be cross-polarized with respect to the incident light on the metasurface (i.e., the produced nonlinear signal may have the inverse polarization with respect to the excitation signal). In other words, in one or more embodiments, if the incident light is right-hand circularly polarized and the harmonic signal is left-hand circularly polarized. Furthermore, the phase of the generated SHG signal may be precisely manipulated by rotating the nanostructure with certain angles, as explained below.

Figure 6C:
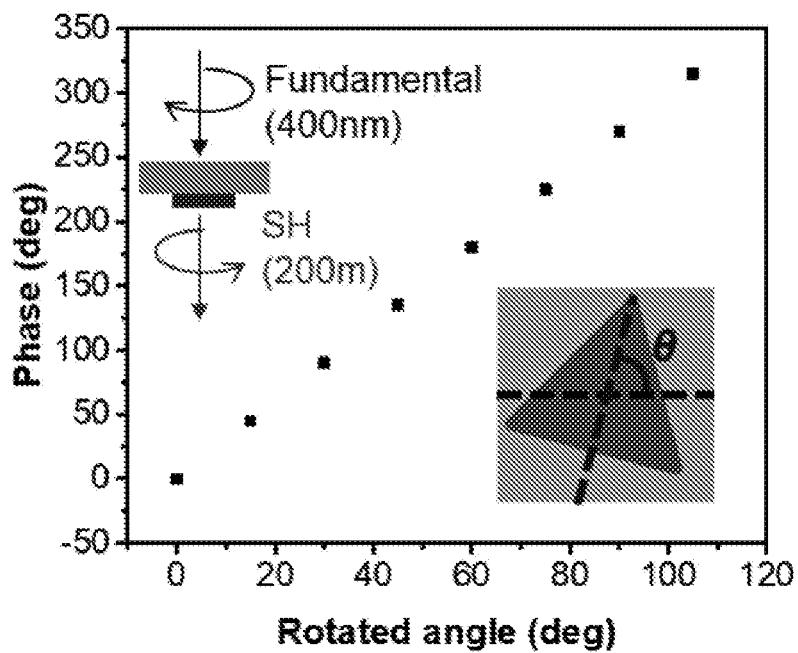
FIG. 6C is a graph of phase versus rotated angle according to one or more embodiments.

FIG. 6C is a graph of phase versus rotated angle according to one or more embodiments described herein. In one or more embodiments, the phase and polarization of the harmonic signal can be precisely manipulated by rotating the triangular prism. The wavefront of the harmonic signal may be controlled and focused by patterning the triangular prisms with different rotation angles. In one or more embodiments, the plurality of structures may have different size, shape, or orientation, but are not particularly limited to these differences in structure. Furthermore, this process can also be used to control the polarization state of the SHG signal.

Figure 7A:
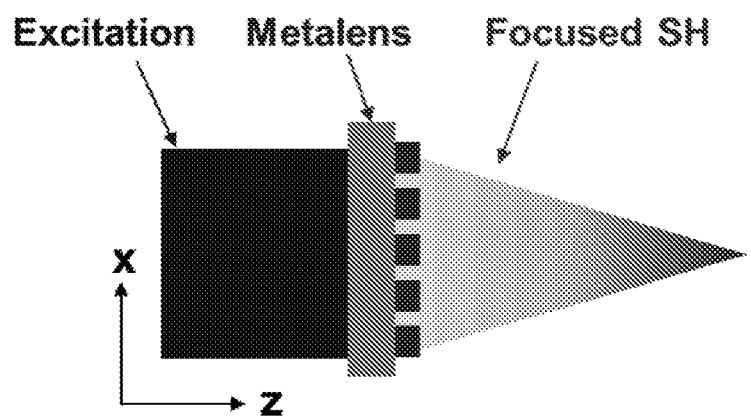
FIG. 7A is a schematic of a harmonic light-generating metasurface acting as a metalens according to one or more embodiments.

FIG. 7A is a schematic of a harmonic light-generating metasurface acting as a metalens according to one or more embodiments described herein. In one or more embodiments, the metasurface is illuminated from a side of the base substrate opposite an opposing side on which the plurality of structures are disposed, but is not limited to this illumination configuration. The phase of the transmitted harmonic signal is controlled such that the harmonic signal generated by the metasurface is focused in the direction of transmission. In one or more embodiments, the phase of the reflected harmonic signal is controlled such that the harmonic signal generated by the metasurface is focused in the direction of reflection.

Figure 7B:
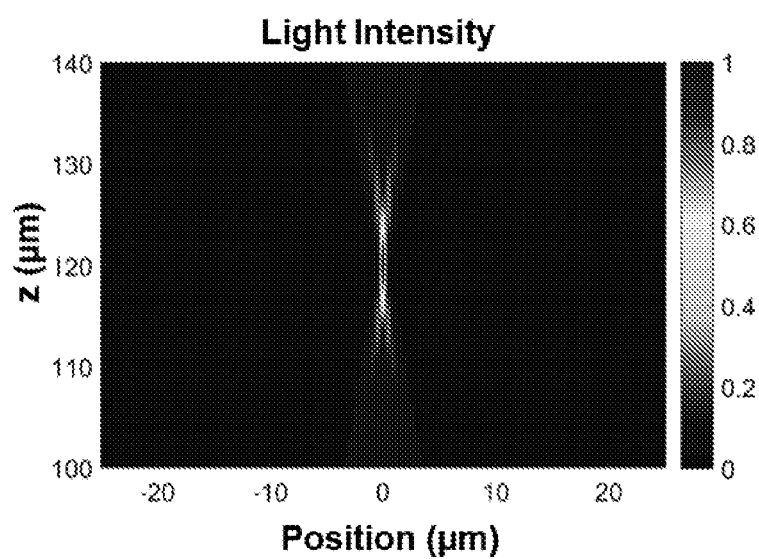
FIG. 7B is a graph of the simulated focusing profile according to one or more embodiments.

FIG. 7B is a graph of the simulated focusing profile according to one or more embodiments described herein. In one or more embodiments, the diameter and focal length of the metasurface can be controlled to define a numerical aperture of the metasurface acting as a metalens or flat lens. The metasurface may have a diameter of 50 μm and focal length of 120 μm, achieving a numerical aperture of 0.2, but is not particularly limited to these metasurface diameter, focal length, or numerical aperture values. In one or more embodiments, variations of the size and particle arrangement in the metasurface may also be used for manipulation of the numerical aperture and focal length.

Figure 7C:
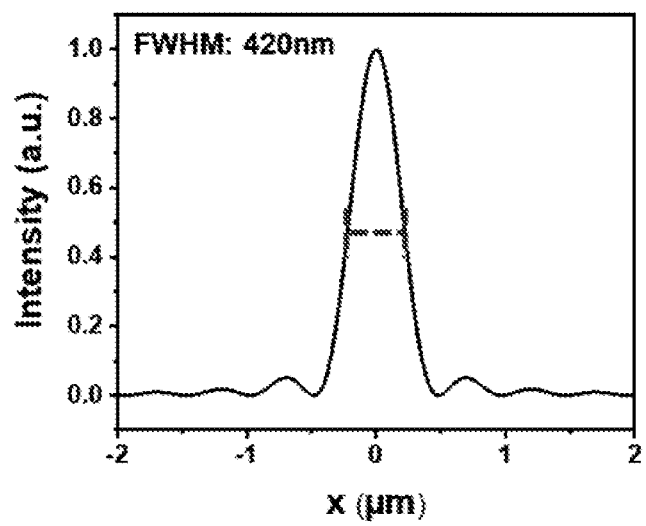
FIG. 7C is a graph of the simulated focusing profile with respect to the x-axis according to one or more embodiments.
Figure 7D:
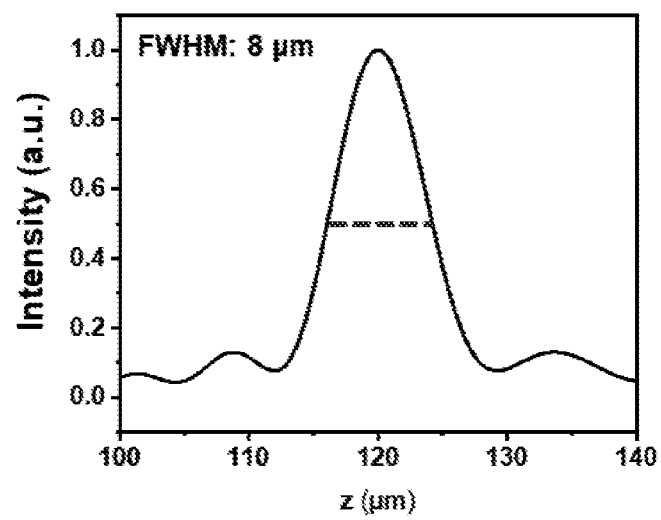
FIG. 7D is a graph of the simulated focusing profile with respect to the z-axis according to one or more embodiments.

FIGS. 7C and 7D, respectively, are graphs of the simulated focusing profile with respect to the x-axis and z-axis according to one or more embodiments described herein. In one of more embodiments, the x-axis is perpendicular and the z-axis is parallel to an optical axis of a second harmonic signal, but is not limited to this configuration. The full width half max (FWHM) of the focused second harmonic signal along the x-axis may be 420 nm, but is not limited to this value. The full width half max (FWHM) of the focused second harmonic signal along the z-axis may be 420 nm, but is not limited to this value.

In one or more embodiments, the harmonic light-generating metasurface may replace conventional light sources as a simple, solid-state alternative. For example, one possible application would be a VUV light source for plastic photo degeneration. However, the harmonic light-generating metasurface may be used in any appropriate applications that requires the generation of a harmonic signal.

A harmonic light-generating metasurface in accordance with one or more embodiments may have one or more novelties and/or advantages including: producing a nonlinear metalens that can generate and focus SHG light; extending THG into the VUV regime. This is of particular importance in the ultraviolet and VUV because of the lack of high end optical components in this wavelength regime. However, the harmonic light-generating metasurface may be used to generate a harmonic signal at any appropriate wavelength using one or more of the design parameters discussed above and any combination thereof.

In one or more embodiments, the major step to be involved in the realization of A harmonic light-generating metasurface include: design, nanofabrication, and characterization.

In one or more embodiments, design of the harmonic light-generating metasurface may be achieved by performing one or more linear and/or nonlinear simulations (e.g., finite element method or finite difference time domain method) in order to understand the interaction of the harmonic light-generating metasurface with incident and generated harmonic light. Subsequently, the design of the harmonic light-generating metasurface may be optimized based on the simulated performance.

In one or more embodiments, nanofabrication of the harmonic light-generating metasurface may be achieved by using focused ion beam milling (e.g., with a FEI Helios 660 Nanolab) as described above. However, other fabrication techniques are available (e.g., etching).

In one or more embodiments, characterization of the harmonic light-generating metasurface may be achieved by using scanning electron microscopy and linear transmission spectroscopy to ensure the quality of the harmonic light-generating metasurface. Furthermore, the SHG spectrum may be measured in addition to the focal length of the lens.

In one or more embodiments, the harmonic light-generating metasurface may works within a wavelength window (around 380 nm to 450 nm for the excitation wavelength, corresponding to a harmonic wavelength of 190 nm to 225 nm) based on the design of the harmonic light-generating metasurface. This operational window may be tuned based on the geometric design. However, it may be difficult to make a single metalens more broadband. More sophisticated structures could be designed to support higher field enhancement and more efficient nonlinear generation. For example, the tunability into the VUV is limited by the bandgap of ZnO (around 3.1 to 3.4 eV9, depending on fabrication).

In one or more embodiments, a harmonic light-generating metasurface may be an efficient way for not only generating but also manipulating properties of the output SHG signal. Applications of the invention and the working principle can be further extended to novel and important applications, such as polarization control, beam steering, and SHG imaging. Furthermore, changing the geometry can be an effective tool to change the resonance position and possibly enhance efficiency as well. It is also possible to change the nonlinear material, and/or to switch from SHG to THG.

Generation of Vacuum Ultraviolet Light Using Third Harmonic Generation

In one of more embodiments, the harmonic light-generating metasurface may be used for ultraviolet light generation using second harmonic generation (SHG) and third harmonic generation (THG). The concept presented here may rely on an all-dielectric harmonic light-generating metasurface to confine light within nanostructures to enhance nonlinear effects. However, unlike SHG, there is no symmetry breaking requirement for THG. This significantly increases the pool of potential materials that may be used. Titanium dioxide ($TiO_2$) may be an ideal material because of its transparency in the visible regime (e.g., 400 nm to 750 nm) and relatively high refractive index (~2.5). Furthermore, the harmonic light-generating metasurface may be used for THG into the ultraviolet. For example, an all-dielectric $TiO_2$ metasurface design can generate third harmonic light. The THG signal may be throughout large portions of the vacuum ultraviolet (VUV) regime (100-200 nm), however the THG signal is not particularly limited to any wavelength regime.

In order to demonstrate how the harmonic light-generating metasurface design can be used to tune the produced third harmonic wavelength through large portions of the VUV, two non-limiting examples using a simple metasurface design are described below. Each example comprises a square array of disc shaped nanostructures disposed on a substrate.

Figure 8A:
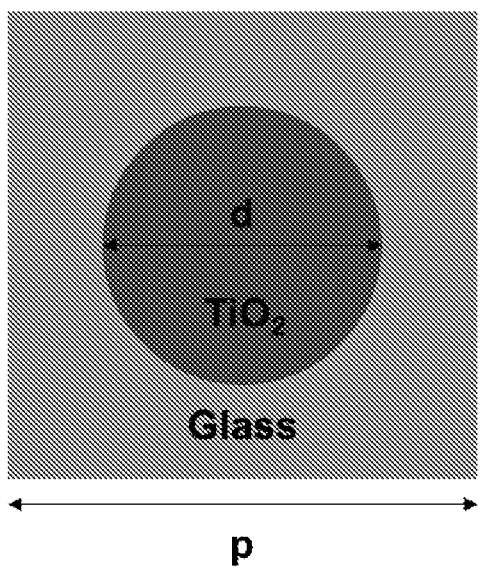
FIGS. 8A-8C are schematics according to one or more embodiments.
Figure 8B:
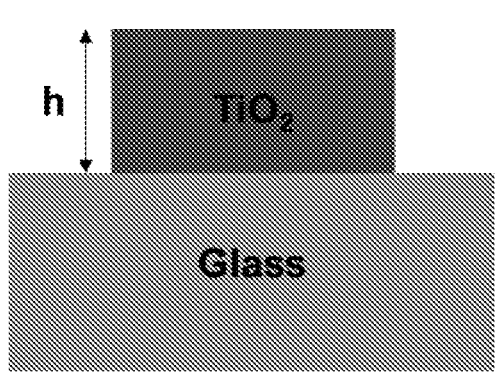
Figure 8C:
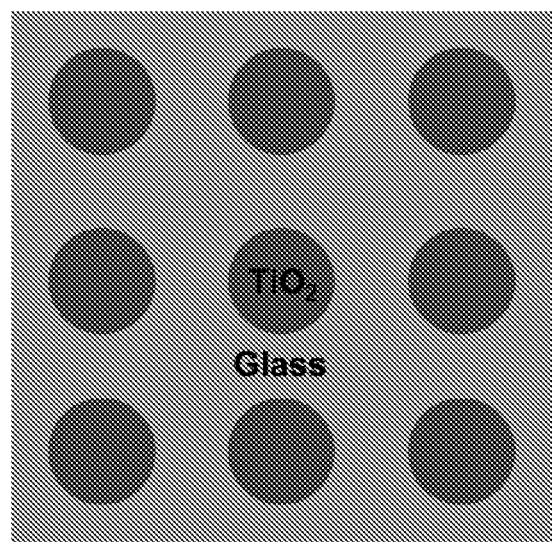

FIGS. 8A-8C are schematics according to one or more embodiments described herein in which in which the nonlinear material is a patterned, two-dimensional periodic array of $TiO_2$ nanoresonators for generating a third harmonic signal. The harmonic light-generating metasurface may comprises a square array of cylindrical discs of diameter d and height h in a square unit cell of side length (unit cell period) p. In one or more embodiments, the patterned structure of a unit cell may be a square, a triangular, a dimer, a trimer, an n-mers, or the like. The square array is designed with a pitch p along an x-axis and a y-axis, wherein the x-axis and y-axis are perpendicular. Depending on the disc diameter d, the unit cell period p, and the disc height h, the resonance behavior of the harmonic light-generating metasurface can be manipulated.

In one or more embodiments, the pattern of the plurality of structures may be: rectilinear with orthogonal coordinate axes; rectilinear with non-orthogonal coordinate axes (e.g., hexagonal coordinate axes); polar (i.e., based on polar coordinate axes); an irregular pattern; or a three dimensional pattern, but is not particularly limited to these patterns. In one or more embodiments, the plurality of structures are uncovered on the surface and exposed to an environment above the surface. In one or more embodiments, absorption of the generated harmonic signal by the environment above the surface may be minimized by removing absorptive material from the environment above the surface.

Figure 9A:
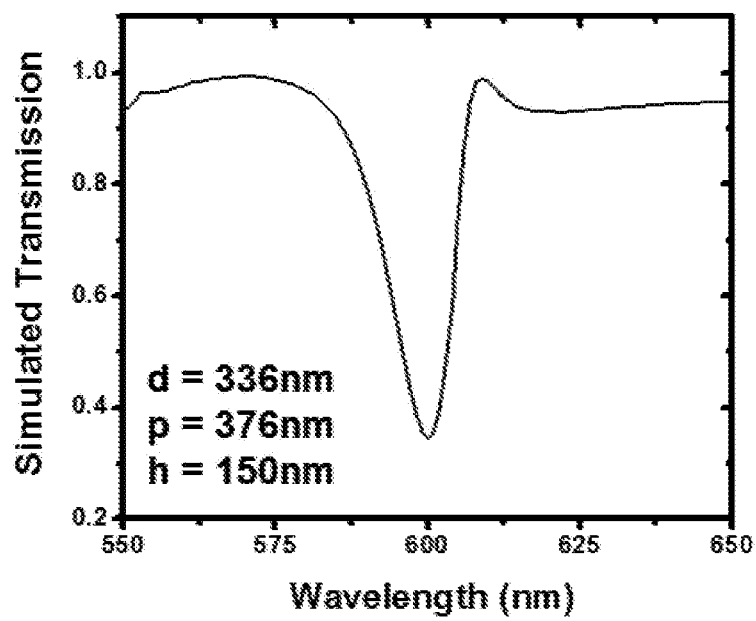
FIGS. 9A-9B are graphs of simulated relative transmission spectrum according to one or more embodiments.
Figure 9B:
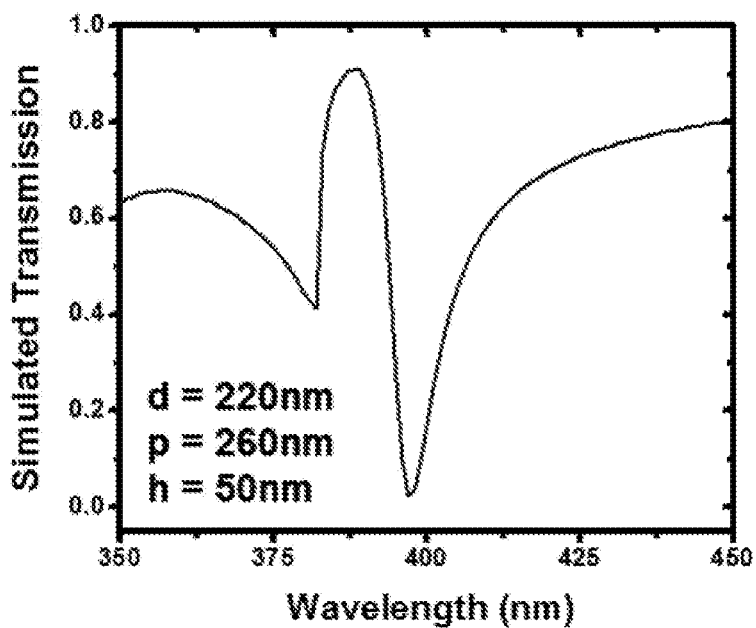

FIG. 9A is a graph of the simulated relative transmission spectrum of an example in accordance with one or more embodiments described herein where d is 336 nm, p is 376 nm, and h is 150 nm. FIG. 9B is a graph of the simulated relative transmission spectrum of an example in accordance with one or more embodiments described herein where d is 220 nm, p is 260 nm, and h is 50 nm. It can be observed that the resonance position between the two geometries can, in this way, be tuned from around 600 to around 200 nm. Similarly, any resonance positon can be achieved by choosing the appropriate values for the three parameters above (i.e., the disc diameter d, the unit cell period p, and the disc height h).

Figure 9C:
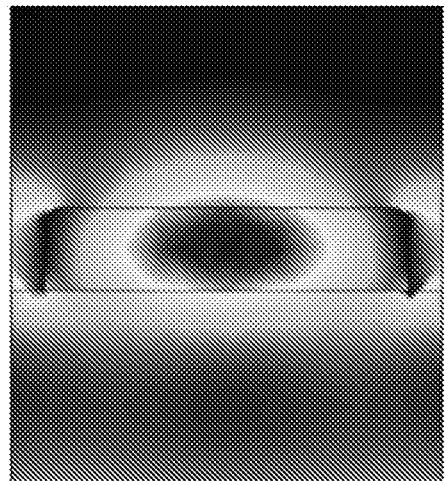
FIGS. 9C-9D are graphs of simulated electric field profiles according to one or more embodiments.
Figure 9C:
Figure 9D:
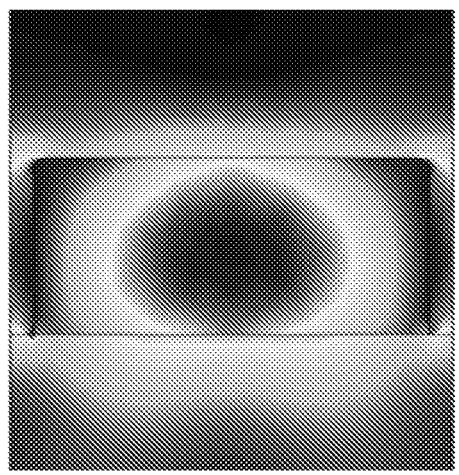
Figure 9D:
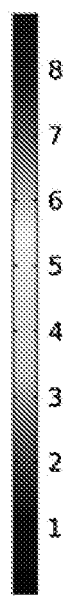

FIGS. 9C and 9D are graphs of simulated electric field profiles of the non-limiting examples described in FIG. 9A and FIG. 9B, respectively. The resonance positions of the magnetic dipole mode in FIGS. 9A and 9B are 606 nm and 398 nm, but are not particularly limited to these wavelengths.

As discussed above, the disc diameter, unit cell period, disc height, disc nonlinear material, and base substrate material may be tuned to control and manipulate the resonance behavior of the metasurface. In one or more embodiments, the center wavelength of the magnetic dipole mode may be greater than 100 nm and less than 1500 nm, but is not particularly limited to this wavelength range. In one or more embodiments, the center wavelength of the magnetic dipole mode may be between 200 nm and 1200 nm, or between 300 nm and 600 nm. In one or more embodiments, the center wavelength of the magnetic dipole mode may be less than 100 nm or greater than 1500 nm. The center wavelength of the magnetic dipole mode may be centered or offset from the wavelength of incident light.

Figure 9E:
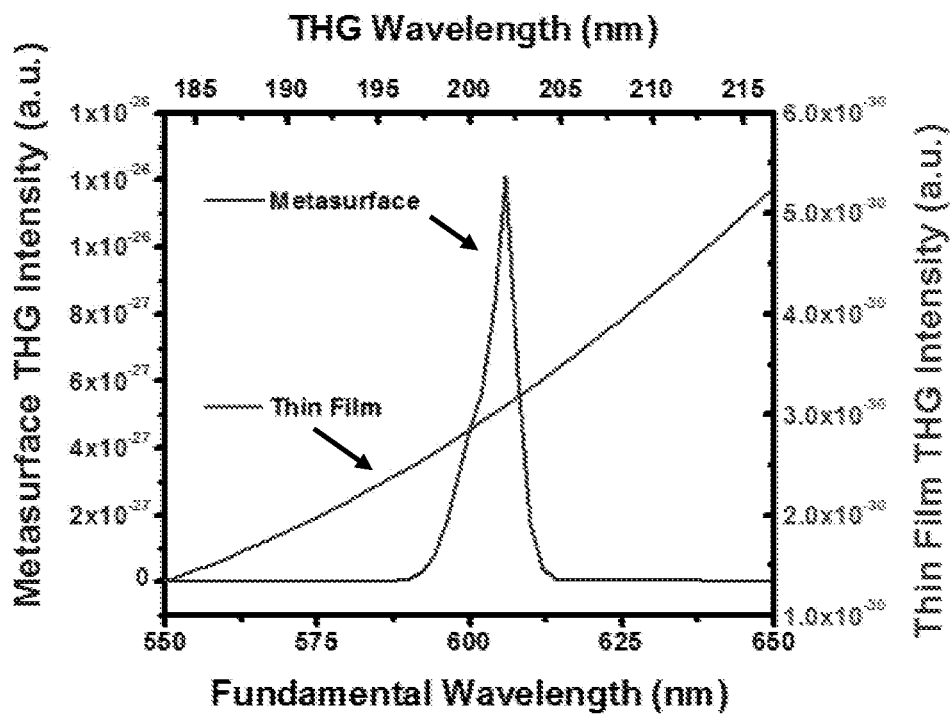
FIGS. 9E-9F are graphs of simulated third harmonic signal intensities according to one or more embodiments and comparative examples of unstructured thin films.
Figure 9F:
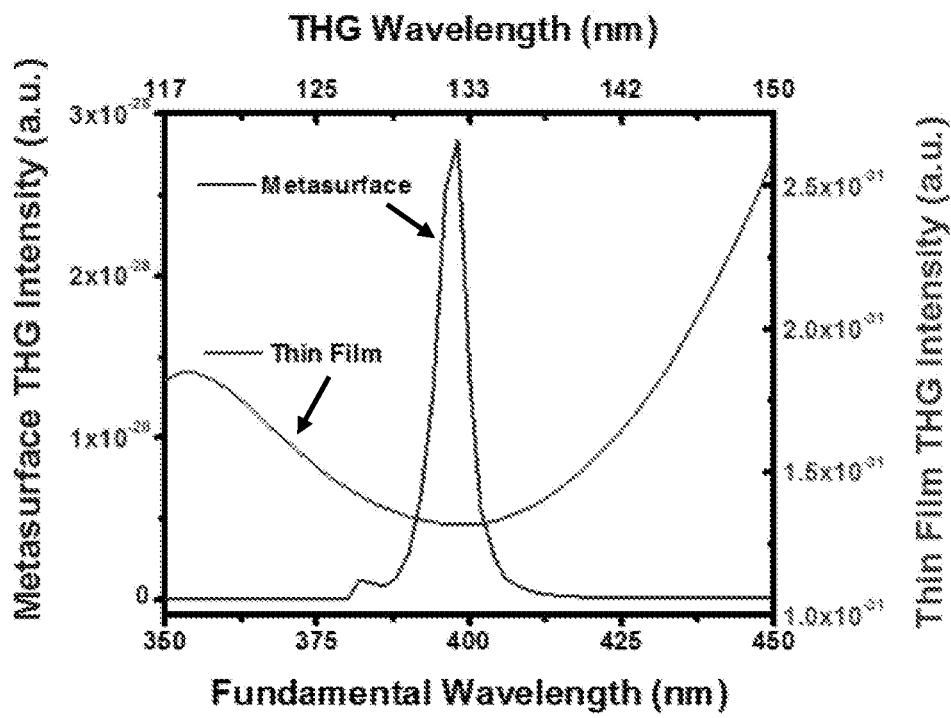

FIGS. 9E and 9F are graphs of simulated third harmonic signal intensities of the nonlimiting examples described in FIGS. 9A and 9B, respectively. The third harmonic signal intensity for each nonlimiting example is compared to a comparative example of an unstructured thin film of the same nonlinear material with a thickness equivalent to the height of the structure in each nonlimiting example. The intensity may be calculated as squares of the overlap integral between the fundamental and harmonic wavelength. The intensity may be used as a figure of merit to determine the strength of the harmonic signal at the harmonic wavelength.

It can be clearly observed in each case that the harmonic light-generating metasurface produces a peak around the resonance wavelength, with intensity values several orders of magnitude larger than the unstructured thin film. While it is difficult to accurately predict the exact strengths of the nonlinear signals in experiment, this gives an indication of a significant THG enhancement. Furthermore, the associated THG wavelengths are plotted as a top x-axis in FIGS. 9E and 9F. With excitation at the respective resonance wavelengths, THG wavelengths of about 201 nm and 133 nm are predicted. As mentioned above, by making appropriate choices of the geometric parameters (d, p, h) this concept can be readily extended to any wavelength between these two example values and beyond. In this way, one or more embodiments of the invention include a design strategy to produce light with wavelengths throughout most of the VUV spectrum.

Furthermore, by changing the geometry of the harmonic light-generating metasurface, and at the same time adjusting the excitation wavelength accordingly, the THG wavelength can be tuned further into the VUV. However, if the energy of the excitation photons reaches the band gap of ZnO significant losses may be expected. This may limit how far into the VUV a ZnO metamaterial concept can be extended. In particular, it may be around 3.1 to 3.4 eV, depending on the fabrication method. This may limit the produced VUV wavelength to remain above about 182 nm. In one or more embodiments, this cutoff may be extended by increasing the bandgap of the ZnO by manipulating fabrication parameters. However, an alternative method may be to switch to THG. For example, $TiO_2$ has a similar band gap to ZnO, about 3.2 to 3.4 eV, again depending on the fabrication method. This leads to a similar lower limit in the pump wavelength for $TiO_2$ compared to ZnO, but the produced VUV wavelength limit may be about 122 nm in this case. In this way, almost the whole VUV range can be covered.

In one or more embodiments, each individual structure may support a mode that interacts or hybridizes with the magnetic dipole mode to generate a high-order multi-pole mode, for example a Fano resonance, anapole resonance, and/or a supercavity mode. A higher-order multi-pole mode may more strongly confine electromagnetic fields and generate more intense electromagnetic field enhancements to more efficiently generate the harmonic signal. A higher-order multi-pole mode may result from the interference of two scattering modes that may not include a magnetic dipole mode.

In one or more embodiments, the harmonic light-generating metasurface may be included in an UV optical system comprising a pump laser. The pump laser may have a fundamental wavelength of 560 nm or less, but is not particularly limited to this range. The UV optical system may be used to generate an UV wavefront or complex UV radiation pattern for applications in nanopatterning, nanofabrication, or as a table-top UV light source, but is not particularly limited to these applications.

In one or more embodiments, the harmonic light-generating metasurface may be included in an UV optical system comprising a pump laser and a spectrometer. The spectrometer may have a sensitive wavelength range comprising the UV wavelength range, a broader UV wavelength range, a visible wavelength range, a near-infrared, and/or an infrared wavelength range, but is not particularly limited to these ranges.

In one or more embodiments, the harmonic light-generating metasurface may be included in an UV optical system comprising a mirror, filter, lens, monochromator, photomultiplier tube, UV-sensitized detector, solid state detector, lock-in amplifier, optical chopper, or the like.

In one or more embodiments, the harmonic light-generating metasurface may be included in an UV optical system, wherein an ambient atmosphere around the system has access to a first optical path of the pump laser and a second optical path of a harmonic signal generated by the metasurface. The first optical path may be the space between the pump laser and harmonic light-generating metasurface. The second optical path may be the space between the harmonic light-generating metasurface and a housing of the system. In one or more embodiments, ambient atmosphere around the system may be excluded from the first and second optical paths by a sealed chamber or sealed vacuum chamber.

In another aspect, embodiments described herein relate to a method of manufacturing a harmonic light-generating metasurface. The method may comprise: disposing a film of nonlinear material on a side of a substrate; and patterning the film to create a plurality of structures on a surface of the base substrate. Each structure of the plurality of structures individually supports a magnetic dipole mode or resonance. An electromagnetic field enhancement of the magnetic dipole mode induces generation of a harmonic signal by the plurality of structures.

In one or more embodiments, patterning the film comprises milling the film with a focused laser beam or ion beam. In a non-limiting example, a 150 nm thick film of nonlinear material (e.g., ZnO or $TiO_2$) may be sputtered, evaporated, or disposed in a suitable manner onto a silica base substrate. A 5 nm Cr layer, as a conductive layer for nanofabrication, may be evaporated onto the nonlinear material film. The nonlinear material film may be patterned with a focused ion beam system (e.g., FEI Helios 660

NanoLab). To define the plurality of structures, a commercial software (e.g., NPGS (Nabity Lithography Systems)) may precisely control the scan path of the milling beam. The beam current may be 51 pA with an accelerating voltage of 30 kV. The ion beam dose of the milling beam (e.g., a gallium ion beam) applied to the surface may be 23 µC/cm$^3$. The film thicknesses, depositing techniques, software, beam currents, accelerating voltage, beam ion, and beam dose are not particularly limited to those described herein. The remaining Cr on the surface of the patterned structures may not significantly affect the electromagnetic fields of the patterned structures.

In one or more embodiments, the nonlinear material film may be imprinted by a structured template stamp, embossed die, or the like to pattern the plurality of structures. In one or more embodiments, the nonlinear material film may be patterned by CMOS fabrication processes, laser ablation, laser nanofabrication, nanoimprinting, nanostencil lithography techniques, but is not particularly limited to these techniques.

Example of Generating Third Harmonic Vacuum Ultraviolet Light with a TiO2 Harmonic Light-Generating Metasurface Dielectric metasurfaces may provide an excellent platform for the harmonic generation of light, due to their low optical absorption and to the strong electromagnetic field enhancement that can be designed into their constituent meta-atoms. In one or more embodiments, ultraviolet (VUV) third harmonic generation may be achieved from a designed dielectric harmonic light-generating metasurface comprising a titanium dioxide (TiO2) nanostructure array. The harmonic light-generating metasurface may be designed to enhance the generation of VUV light at a wavelength of 185 nm by tailoring its geometric design parameters to achieve an optical resonance at the fundamental laser wavelength of 555 nm. The harmonic light-generating metasurface may exhibit an enhancement factor of nominally 180 compared to an unpatterned $TiO_2$ thin film of the same thickness, evidence of strong field enhancement at the fundamental wavelength. Mode analysis reveals that the origin of the enhancement may be an anapole resonance or another other appropriate resonance or combination of resonances near the pump wavelength. Thus, one or more embodiments of the present invention may provide an effective strategy for the compact generation of VUV light that could enable expanded access to any useful region of the electromagnetic spectrum.

Electromagnetic radiation with wavelengths between 100 and 200 nm is known as vacuum ultraviolet (VUV) light, since this is a wavelength region where the molecular components of the terrestrial atmospheric exhibit strong optical absorption, limiting propagation. There are many important scientific and industrial applications for radiation in this wavelength range (e.g., photoemission, vacuum ultraviolet spectroscopy, photochemistry, photodissociation, photo-assisted chemical vapor deposition, lithographic patterning, and micro/nanofabrication). Conventional coherent sources of VUV light include synchrotrons, excimer lasers, and free electron lasers. In addition, there have been various approaches using high harmonic generation in gases and solids, supercontinuum generation, novel nonlinear crystals, and third harmonic generation (THG) in gases. In general, conventional VUV sources and generation methods require large and expensive laboratory-scale equipment. Compact VUV generation methods compatible with solid-state laser sources would significantly expand the availability of sources of radiation in this wavelength range and, if available, could lead to entirely new applications and technologies.

Dielectric harmonic light-generating metasurfaces allow for the manipulation of the optical phase of light using flat optics consisting of nanopatterned structures and have the potential to revolutionize optics. While dielectric harmonic light-generating metasurfaces may be applied to linear optics and imaging, more recently there has been growing interest in the development of dielectric harmonic light-generating metasurfaces for nonlinear optics. Although nonlinear dielectric harmonic light-generating metasurfaces may convert infrared light to visible wavelengths, there is clear potential for using this approach for optical frequency generation in shorter wavelength regimes. For example, as discussed above, a simple method for VUV light generation and manipulation may utilize second harmonic generation (SHG) in a zinc oxide harmonic light-generating metasurfaces, exploiting a magnetic dipole resonance. Using dielectric harmonic light-generating metasurfaces for harmonic generation has several advantages compared to conventional nonlinear crystals. For example, dielectric harmonic light-generating metasurfaces may not require phase matching and may be designed to support resonances that provide large electric field enhancements at the targeted pump (i.e., excitation) wavelength.

In one or more embodiments, an anapole resonance is exploited as the localized electromagnetic mode to generate the harmonic signal. This nonradiative (i.e., dark) mode arises when a toroidal dipole and an electric dipole mode interfere destructively. Anapole modes provide strong field enhancements in metasurfaces designed for THG. Unlike the second-order susceptibility, which requires materials that lack inversion symmetry, the third order susceptibility is nonzero in virtually all solid-state materials, including amorphous media and liquids. Therefore, many more materials can be considered for the fabrication of THG dielectric metasurfaces compared to SHG metasurfaces. As a non-limiting example, titanium dioxide ($TiO_2$) is a dielectric material that has been used for THG, both as a bulk medium and as a dielectric metasurface at longer wavelengths. $TiO_2$ is well-suited for VUV generation because of its low absorption in the visible regime. Furthermore, $TiO_2$ is an outstanding candidate material for THG metasurface designs with resonances at fundamental wavelengths as short as 400 nm, just below its bandgap of ~3.1 eV, and can potentially be used to generate wavelengths as short as 133 nm. However, any material with an appropriate third order susceptibility may be used.

Figure 9G:
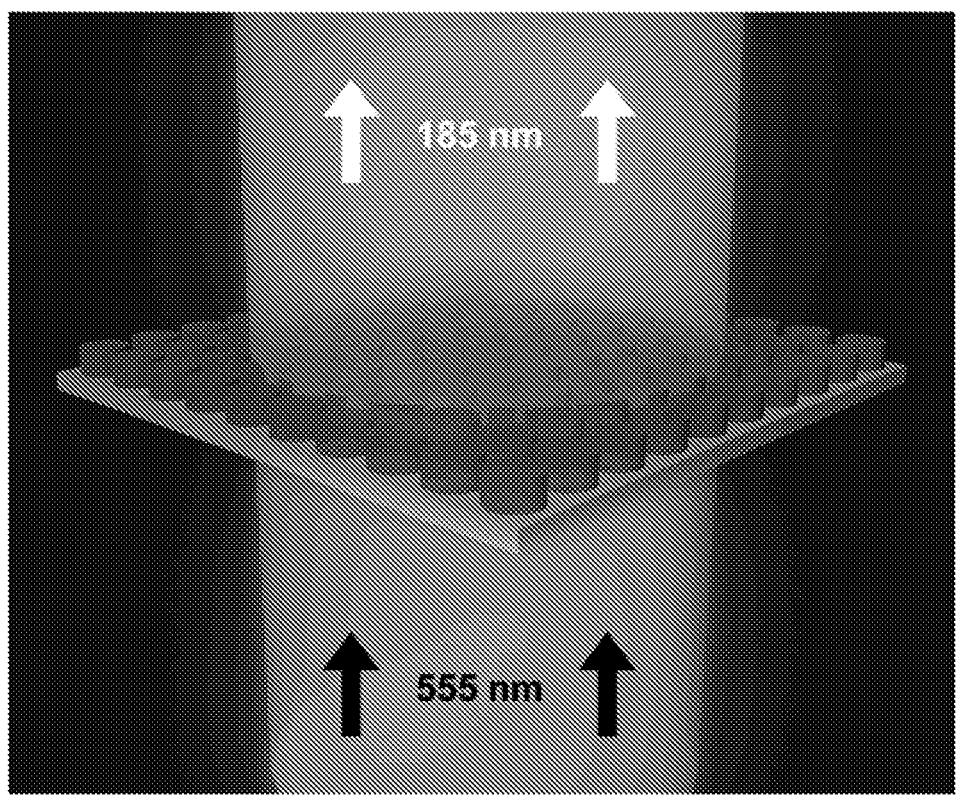
FIG. 9G is a schematic according to one or more embodiments.
Figure 9H:
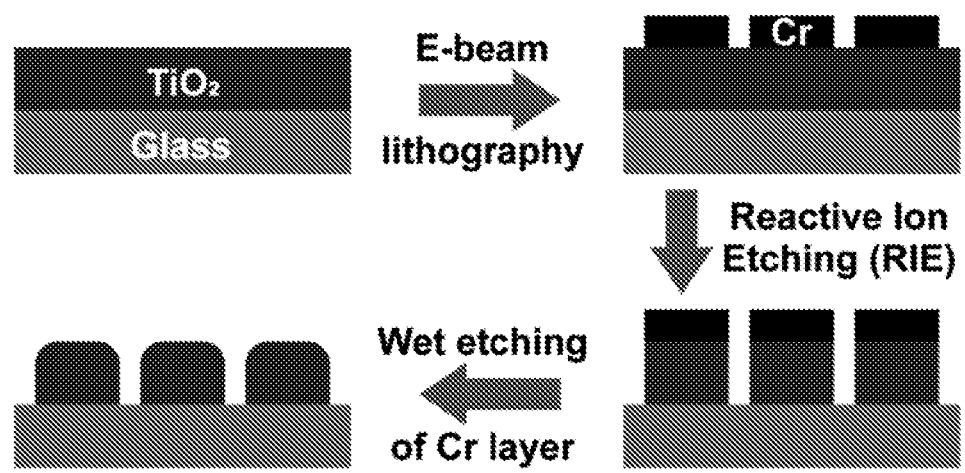
FIG. 9H is a fabrication flowchart according to one or more embodiments.

In one or more embodiments, a $TiO_2$ metasurface for THG for conversion of light at a fundamental wavelength of 555 nm, is used to generate radiation in the VUV at 185 nm. The harmonic light-generating metasurfaces may comprise a square array of cylindrically shaped nanostructures, as shown in FIG. 9G. The harmonic light-generating metasurfaces may be fabricated using a commercially available $TiO_2$ thin film (e.g., 150 nm thick). The nanopatterning may be achieved by first fabricating a chromium mask (e.g., 30 nm thick) on top of the metasurface (e.g., via electron-beam lithography), and subsequent reactive ion etching, as shown in FIG. 9H. Finally, the mask may be removed in a wet etching step (see Example Methods for Generating Third Harmonic Vacuum Ultraviolet Light with a TiO2 Harmonic Light-Generating Metasurface section below for more details on the fabrication process).

Figure 9I:
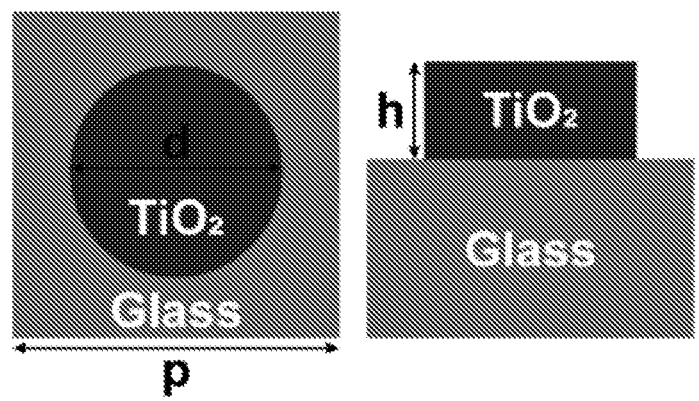
FIG. 9I is a schematic according to one or more embodiments.
Figure 9J:
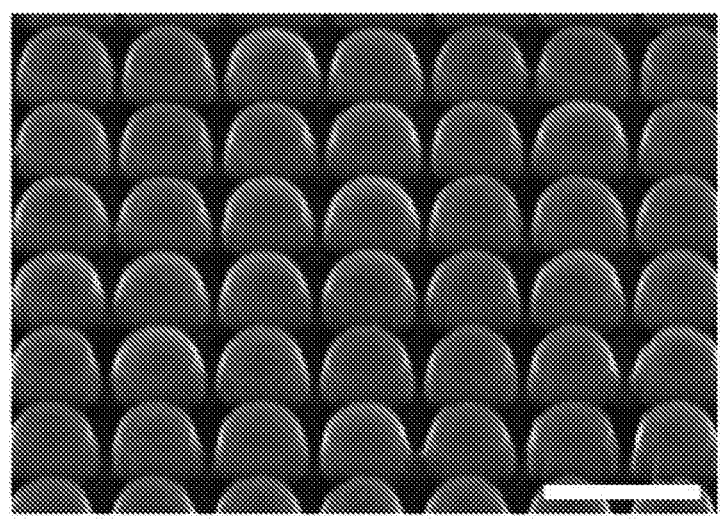
FIG. 9J is a scanning electron micrograph of an example in accordance with one or more embodiments. Scale bar is 500 nm.
Figure 9K:
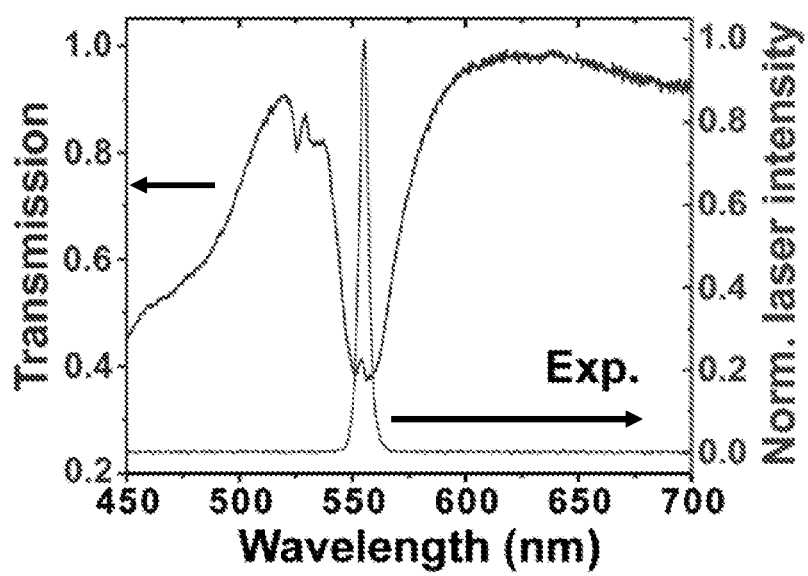
FIG. 9K is a graph of measured transmission versus wavelength according to one or more embodiments.
Figure 9L:
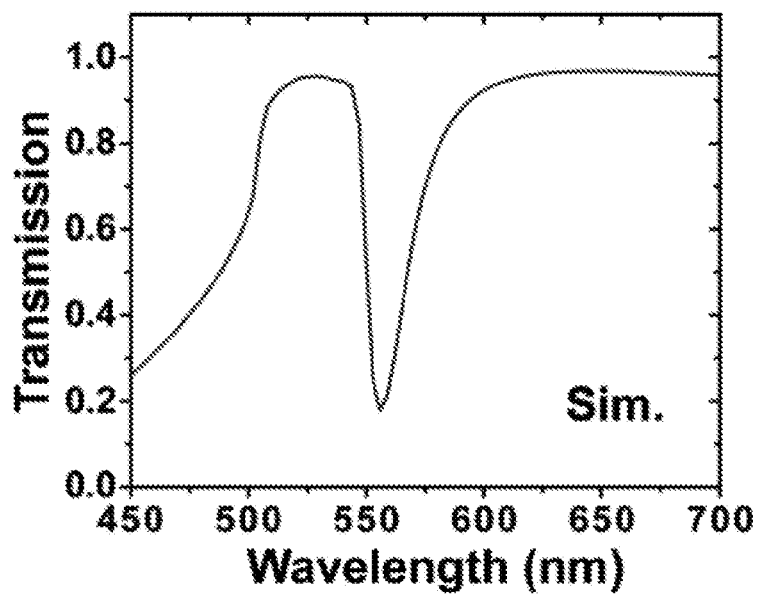
FIG. 9L is a graph of simulated transmission versus wavelength according to one or more embodiments.

A schematic of the harmonic light-generating metasurface unit cell according to one or more embodiments is shown in FIG. 9I. The cylinders may have a diameter of 272 nm. The period in both directions may be 332 nm. The tilted SEM image of a section of the metasurface shown in FIG. 9J reveals that the fabricated cylindrical nanostructures are more dome-like than flat in profile. The scale bar is 500 nm. The effect of this altered geometry may be taken into account in numerical simulations. The experimental (FIG. 9K) and simulated (FIG. 9L) transmission spectra show a strong resonance close to the pump wavelength of 555 nm. In other embodiments, other diameters, pitches, array designs, non-regular designs, non-cylinder geometry, or any combination thereof may be used to achieve the desired resonance at any pump wavelength.

VUV generation may be achieved by focusing an ultrafast laser beam onto the metasurface at normal incidence, however non-normal incidence may also be used. The excitation wavelength may be obtained using an Optical Parametric Amplifier (OPA) pumped by a Ti:Sapphire femtosecond laser. The laser pulses may have a temporal pulse width of 227 fs (full width at half maximum) at a repetition rate of 200 kHz. The center wavelength may be 555 nm; however, an appropriate center wavelength may be used depending on the desired harmonic output wavelength. In this non-limiting example, the wavelength of 555 nm was chosen because the corresponding THG radiation (185 nm) represents the short wavelength detection limit for a photomultiplier tube. Furthermore, propagation in air (a few mm) or $N_2$, without using vacuum, is possible.

Figure 9M:
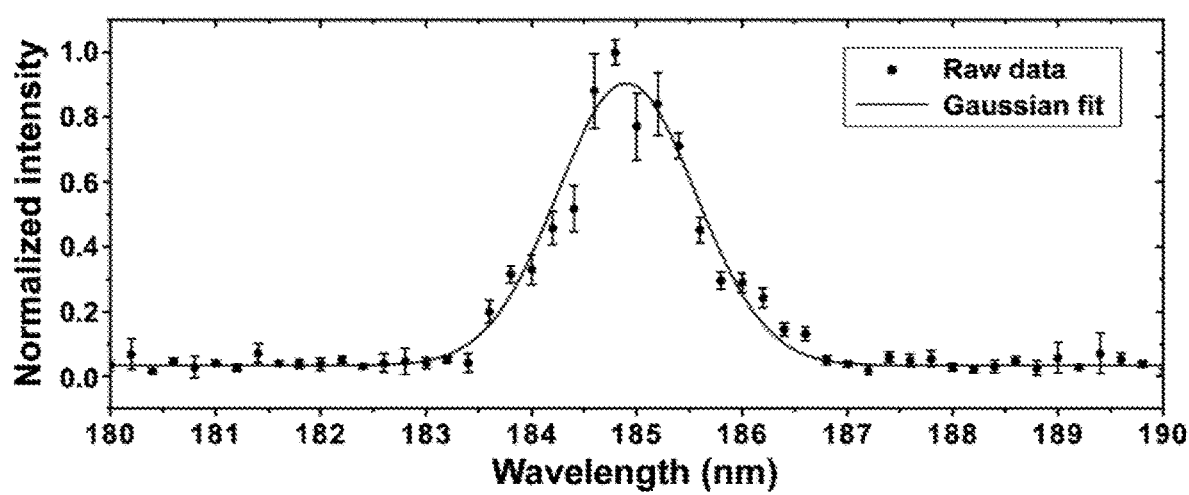
FIG. 9M is a graph of measured normalized intensity versus wavelength according to one or more embodiments.

The laser light may be focused on the harmonic light-generating metasurface using a fused silica lens (e.g., 40 mm focal length), onto the glass substrate side of the metasurface. Focusing onto the harmonic light-generating metasurface from the air side is also possible when collecting the reflected THG output signal. The beam waist diameter of the focused laser spot may be measured (e.g., nominally 21 µm). The transmitted light was collected using an aspheric UV fused silica lens (e.g., 15 mm focal length) and subsequently separated from the remaining pump light for spectral and power-dependent analysis (see Example Methods for Generating Third Harmonic Vacuum Ultraviolet Light with a TiO2 Harmonic Light-Generating Metasurface section below for details on the nonlinear measurements). The VUV spectrum between 180 and 190 nm is shown in FIG. 9M. A clear peak around the expected third harmonic wavelength of 185 nm can be observed when the spectrum was taken at an incident laser power of 1.4 mW. The error bars in FIG. 9M represent the standard deviation between five intensity measurements at each wavelength increment of 0.2 nm.

Figure 9N:
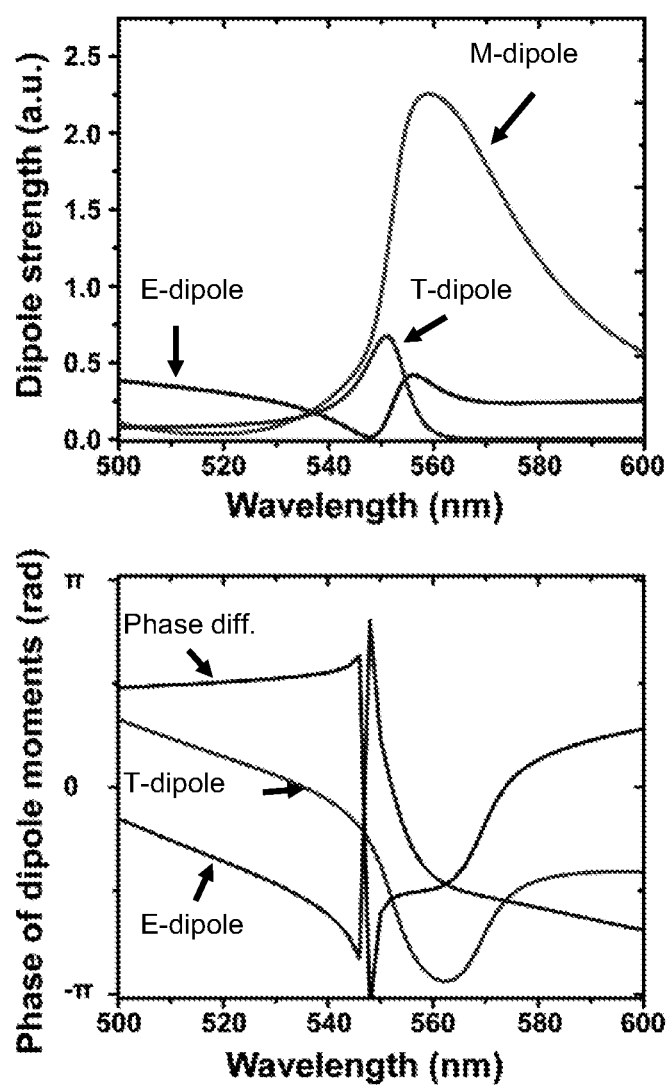
FIG. 9N is a graph of dipole strength and the corresponding phase of the dipole moments according to one or more embodiments.

FIG. 9N shows a detailed mode analysis of the resonances present in the wavelength regime between 500 and 600 nm in accordance with one or more embodiments disclosed herein. The relative strength of the induced dipole moments contributing to the far field radiation may be calculated using a standard mode decomposition technique, as shown in FIG. 9N, top. The dip in the transmission spectrum is due to a strong magnetic dipole mode present from 550 to 580 nm. In addition, a combination of electric and toroidal dipole moments of similar strength is observed close to the fundamental wavelength. The phase difference between the toroidal and electric dipole moments reaches a value close to $-\pi$ at around 550 nm, as shown in FIG. 9N, bottom. This indicates that the two modes interfere destructively, giving rise to an anapole mode.

Figure 9O:
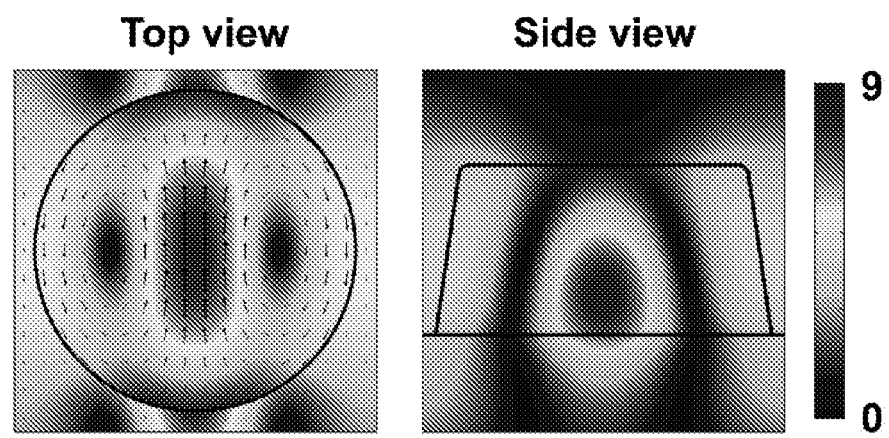
FIG. 9O is a graph of the electric and magnetic field enhancement according to one or more embodiments.
Figure 9O:
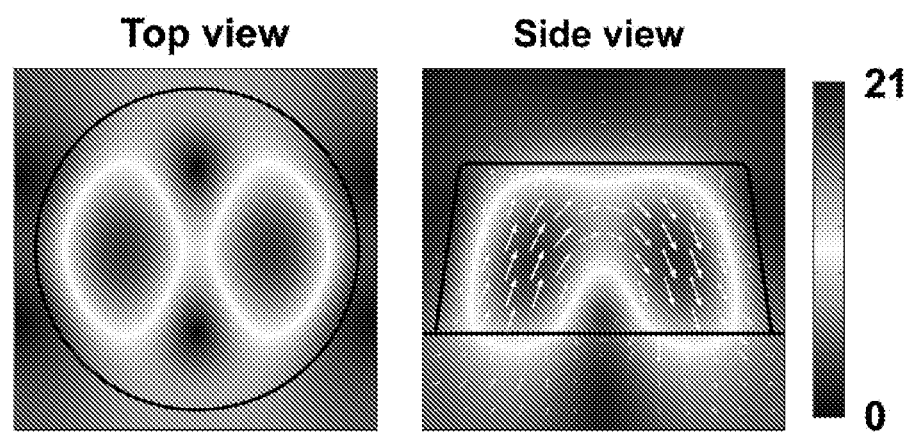

FIG. 9O shows multiple views of electric and magnetic field enhancements of a constituent meta-atom of a harmonic light-generating metasurface in accordance with one or more embodiments disclosed herein. Due to the coexistence of multiple modes at the target wavelength, the maximum field enhancement inside the disc occurs at a slightly larger wavelength than the anapole center wavelength. Though the overlapping magnetic dipole and anapole mode can both contribute to the electromagnetic field confinement inside the discs, the spatial distribution of the field enhancement shows that the dark anapole mode provides the dominant contribution to the large local field enhancement at the fundamental wavelength. At 555 nm, a displacement current, represented by black arrows in the top view of the electric field enhancement, inside the discs forms two circles of opposite directions, which in turn generate a highly curved magnetic field. This field distribution closely matches those of anapole modes. The maximum electric and magnetic field enhancements at the fundamental wavelength may be 9 and 21, respectively. The white arrows in the side view of the magnetic field enhancement plot are magnetic field vectors.

Figure 9P:
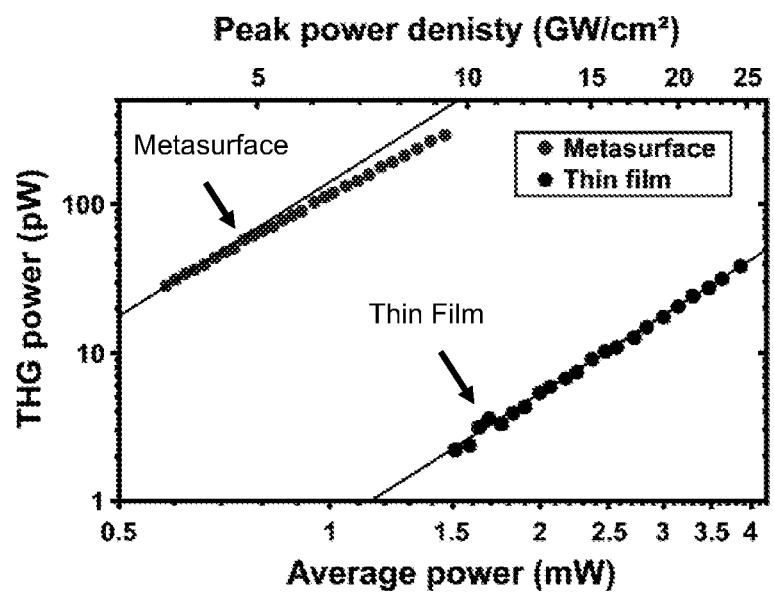
FIG. 9P is a graph of measured third harmonic generation power versus average power according to one or more embodiments.

FIG. 9P shows an experimental THG power dependence of a harmonic light-generating metasurface in accordance with one or more embodiments and an unpatterned thin film in comparison. Specifically, a log-log plot of the THG power of the metasurface and an unpatterned $TiO_2$ thin film with respect to incident pump power varied from 0.58 to 1.5 mW for the metasurface and 1.5 to 3.9 mW for the thin film is shown. The peak power density may be estimated based on the pulse width, repetition rate, and spot size of the fundamental beam. The metasurface strongly enhances the THG signal compared to the unpatterned thin film. The enhancement may be estimated by normalizing the THG power from both the metasurface and the thin film, then dividing the two. For the power ranges shown, the average enhancement was determined to be nominally 180. The normalization was performed by dividing the measured THG power by the average power cubed. The maximum conversion efficiency achieved for the metasurface was $2.0 \times 10^{-7}$ at an average pump power of 1.5 mW (see FIG. 9W below). However, the power dependence of the metasurface, represented by the datapoints, varies significantly from the expected cubic dependence, represented by the solid line, especially at larger peak power densities.

Figure 9Q:
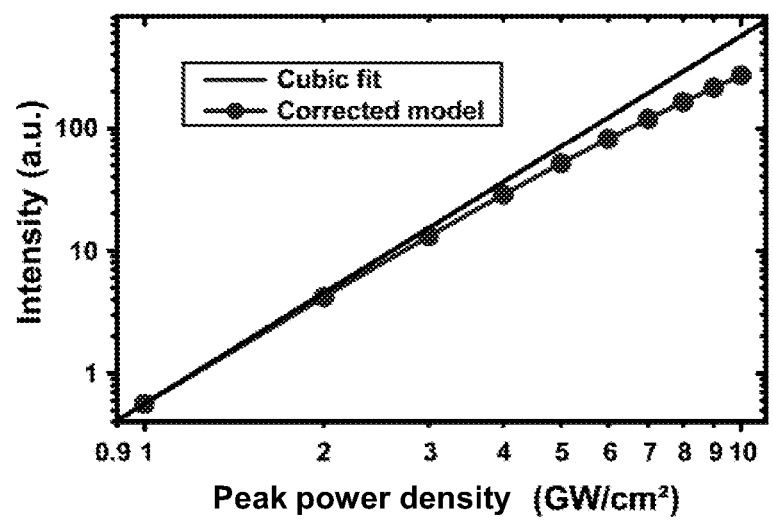
FIG. 9Q is a graph of third harmonic signal intensity versus peak power density according to one or more embodiments.

FIG. 9Q shows a simulated THG power dependence considering both the nonlinear optical properties of $TiO_2$ and the heating-induced refractive index change. The above deviation from the expected cubic dependent can be attributed to a thermally-induced refractive index change, and also to the intrinsic nonlinear optical properties of $TiO_2$. Due to these two effects, the refractive index of $TiO_2$ decreases as the peak power density increases, which in turn causes a wavelength shift of the anapole resonance. This leads to a reduction of the field enhancement at the fundamental wavelength, resulting in the observed sub-cubic dependence of the THG signal with respect to the pump power.

Figure 9R:
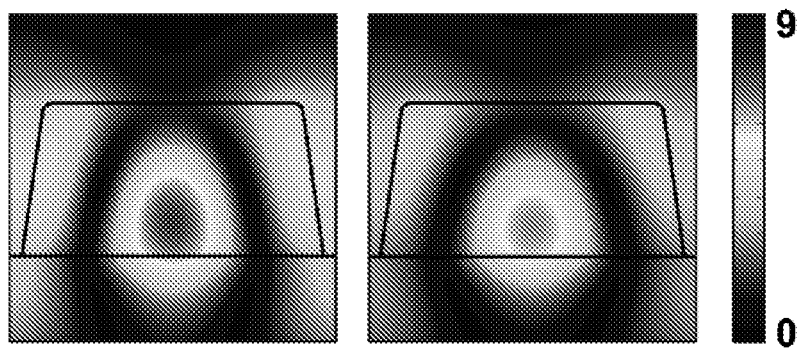
FIG. 9R is a graph of electric field enhancement with (top right) and without (top left) thermal corrections and the corresponding temperature distribution according to one or more embodiments.
Figure 9R:
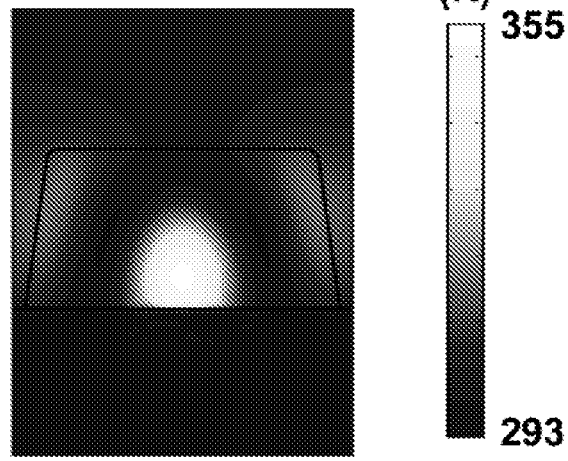

FIG. 9R shows the effect of above corrections on the electric field enhancement (top) and a simulated temperature distribution (bottom) in a unit cell of a harmonic light-generating metasurface in accordance with one or more embodiments disclosed herein. Further simulation details can be found in the Example Methods for Generating Third Harmonic Vacuum Ultraviolet Light with a $TiO_2$ Harmonic Light-Generating Metasurface section below.

Figure 9S:
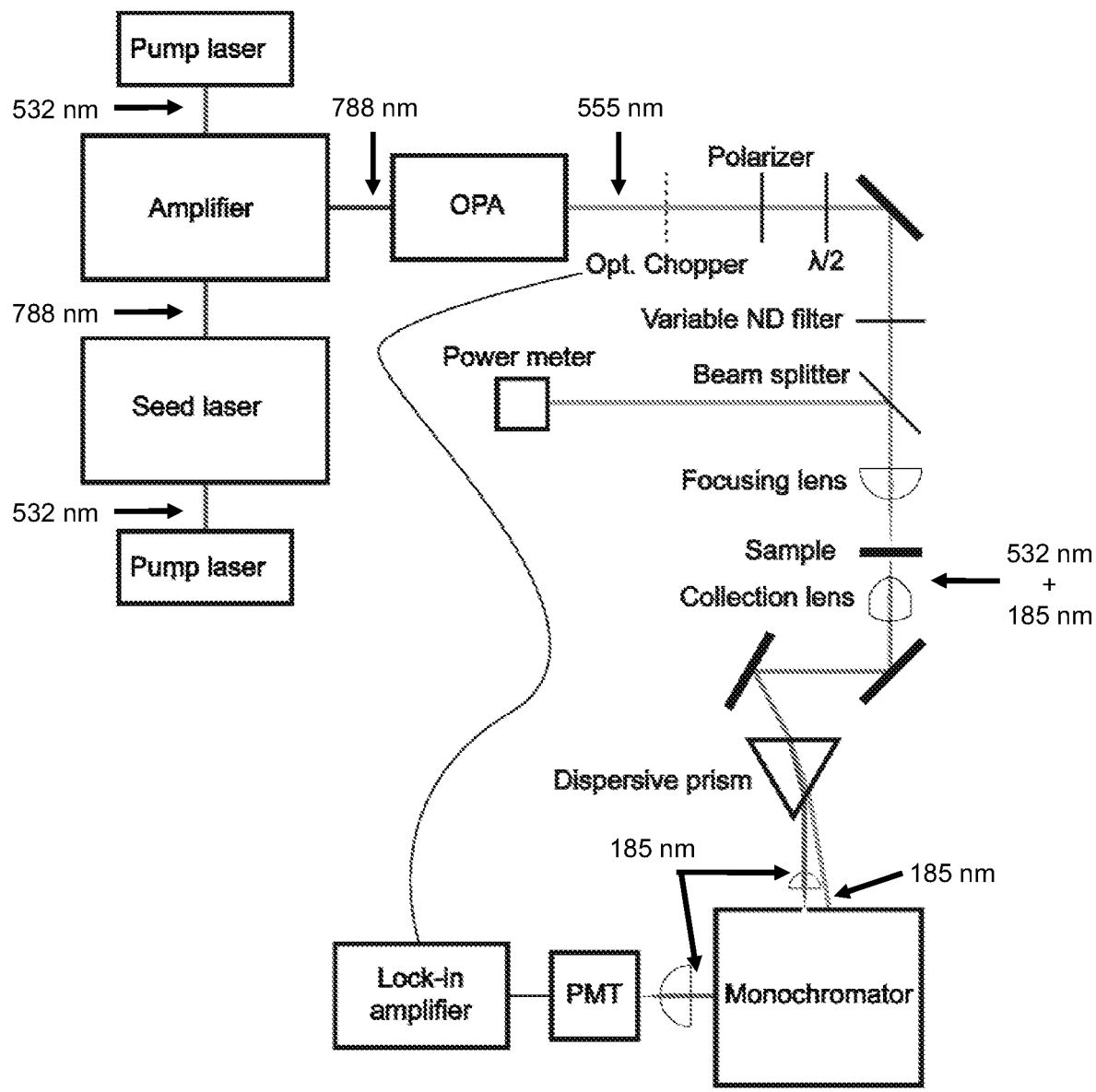
FIG. 9S is a schematic according to one or more embodiments.
Figure 9T:
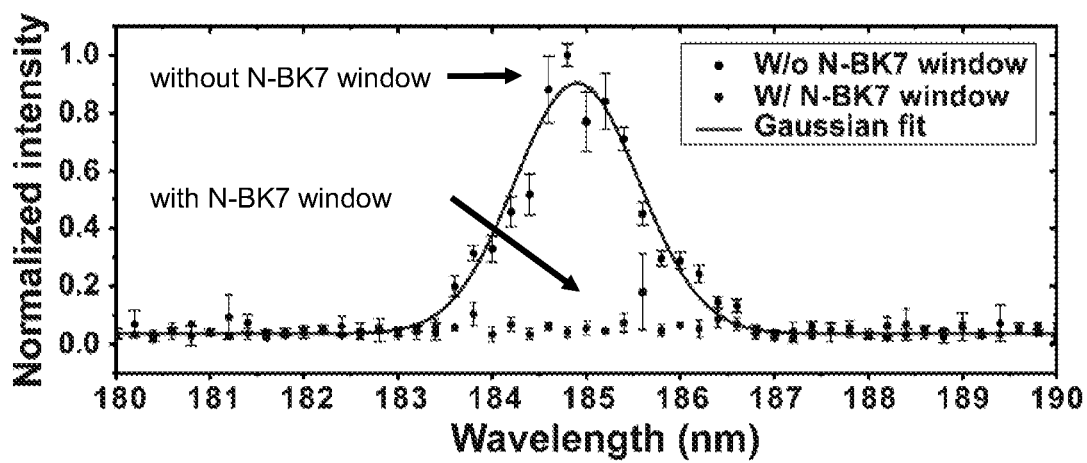
FIG. 9T is a graph of normalized intensity versus wavelength according to one or more embodiments.
Figure 9U:
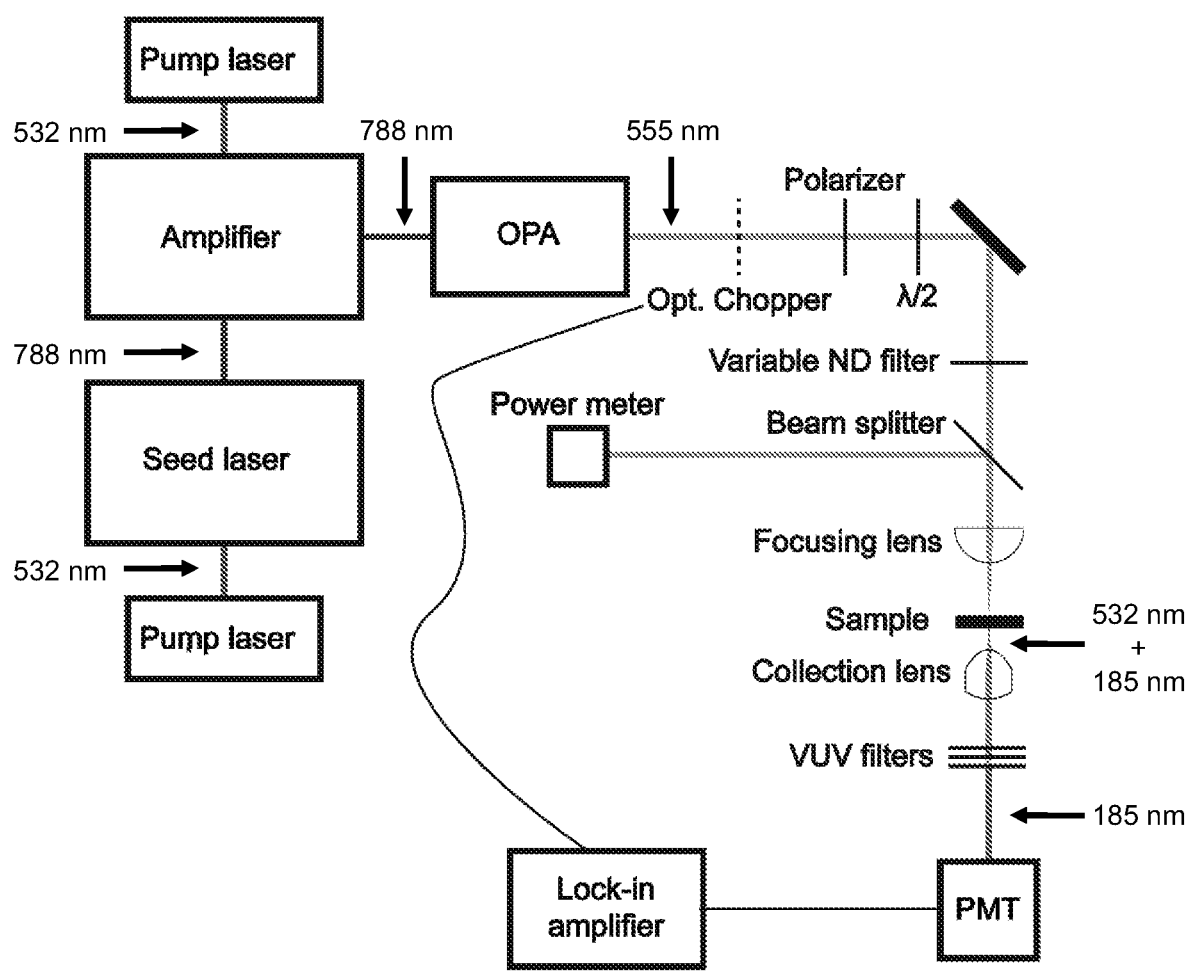
FIG. 9U is a schematic according to one or more embodiments.
Figure 9V:
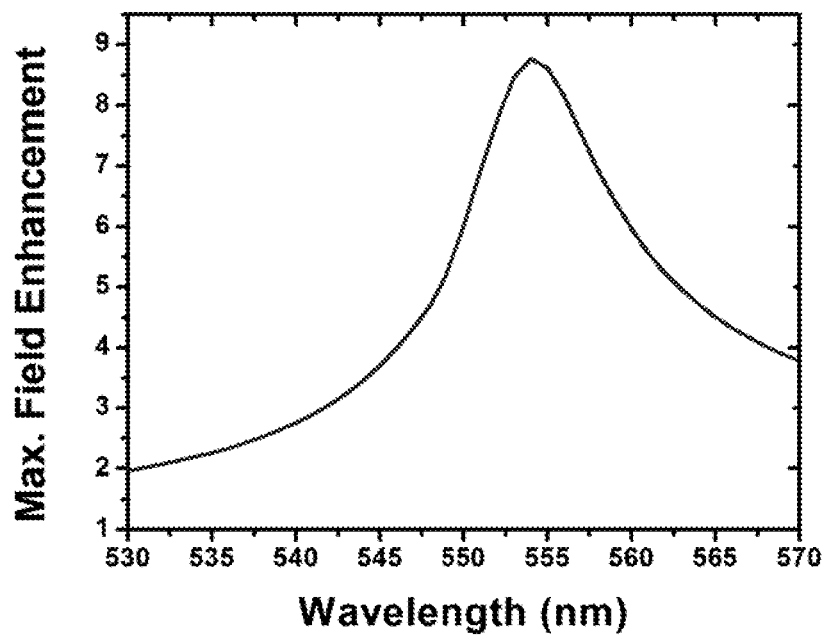
FIG. 9V is a graph of maximum field intensity versus wavelength according to one or more embodiments.
Figure 9W:
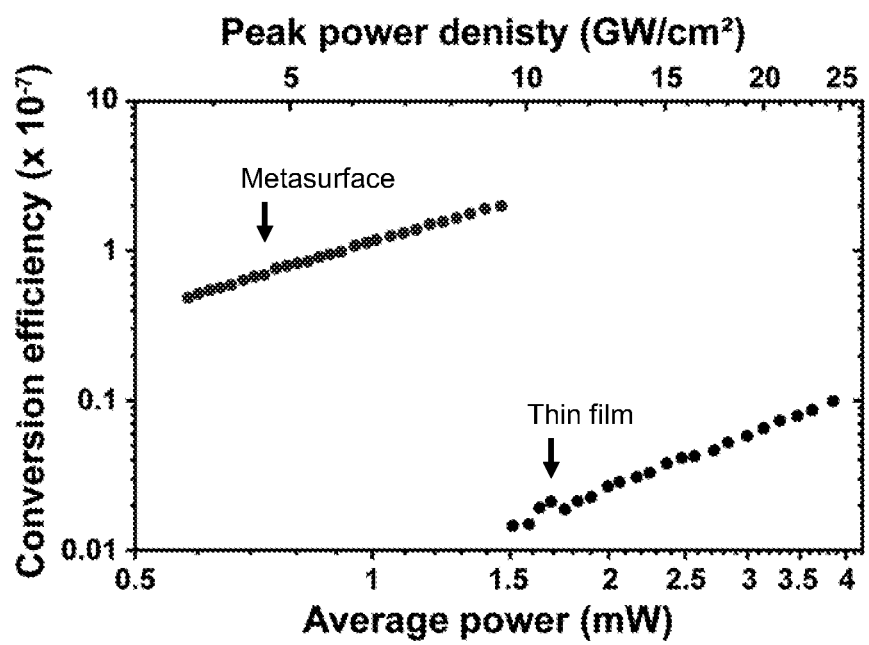
FIG. 9W is a graph of conversion efficiency versus wavelength according to one or more embodiments.
Figure 9X:
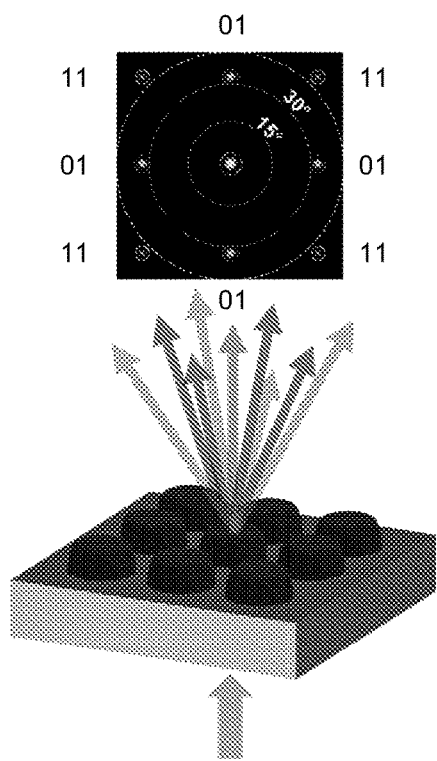
FIG. 9X is a graph and corresponding schematic of a radiation pattern according to one or more embodiments.
Figure 9Y:
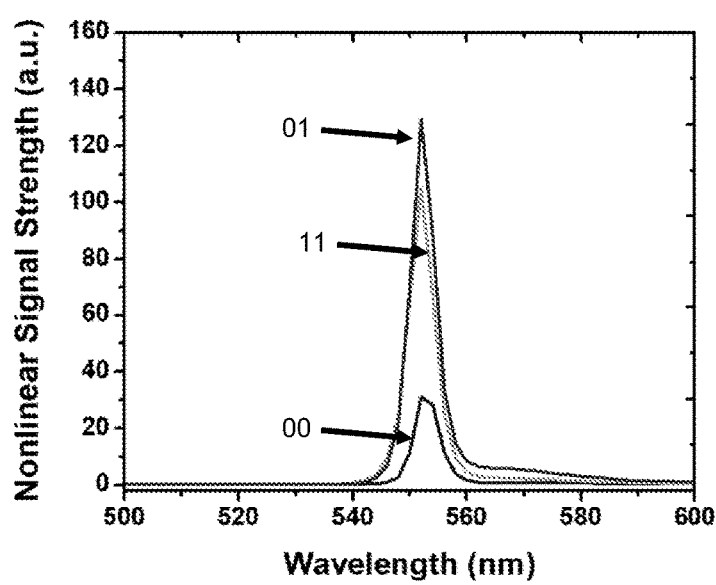
FIG. 9Y is a graph of calculated nonlinear signal strength versus wavelength according to one or more embodiments.
Figure 9Z:
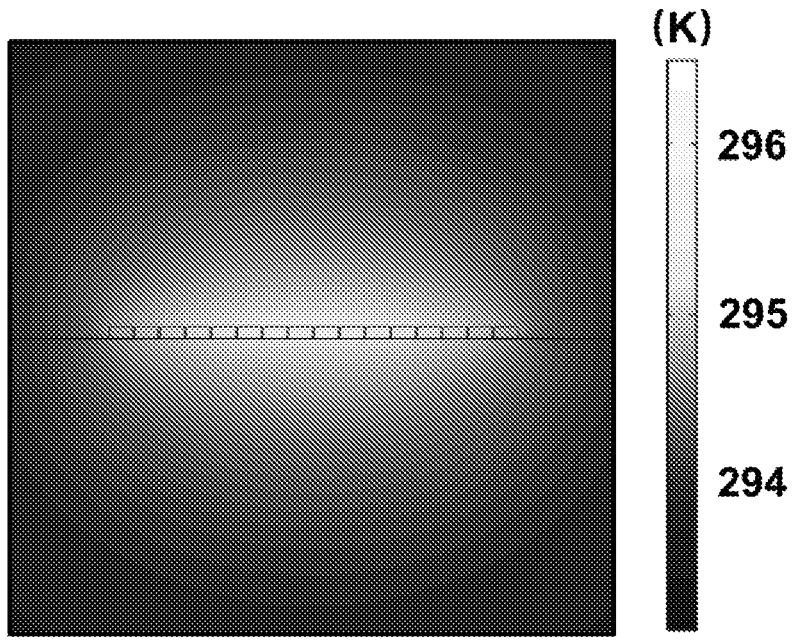
FIG. 9Z is a graph of simulated cumulative heating according to one or more embodiments.
Figure 9A:
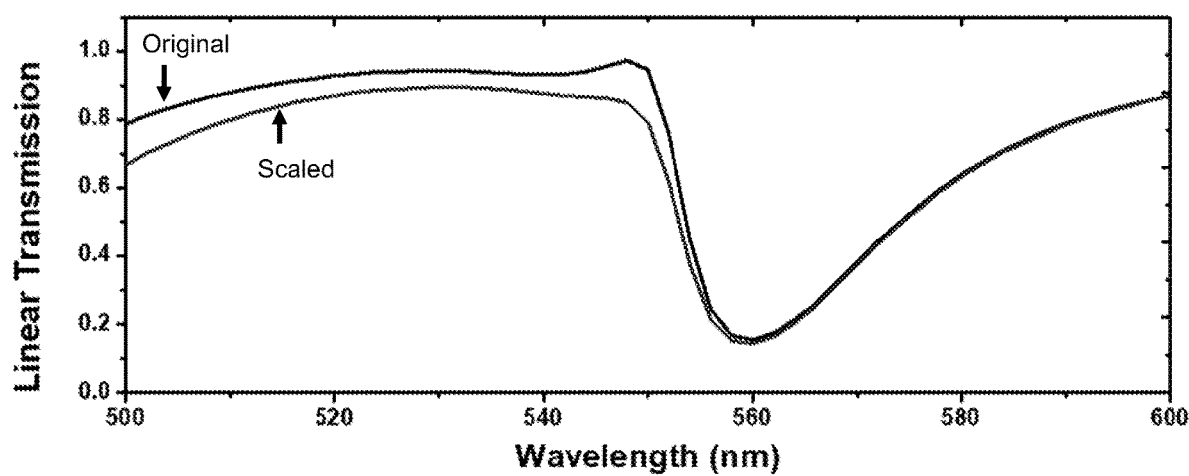
Figure 9B:
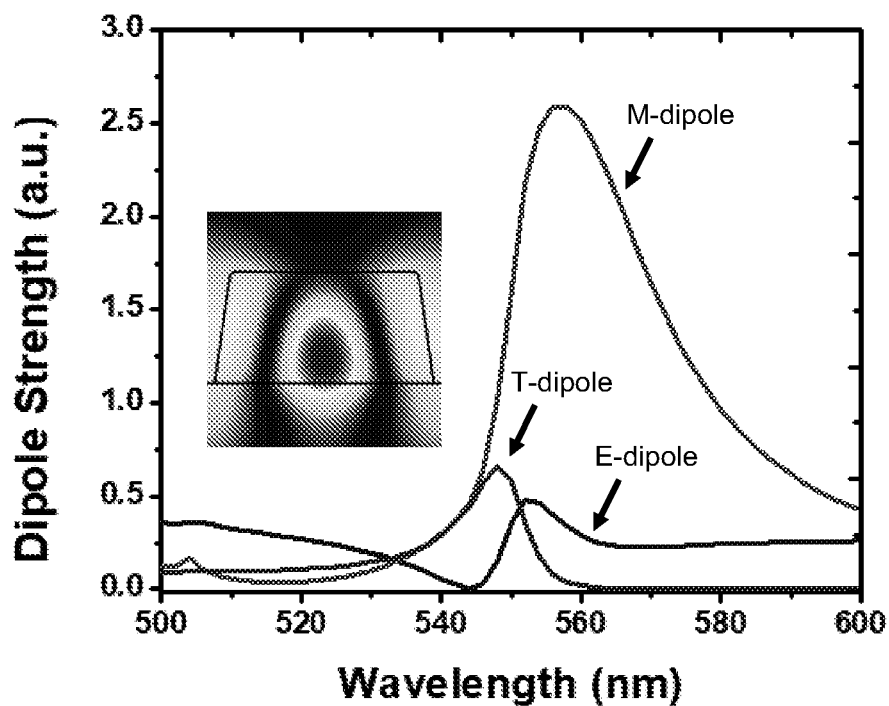
Figure 9C:
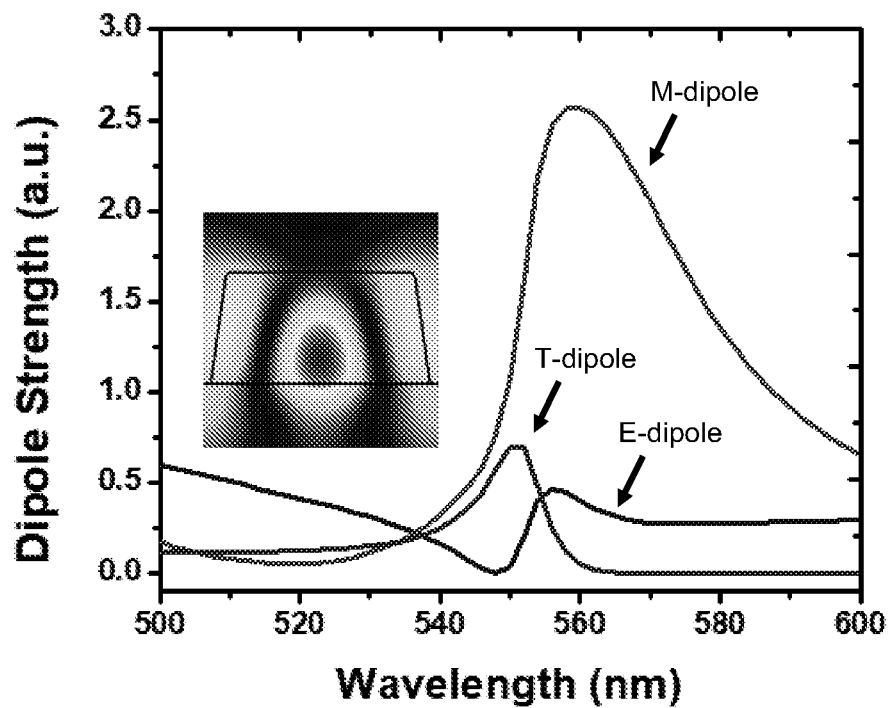

In one or more embodiments, the period of the $TiO_2$ disc array is larger than the third harmonic wavelength and the THG signal emerging from the metasurface forms a diffraction pattern (see FIGS. 9X-9Z).

To maximize VUV light collection efficiency an aspheric lens (e.g., with 0.75 NA) may be used for detection. In this way, most of the THG signal may be within a detectable angular range (see FIGS. 9X-9Z). In one or more embodiments, larger numerical aperture collection optics, or designs that suppress diffraction may be used to increase the amount of collectable VUV light resulting from this structure.

In summary, THG (e.g., production of VUV light at a wavelength of 185 nm) may be achieved using a $TiO_2$ harmonic light-generating metasurface. The nonlinear signal measured from the harmonic light-generating metasurface may be enhanced by a factor of 180 compared to an unpatterned thin film of the same thickness. This strong enhancement may be attributed to an anapole resonance providing large electric and magnetic field enhancements inside the constituent meta-atoms of the metasurface. In one or more embodiments, one or more other electromagnetic modes may be used to generate the field enhancements for THG. Because tuning the geometric unit cell parameters (diameter, period, thickness) allows for effective control over the resonance wavelength, one or more embodiments of the present invention can readily extend THG to both longer (e.g., visible and UV) and shorter (e.g., VUV) wavelengths.

Example Methods for Generating Third Harmonic Vacuum Ultraviolet Light with a TiO2 Harmonic Light-Generating Metasurface In one or more embodiments, design and simulation of the harmonic light-generating metasurface may be achieved as follows. Simulations may be performed using the Finite Element Method (e.g., COMSOL Multiphysics 5.4a). $TiO_2$ discs were modeled as truncated cones with a top diameter of 270 nm, a bottom diameter of 316 nm and a height of 160 nm. The array period was 340 nm. For the linear response of the metasurface, a set of simulations may be performed to tune the anapole resonance to the pump wavelength in order to maximize the local field enhancement inside the $TiO_2$ meta-atoms. A plane wave excitation was propagated from the glass substrate side of the metasurface. The transmission of the structure may be calculated by integrating the Poynting vectors on a plane parallel to the substrate at the air side. Perfect matched layers may be applied to the top and the bottom boundary of the simulation area to prevent artificial reflections. Periodic boundary conditions may be used to mimic an infinite array.

In one or more embodiments, a two-step method may be used for nonlinear simulations. In the first step, a linear simulation at the fundamental wavelength may be performed to obtain the electric field profile within the $TiO_2$ nano structures. The field profile may then be used to calculate the third order polarization using Equation (6):

$$\vec{P}(3\omega)=\epsilon_0\chi_3\vec{E}^3 \qquad (6)$$

In the second step, a linear simulation at the third harmonic wavelength may be performed with the calculated nonlinear polarization as the radiation source. The third harmonic signal strength may be calculated the same manner as the transmission in the linear simulations.

For the THG power dependence simulations, a time-dependent heat transfer model may be used. In a first step, a linear simulation including the nonlinear refractive index $n_2$ and the nonlinear absorption coefficient $\alpha_e$ of TiO2 may be performed to obtain the ohmic loss inside the material. In a second step, a time-dependent heat transfer simulation may be performed to calculate the temperature increase within a laser pulse. A temporal Gaussian heat source based on the ohmic loss may be used to mimic the heating inside the structure. The cumulative temperature increase in the system is negligible, as shown in FIGS. 9AA-9CC. The simulated temperature increase may then be used to calculate the heating-induced refractive index correction. In the model, a linear relationship between the refractive index of $TiO_2$ and temperature is assumed in the form $dn=n_0+\eta(T-T_0)$, where $\eta=dn/dT$. In a third step, the linear electromagnetic simulation may be recalculated with the heating-induced correction. The resulting electric field profile may then be used to calculate the corrected third harmonic signal. Due to the extremely low extinction coefficient of the $TiO_2$ dielectric function used in the linear simulations ($\sim10^{-8}$), a larger coefficient may be used for the power dependence simulations. Increasing the extinction coefficient has very limited influence on the linear response of the metasurface, as shown in FIGS. 9AA-9CC. The density of $TiO_2$ and $SiO_2$ used may be 4.23 g/cm3 and 2.65 g/cm3, respectively.

In one or more embodiments, fabrication of the harmonic light-generating metasurface may be achieved as follows. A 100 nm thick layer of e-beam resist (e.g. ZEP-520A) was spin-coated onto a 150 nm thick commercially available $TiO_2$ thin film (e.g., MTI Corporation, TiO2 on Glass—252507-150 nm). The substrate was soda lime glass. After coating, the sample was baked at 180° C. for 5 minutes. To prevent charging, a conductive polymer layer, (e.g., ESPACER SHOWA DENKO K.K.), was spin-coated over the ZEP-520A layer. Electron beam writing was performed using an e-beam lithography system (e.g., FEI Inspect F SEM) at an acceleration voltage of 30 kV with a beam current of around 18.5 pA. A commercial software (e.g., NPGS, JC Nabity Lithography Systems) was employed to precisely define the scanning path and the writing dose of the electron beam. The samples were written in squares with edge lengths of 40 μm. After e☐beam exposure, the sample was rinsed with deionized water to remove the ESPACER layer, then developed in ZEP-N50 solution for 60 seconds. It was subsequently rinsed with isopropyl alcohol for 20 seconds and blow-dried with nitrogen gas. A 30 nm thick chromium film was deposited by e-beam evaporation on the substrate as a hard mask. The sample was etched in a mixture of $CF_4/Ar/O_2$ chemistry by using a reactive ion etching (RIE) system at RF source power of 100 W and a pressure of 20 mTorr. The final sample was obtained after the removal of the patterned chromium hard mask with a chromium etch solution.

In one or more embodiments, linear measurements of the harmonic light-generating metasurface may be achieved as follows. For the linear transmission measurements an inverted microscope (e.g., Zeiss Axiovert 200 MAT) coupled with a spectrometer consisting of a monochromator (e.g., Princeton Instruments, Acton SP2150) and a charge-coupled device (CCD) (e.g., Princeton Instruments, Pixis 400) was used. A broadband wire grid polarizer (e.g., Thorlabs, WP25M-UB) was used to produce a linear polarization. The polarization was aligned along one of the sides of the square metasurface. The harmonic light-generating metasurface was oriented so that the illumination passed through the glass substrate first. The transmission spectrum of the harmonic light-generating metasurface was calculated by dividing the signal from the metasurface by an adjacent blank area of the glass substrate.

In one or more embodiments, nonlinear measurements of the harmonic light-generating metasurface may be achieved as follows. For the nonlinear measurements, a custom built setup may be used. The setup may comprise a mode locked, ultrafast Ti:sapphire laser system that included a seed laser (e.g., Coherent Mira 900), pumped with a diode laser (e.g., Coherent Verdi V5), an amplifier (e.g., Coherent RegA 9000), pumped with another diode laser (e.g., Coherent Verdi V10), and an optical parametric amplifier (OPA) (e.g., Coherent OPA 9400). The OPA was tuned to produce a beam centered at 555 nm. A linear polarization was achieved by using a Glan-laser polarizer (e.g., Thorlabs, GL10-A). In addition, a half wave-plate (e.g., Thorlabs, WPH05M-588) was used to control the linear polarization direction. Similar to the linear measurements, the polarization was set to be along one of the sides of the harmonic light-generating metasurface square. The laser was focused onto the harmonic light-generating metasurface with a UV fused silica lens (e.g., Thorlabs, LA4306). As in the linear measurements, the sample was oriented so that the laser beam would pass through the substrate first. The substrate was oriented perpendicular to the laser beam. The transmitted light included light of both the fundamental and the third harmonic wavelength and was collected with an aspheric UV fused silica lens of 0.75 NA (e.g., Edmund Optics, #33-947). The light was then routed through an equilateral dispersive calcium fluoride prism (e.g., Thorlabs, PS863) to achieve a pre-separation between the transmitted third harmonic and the fundamental light before entering the monochromator (e.g., Thermo Jarrel Ash, 2400 grooves/mm grating). In one or more embodiments, this is inserted to avoid excess fundamental light within the monochromator. The VUV light was then detected with a photomultiplier tube (PMT) (e.g., ADIT Electron Tubes, 9781B6019). For the power dependent measurements, a simplified setup using only filters (instead of the prism and monochromator) in combination with a PMT (e.g., Thorlabs, PMTSS) was used, as explained below. For both setups, the majority of the VUV light path (from the harmonic light-generating metasurface to the detector) was purged with nitrogen to minimize absorption of the VUV light by oxygen in the ambient air.

FIG. 9S shows an experimental setup for the spectral measurement of the third harmonic signal. In one or more embodiments, third harmonic measurements and data analysis may be performed as follows. The nonlinear spectrum presented in FIG. 9M was obtained using the setup shown in FIG. 9S.

In one or more embodiments, spectral measurements may be performed in a non-traditional way using both a CaF$_2$ dispersive prism and a monochromator. This setup may avoid the signal losses associated with the use of ultraviolet bandpass filters. The third harmonic signal may be pre-separated from the fundamental by the dispersive prism that was aligned to direct the third harmonic signal into the entrance slit of the monochromator. The majority of the path may also be purged with nitrogen to reduce absorption in air. In the purged part of the path, the oxygen level may be kept below 0.25%. However, for experimental convenience, some of the path may not be purged. Propagation loss and the limited efficiency of the components used at the third harmonic wavelength of 185 nm may lead to significant losses. Therefore, a simplified setup may be used for the power dependence measurements.

FIG. 9T shows a comparison of a spectral scan of the THG with and without an N-BK7 window in the detection path. Two spectral scans were taken with and without an uncoated BK7 glass window (e.g., Thorlabs, WG11050) in the detection path. This window acts as a longpass filter and blocks the 185 nm light. The same window was used to compensate for residual pump light in the power-dependent measurements as described below. The scan without the window is the same as shown in FIG. 9M.

FIG. 9U shows a simplified setup that was used for the power-dependent scans shown in FIG. 9P. The simplified setup did not use the prism, but instead three bandpass filters: two filters (e.g., Newport, 10LF20-193-B) and one filter (e.g., e-source optics, 25200FBB). The transmission values of the filters at 185 nm were extracted from the graphs provided by the manufacturers for each filter. The transmission values may be about 13% or 15%. While the third harmonic signal was drastically reduced by the filters, the signal reduction can be compensated for by dividing by the transmission values of the filters. In addition, for this simplified setup, almost the entire path of the third harmonic signal (expect a few millimeters between the sample and the lens used for collection) was purged with nitrogen to reduce absorption. Similarly, to the spectral setup shown in FIG. 9S, in the purged part of the path, the oxygen level was kept below 0.25%. Losses in the short remaining air path between the sample and the collection lens, the nitrogen path, and in the lens used for collection were not compensated for in the calculations. The laser power was controlled by a linear variable neutral density filter (e.g., Thorlabs, NDL-25C-2). To compensate for any possible remaining pump signal after the filters that could have been collected by the photomultiplier tube (PMT) and could have led to an overestimation of the third harmonic signal, the power-dependent measurements were taken both with and without an uncoated BK7 glass window in the detection path. This window is the same that was used for the scan labeled "without N-BK7 window" in FIG. 9T. The window acts as a longpass filter and can be used to block the third harmonic signal, as shown in FIG. 9T.

In one or more embodiments, data collected in the third harmonic measurements may be analyzed as follows: Five PMT current and pump laser power measurements may be taken at each laser power increment. First, the measured dark PMT current value and the dark power may be subtracted from the PMT current and the pump laser power measurements, respectively. Next, the PMT current values for the scans with the N-BK7 window in place may be divided by the transmission value of the N-BK7 glass at 555 nm (e.g., 91.979322% at 555 nm, for a 10 mm sample of uncoated N-BK7). The five measurements (both for the PMT current and the pump laser power) may then be averaged to a single value. To compensate for laser power fluctuations between the measurements with and without the N-BK7 window, the PMT current values for the measurements with the window in the detection path may be multiplied by the following fraction: average laser power value obtained from the five measurements without the window divided by the corresponding average laser power value obtained from the five measurements with the window. The adjusted PMT current values for the scans with the window in the detection path may then be subtracted from the corresponding ones that did not have the window in the detection path. Finally, the obtained PMT current values may be converted to power values by dividing by the photocathode efficiency (e.g., 13 mA/W) and gain (e.g., $4.0 \times 10^6$ for a control voltage of 1 V) of the PMT at 185 nm, as well as the transmission values of three vacuum ultraviolet filters at a wavelength of 185 nm mentioned above. All values are reported with an accuracy of two significant digits.

In one or more embodiments, maximum electric field enhancement with respect to the excitation wavelength may be characterized as follows. FIG. 9V shows the maximum electric field enhancement inside the within the TiO2 disc of a designed harmonic light-generating metasurface. The anapole is the main contributor to the single-peak shape of the line. At around 555 nm, the maximum field enhancement reaches its peak value of 9.

FIG. 9W shows the conversion efficiency of a harmonic light-generating metasurface in accordance with one or more embodiments and an unpatterned thin film in comparison. The conversion efficiencies of the metasurface and thin film corresponding to the data presented in FIG. 9P. The conversion efficiency was defined as the average power of the third harmonic signal divided by the laser pump average power.

In one or more embodiments, the radiation pattern of the nonlinear signal includes diffraction and may be characterized as follows. Due to the diffractive nature of periodic structures, the third harmonic signal generated from a harmonic light-generating metasurface may form a radiation pattern. The shape of the radiation pattern and its influence on the nonlinear signal collection is characterized below. The radiation pattern may be calculated by first collecting the far field response of a single disc in the array with the far field domain method (e.g., calculated in COMSOL), then summing up the response of different discs with corresponding phase differences. Through calculation, the structure gives rise to three diffraction orders, 00, 01, and 11.

FIG. 9X shows the diffraction pattern of the harmonic light-generating metasurface according to one or more embodiments and a schematic representation of the diffraction pattern. Both the 00 and 01 diffraction orders can easily be collected by the setup described above. However, the 11 diffraction order fell outside of the collection range of the aspheric lens due to its large diffraction angle (~50°). The labeled dots correspond to the 00, 01, and 11 diffraction orders. The white dashed line represents the usable numerical aperture of the collection lens.

FIG. 9Y shows the nonlinear signal strength in each diffraction order of a harmonic light-generating metasurface in accordance with one or more embodiments.

In one or more embodiments, the simulated power dependence of the third harmonic signal may be characterized as follows. Due to the usage of a pulsed laser, the thermal effect within the $TiO_2$ metasurface can be separated into two stages: When the laser is on, the absorption inside the $TiO_2$ discs dominates, leading to a noticeable system temperature increase; when the laser is off, the system gradually cools down because of heat dissipation. In the above power dependence simulation, the heating-induced $TiO_2$ refractive index change is assumed to mainly result from the transient temperature increase within the laser pulse duration, whereas the cumulative heating inside the structure over a more extended period only has a very limited contribution. This is justified by a two-step multiscale simulation. In the first step, an electromagnetic simulation at the fundamental wavelength (555 nm) was performed to estimate the total absorption inside the $TiO_2$ disc within a laser pulse. In the second step, a heat transfer model with a 16 by 16 $TiO_2$ disc array as the constant heat source was used to calculate the cumulative temperature increase.

FIG. 9Z shows a simulated cumulative heating in the $TiO_2$ disc array according to one or more embodiments. The heat source power intensity was obtained by averaging the disc absorption over the laser repetition interval and the volume of the disk. Because the repetition interval is much longer than the pulse duration, only a temperature increase of around 3 Kelvin was observed.

In the dielectric function used for linear mode analysis, the extinction coefficient at 555 nm is $5.55 \times 10^{-8}$. Considering the existence of defects and impurities, using this extinction coefficient value would lead to an unrealistically low absorption within the $TiO_2$ discs, and thus prevent proper analysis of the thermal effect of the structure. To avoid this, an extinction coefficient of 0.002 at 555 nm was used in all power dependence simulations. This modification in material property would not strongly affect the linear response of the structure.

FIG. 9AA shows the transmission spectra of a harmonic light-generating metasurface in accordance with one or more embodiments at the fundamental wavelength with different $TiO_2$ linear optical properties. Both curves share the same refractive index n. However, the extinction coefficients of the "Scaled" curve are $5 \times 10^4$ times higher than the ones in the "Original" curve. According to the figure, the structure with "Scaled" extinction coefficients only shows a small decrease in transmission below 550 nm compared to the "Original" extinction coefficients.

FIGS. 9BB and 9CC show dipolar mode analysis for a harmonic light-generating metasurface in accordance with one or more embodiments with the "Original" $TiO_2$ extinction coefficients and the "Scaled" extinction coefficients. The decrease in transmission below 550 nm is even more trivial when comparing the dipolar mode analysis.

In summary, one or more embodiments of the present invention provides a novel harmonic light-generating metasurface that supports a magnetic dipole mode to strongly confine the electromagnetic fields of incident radiation, produce intense electromagnetic field enhancements within a nonlinear material of the metasurface, and significantly increase harmonic signal generation. Furthermore, the metasurface may also manipulate the emission pattern of the generated harmonic signal for additional advantageous effects that cannot be achieved by an unstructured film or traditional nonlinear crystals. One or more embodiments of the present invention provides a method of manufacturing a novel harmonic light-generating metasurface that supports a magnetic dipole mode to strongly confine the electromagnetic fields of incident radiation, produce intense electromagnetic field enhancements within a nonlinear material of the metasurface, and significantly increase harmonic signal generation.

Enhanced Third Harmonic Generation from a Gold Metasurface Excited at the Toroidal Resonance In general, one or more embodiments described herein relate to a harmonic light-generating metasurface with enhanced third harmonic generation and a method of manufacturing a harmonic light-generating metasurface with enhanced third harmonic generation. Light may be electromagnetic radiation with a wavelength in the vacuum ultraviolet regime between 100 nm and 200 nm, in the UV regime between 100 nm and 400 nm, or in the visible regime between 400 nm and 700 nm, but embodiments described herein are not particularly limited to generating light in only these regimes.

A metasurface may be an optically active interface between two dielectric media comprising an array or pattern of paired structures (i.e., meta-atoms) on a supporting substrate. Optical activity can comprise generating, focusing, redirecting, bending, absorbing, or modulating the phase or polarization of light, but is not limited to these effects. The plurality of paired structures may be low loss optical resonators that are smaller than the incident wavelength of the light (i.e., subwavelength), but are not limited to this size range. The plurality of paired structures may be dielectric or metallic in composition, but are not limited to these classes of materials. In one or more embodiments, the plurality of paired structures may be plasmonic nanoparticles with resonant modes that strongly confine electromagnetic fields and create electromagnetic field enhancements that penetrate the supporting substrate.

In one or more embodiments, a harmonic light-generating metasurface includes: a base substrate; a supporting substrate comprising a nonlinear material disposed on the base substrate; and a plurality of paired structures disposed in a pattern on a surface of the supporting substrate. Each paired structure, of the plurality of paired structures, collectively supports a toroidal dipole mode. An electromagnetic field enhancement of the toroidal dipole mode penetrates the supporting substrate to induce generation of a third harmonic signal by the supporting substrate.

Figure 10A:
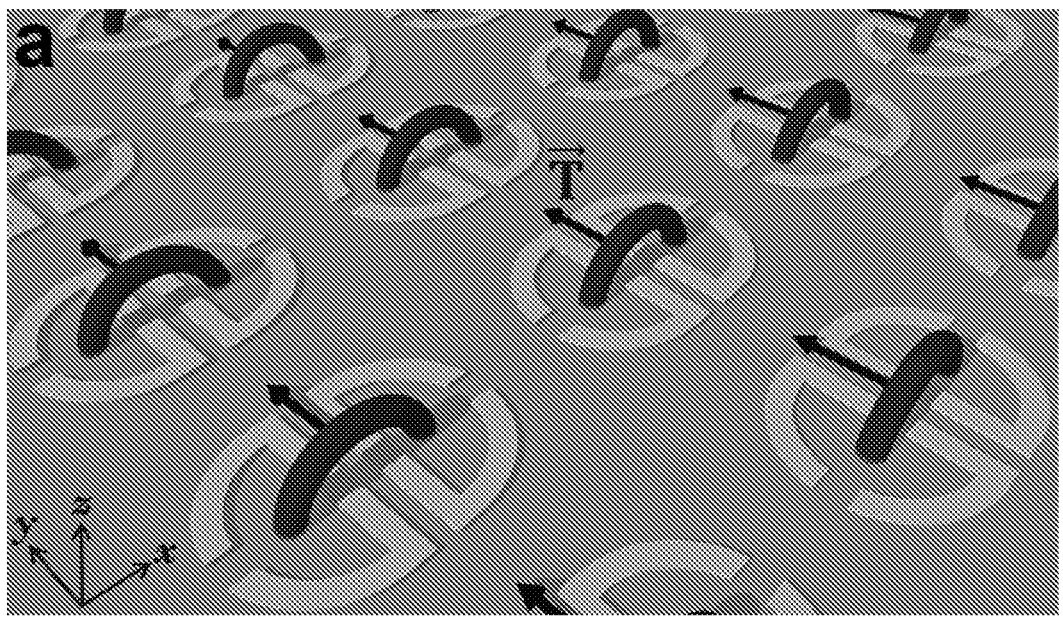
FIG. 10A-10C are schematics according to one or more embodiments.

FIG. 10A is a schematic according to one or more embodiments described herein in which the metasurface comprises an array of a paired structures comprising two identical split-ring resonators reflected across an axis of symmetry. The array may be rectilinear (i.e., comprised of linear coordinate axes) designed with a pitch $P_x$ along an x-axis and a pitch $P_y$ along a y-axis, wherein the x-axis and y-axis are perpendicular. In one or more embodiments, the pattern of the plurality of structures may be: rectilinear with orthogonal coordinate axes; rectilinear with non-orthogonal coordinate axes (e.g., hexagonal coordinate axes); polar (i.e., based on polar coordinate axes); an irregular pattern; or a three dimensional pattern, but is not particularly limited to these patterns.

The toroidal dipole mode collectively supported by a paired structure may have a toroid axis that lies parallel to the surface of the supporting substrate and parallel to the axis of symmetry, but is not particularly limited to this orientation.

Figure 10B:
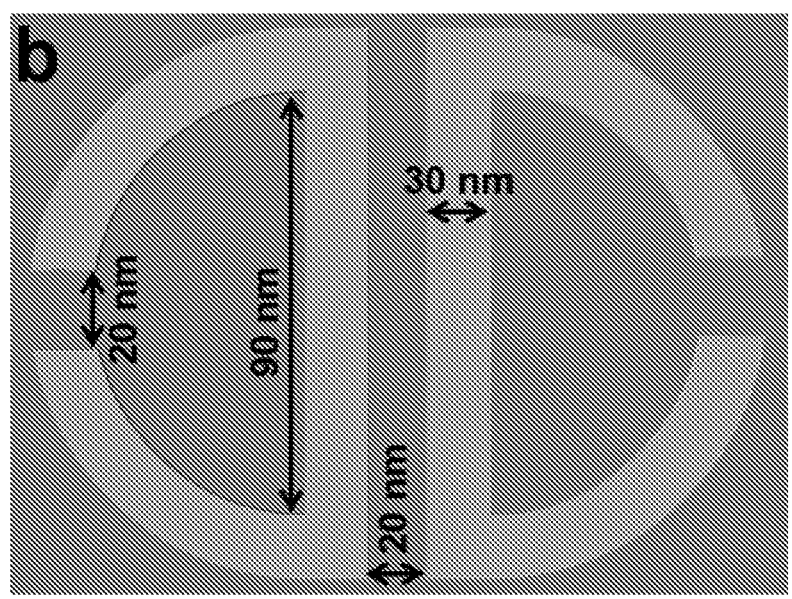

FIG. 10B is a schematic of a single unit cell of the metasurface pattern according to one or more embodiments described herein. In one or more embodiments, each split ring resonator may include a first branch and secondary branches protruding from each extremity of the first branch, but is not particularly limited to this arrangement. In one or more embodiments, the secondary branches are curved such that the free extremities of the curved second branches face each other across a gap. However, a paired structure is neither limited to split ring resonator shapes nor reflective symmetry across an axis of symmetry. In one or more embodiments, a paired structure may be asymmetric.

In a non-limiting example in accordance with one or more embodiments, the first branch of a split ring resonator is straight and parallel to an axis of symmetry of the unit cell of a square array. The first branch may be 30 nm wide and 150 nm long. The secondary branches may be 30 nm wide and curved along an arc such that the free extremities of the curved second branches face each other across a gap that may be 20 nm wide. However, the dimension of the first branch, second branches, and gap are not particularly limited to these dimensions.

In one or more embodiments, the unit cell defining a paired structure may comprise a pair U-shaped resonators that oppose each other across an axis of symmetry.

Figure 10C:

FIG. 10C is a schematic according to one or more embodiments described herein in which the plurality of paired structures are covered by an oxide film. The base substrate may be a glass, silica, or fused silica substrate, but is not particularly limited to these materials. The nonlinear material may be a second harmonic generation (SHG) material or a third harmonic generation material, but is not particularly limited to these classes of materials. A THG material may be an indium tin oxide (ITO) film or titanium oxide ($TiO_2$) film, but is not particularly limited to these materials. For example, the THG material may be a wide-bandgap semiconductor, a metal oxide, or another material with a non-zero third order nonlinear susceptibility, $\chi^{(3)}$.

In one or more embodiments, bandgap of the nonlinear material is greater than 3 eV, but the bandgap is not particularly limited to this range. In one or more embodiments, the bandgap of the nonlinear material may be between 3 eV and 5.5 eV, or between 3 and 4 eV. In one or more embodiments, the bandgap of the nonlinear material may be less than 2.2 eV or greater than 6.4 eV. The bandgap of the nonlinear material may be direct or indirect, but is not limited to these categories.

In one or more embodiments, an oxide film may be disposed on the surface of the supporting substrate to cover the plurality of paired structures. The oxide film may comprise silica (e.g., $SiO_2$) or aluminum oxide (e.g., $Al_2O_3$), but is not particularly limited to these materials. The oxide film may increase the damage threshold of the metasurface and allow higher incident powers, but is not particularly limited to this function. For example, a 300 nm thick capping layer (e.g., alumina) may be deposited on top of the nanostructures to protect them from laser induced damage. In one or more embodiments, the plurality of paired structures are uncovered on the surface of a supporting substrate and are exposed to an environment above the surface.

In one or more embodiments, the plurality of paired structures comprise a plasmonic material that supports collective oscillations of conduction electrons. The plasmonic material may comprise gold, silver, aluminum, copper, a combination of multiple plasmonic materials, or alloy of multiple plasmonic materials, but is not particularly limited to these compositions. The plasmonic nanostructures provide field enhancement to enhance the THG in the underlying nonlinear material layer (e.g., $TiO_2$, ZnO, etc.).

Figure 10D:
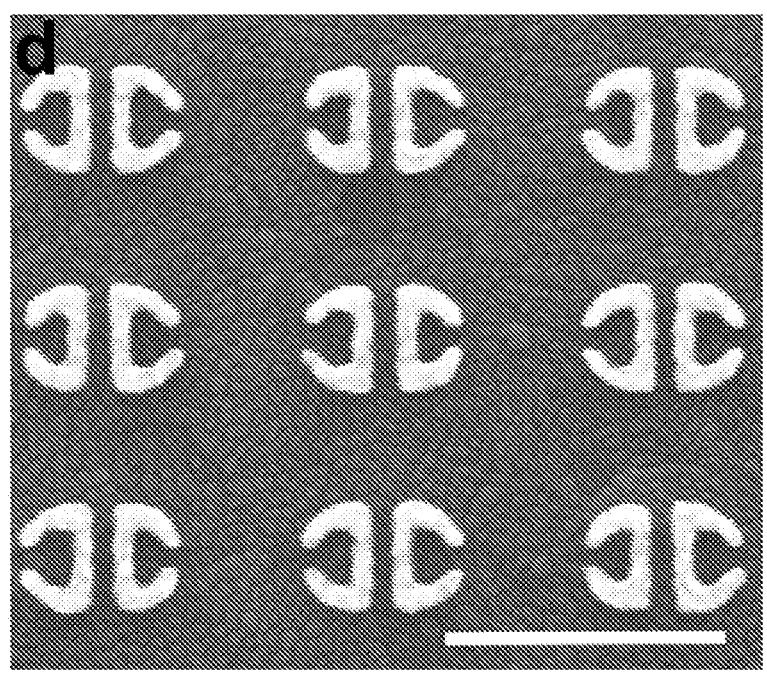
FIG. 10D is a scanning electron micrograph of an example in accordance with one or more embodiments. Scale bar is 400 nm.

FIG. 10D is a scanning electron micrograph of an example in accordance with one or more embodiments described herein in which the plurality of paired structures are gold split ring resonators. The scale bar is 400 nm.

Figure 11A:
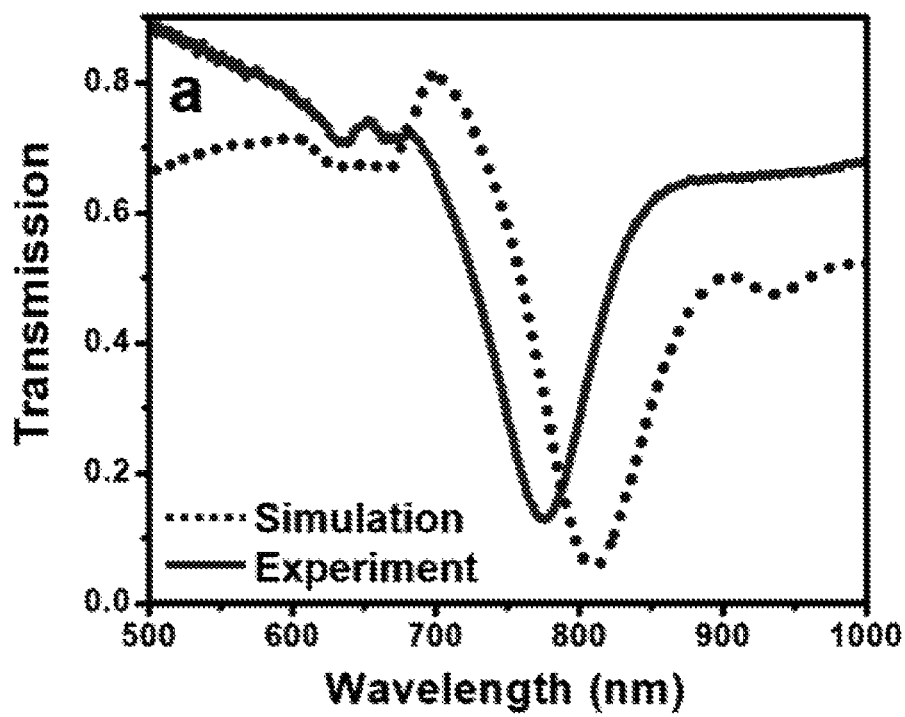
FIG. 11A is a graph of the simulated and experimental transmission according to one or more embodiments.

FIG. 11A is a graph of the simulated and experimental transmission of a paired split ring resonator metasurface according to one or more embodiments described herein. In one or more embodiments, the metasurface may have a resonance in the ultraviolet regime, visible regime, near-infrared regime, infrared regime, or around an excitation wavelength (wavelength of incident light) of 785 nm. This corresponds to an exemplary third harmonic signal at 263 nm. However, the nanostructures are not limited to these specific wavelengths or wavelength regimes.

In one or more embodiments, the wavelength of the incident light is not limited to any particular wavelength range. In one or more embodiments, the wavelength of the incident light may be greater than 100 nm and less than 1500 nm, but is not particularly limited to this wavelength range. In one or more embodiments, the wavelength of the incident light may be between 200 nm and 1200 nm, or between 300 nm and 600 nm. In one or more embodiments, the wavelength of the incident light may be less than 100 nm or greater than 1500 nm. In other words, by tuning the size, shape, material, and coupling of the nanostructures, the resonance may be tuned to any desirable wavelength or wavelength regime.

Figure 11B:
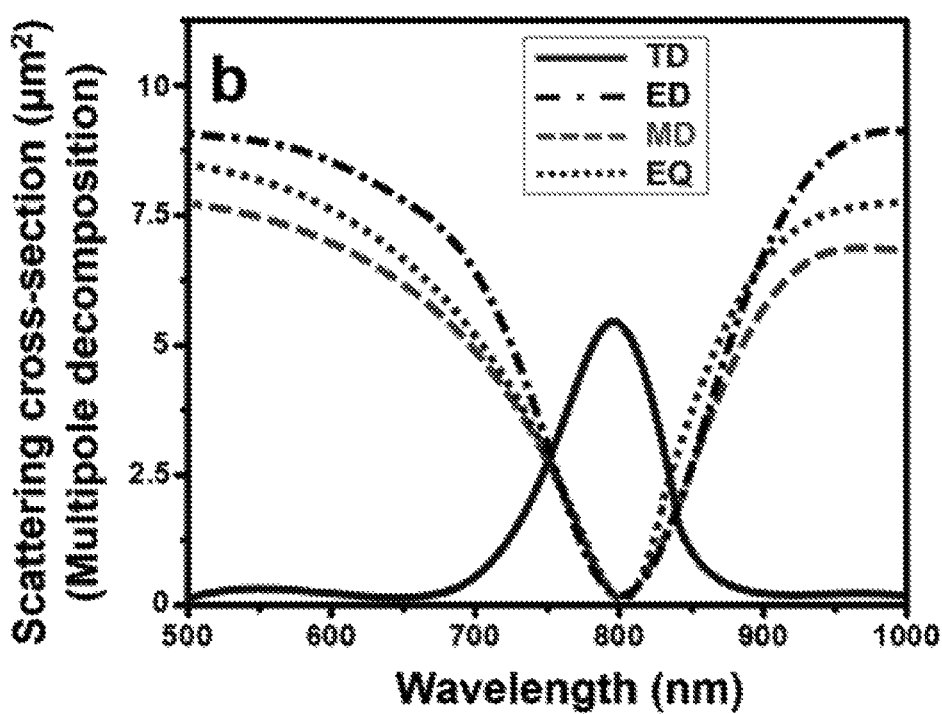
FIG. 11B is a graph of the simulated scattering cross-section according to one or more embodiments.

FIG. 11B is a graph of the simulated scattering cross-section of a paired split ring resonator metasurface according to one or more embodiments described herein. The size and shape of the individual structures of the plurality of structures may be tuned to support a toroidal dipole mode (TD), electric dipole (ED), magnetic dipole (MD), or electric quadrupole (EQ), but is not limited to supporting only these modes. In one or more embodiments, the resonance of the paired structure may have a greater scattering contribution from the toroidal dipole mode compared to the electric dipole, magnetic dipole, or electric quadrupole. For example, the multipole decomposition in FIG. 11B shows that the dominant scattering cross-section may be attributed to the toroidal dipole mode.

In this non-limiting example, the center wavelength of the toroidal dipole mode may be around 785 nm, but is not particularly limited to this wavelength range. In one or more embodiments, the center wavelength of the toroidal dipole mode may be greater than 100 nm and less than 1500 nm, but is not particularly limited to this wavelength range. In one or more embodiments, the center wavelength of the toroidal dipole mode may be between 200 nm and 1200 nm, or between 300 nm and 600 nm. In one or more embodiments, the center wavelength of the toroidal dipole mode may be less than 100 nm or greater than 1500 nm. The center wavelength of the toroidal dipole mode may be centered or offset from the wavelength of incident light.

Figure 11C:
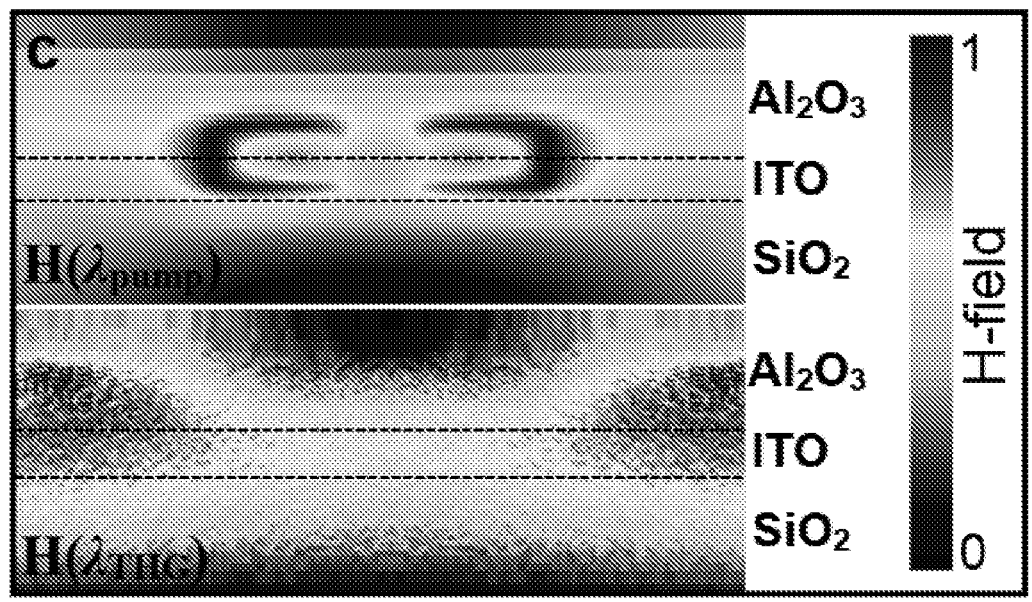
FIG. 11C is a graph of the simulated H-fields according to one or more embodiments.
Figure 11D:
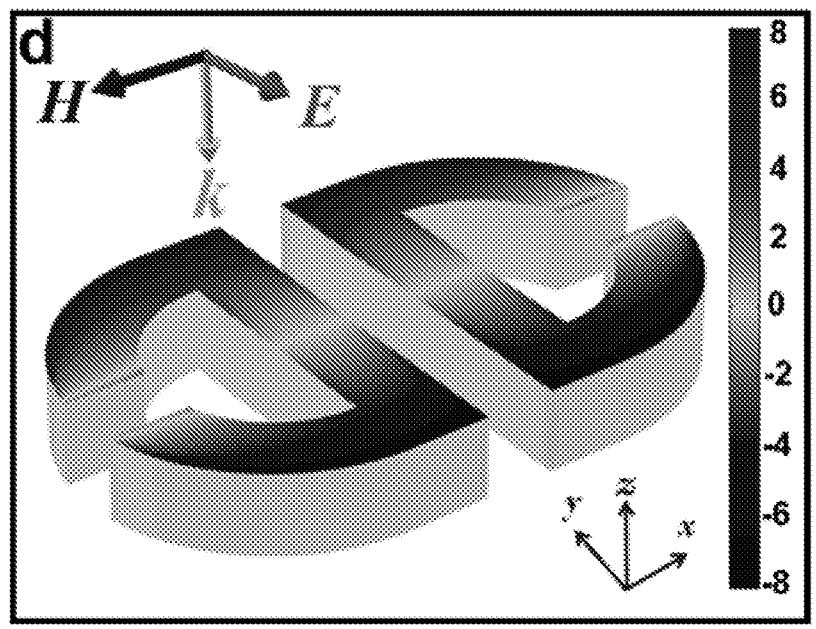
FIG. 11D is a graph of the simulated surface charge distribution according to one or more embodiments.
Figure 11E:
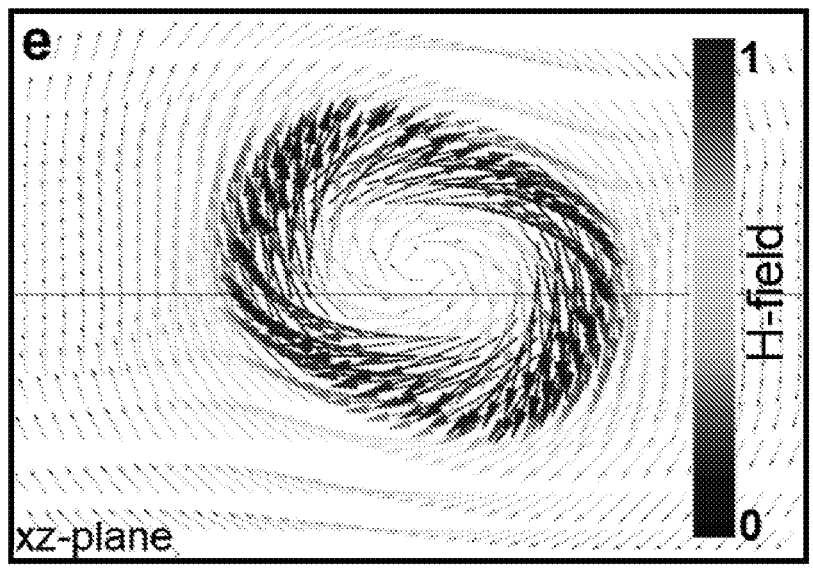
FIG. 11E is a graph of the simulated magnetic field strength enhancement according to one or more embodiments.
Figure 11F:
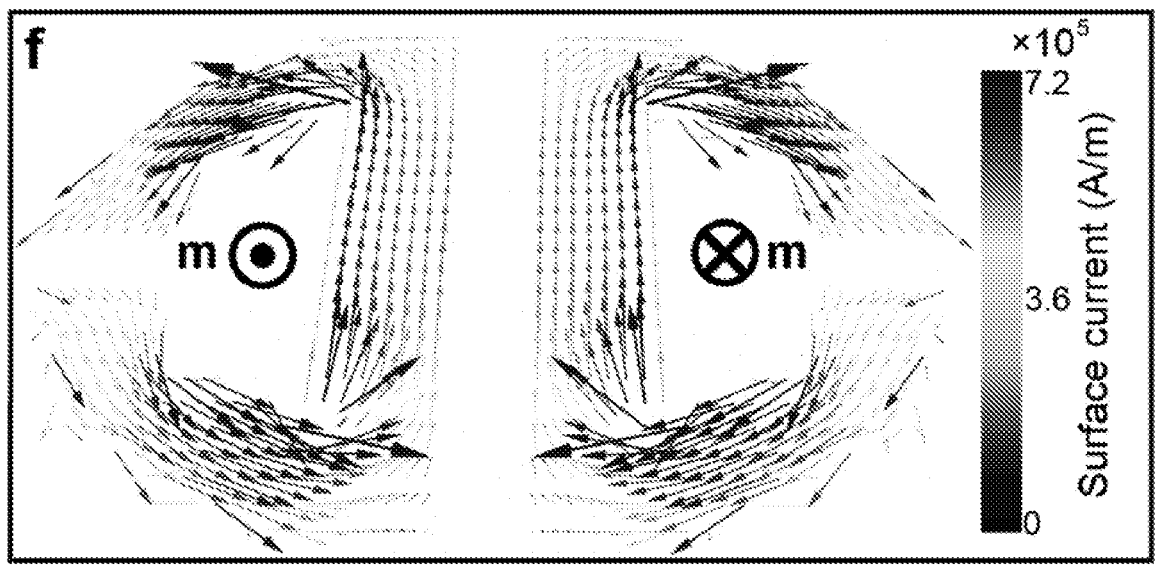
FIG. 11F is a graph of the simulated surface current according to one or more embodiments.

FIG. 11C is a graph of the simulated H-fields at the resonant wavelength of the toroidal dipole mode of a split ring resonator paired structure according to one or more embodiments described herein. FIG. 11D is a graph of the simulated surface charge distribution at the resonant wavelength of the toroidal dipole mode of a split ring resonator paired structure according to one or more embodiments described herein. FIG. 11E is a graph of the simulated magnetic field strength enhancement at the resonant wavelength of the toroidal dipole mode of a split ring resonator paired structure according to one or more embodiments described herein. FIG. 11F is a graph of the simulated surface current at the resonant wavelength of the toroidal dipole mode of a split ring resonator paired structure according to one or more embodiments described herein.

The resonance of the toroidal dipole mode may generate a localized electromagnetic field enhancement that penetrates deep into the nonlinear material of the supporting substrate to induce generation of the harmonic signal. A combination of bulk and surface nonlinearity of the nonlinear material in the supporting substrate may generate a harmonic signal of incident light with frequency $\omega$ and wavelength $\lambda$. In one or more embodiments, the nonlinear material is a SHG material and generates a harmonic signal of frequency $2\omega$ and wavelength $\lambda/2$ which is emitted from the light-generating metasurface. In one or more embodiments, the nonlinear material is a THG material and generates a harmonic signal of frequency $3\omega$ and wavelength $\lambda/3$ which is emitted from the light-generating metasurface.

In one or more embodiments, the unit cell of the paired structure may support a mode that interacts or hybridizes with the toroidal dipole mode to generate a high-order multi-pole mode, for example a Fano resonance, anapole resonance, and/or a supercavity mode. The combined toroidal electromagnetic field and high-order electromagnetic field distribution may penetrate the supporting substrate to induce generation of the harmonic signal. The higher-order multi-pole mode may generate more intense and more strongly confined electromagnetic fields and electromagnetic field enhancements to more efficiently generate the harmonic signal. In one or more embodiments, a higher-order multi-pole mode may result from the interference of two scattering modes. In one or more embodiments, the two scattering modes may not include the toroidal dipole mode.

In one or more embodiments, incident light to excite the toroidal dipole mode is supplied by a pump or excitation laser. The incident light may be supplied by a Ti:Sapphire laser, dye-laser, gas laser, solid state laser, excimer laser, supercontinuum laser, or another suitable coherent light source or optical system to induce generation of the harmonic signal, but is not limited to these sources. The incident light may be supplied by an incoherent light source such as an incandescent bulb, light emitting diode, arc-lamp, or other suitable incoherent light source or optical system to less efficiently induce generation of the harmonic signal. In one or more embodiments, the wavelength of the incident light may coincide with the central wavelength of the toroidal dipole mode, but is not limited to any particular wavelength range.

In a non-limiting example, the incident light may be supplied by a mode locked, ultrafast Ti:Sapphire laser comprising a seed laser (e.g., Coherent Mira 900) with a repetition rate of 76 MHz, a center wavelength of 785 nm, and a temporal pulse width of 100.6 fs. The light generated by the metasurface may be passed through several UV bandpass filters and routed through a monochromator and detected with a photomultiplier tube (PMT) for spectral measurements, or directly detected by the PMT for power measurements.

Figure 12A:
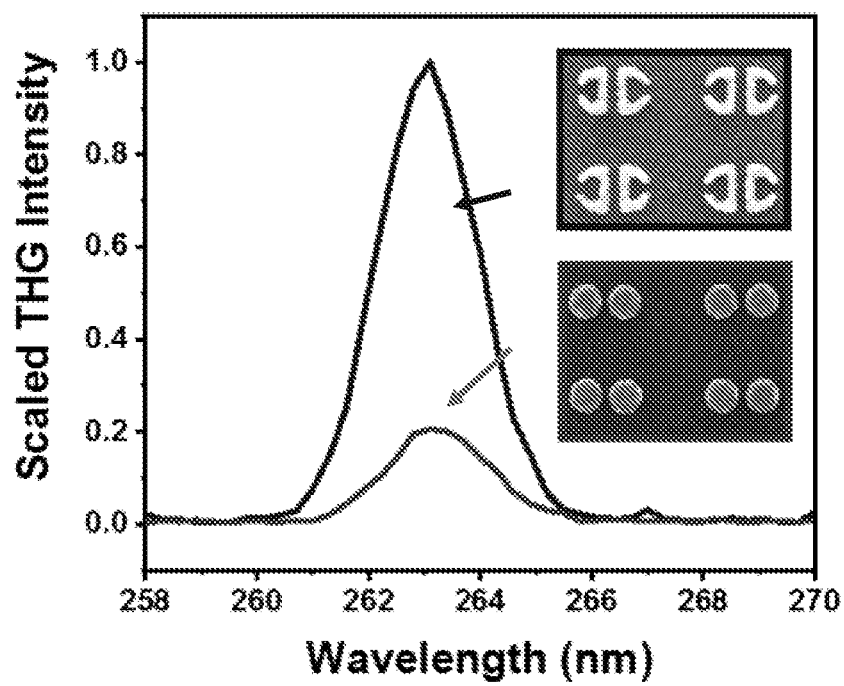
FIG. 12A is a graph comparing of the experimental scaled third harmonic generation intensity of to two examples in accordance with one or more embodiments.
Figure 12B:
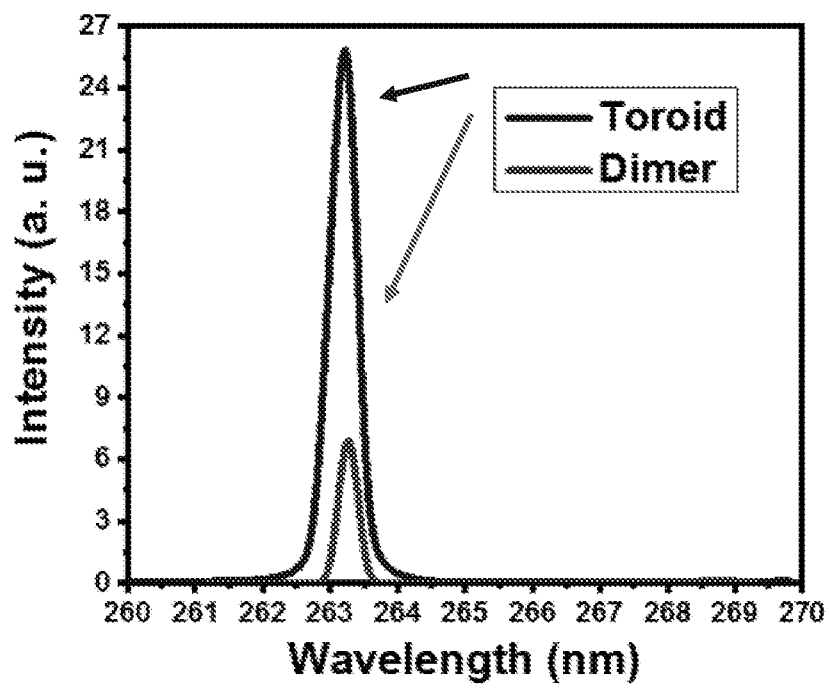
FIG. 12B is a graph comparing of the simulated third harmonic generation intensity of to two examples in accordance with one or more embodiments.

FIG. 12A is a graph comparing of the experimental scaled third harmonic generation intensity of two examples in accordance with one or more embodiments described herein. In one or more embodiments, a third harmonic signal is generated by a gold split-ring resonator paired structure disposed on an ITO supporting substrate. The third harmonic signal is a sharp peak centered near 263 nm, which is a nominally one third of the wavelength of the 785 nm incident laser beam. In an experimental comparison with a gold dimer paired structure (two gold discs separated by a gap) with the same resonant wavelength, the gold split-ring resonator paired structure generated approximately five times more signal with an equivalent amount of gold per area of the metasurface. FIG. 12B is a graph comparing of the simulated third harmonic generation intensity of a metasurface with a gold dimer paired structure and a metasurface with a gold split ring resonator paired structure. The simulated results show agreement with the experimental measurements.

Figure 12C:
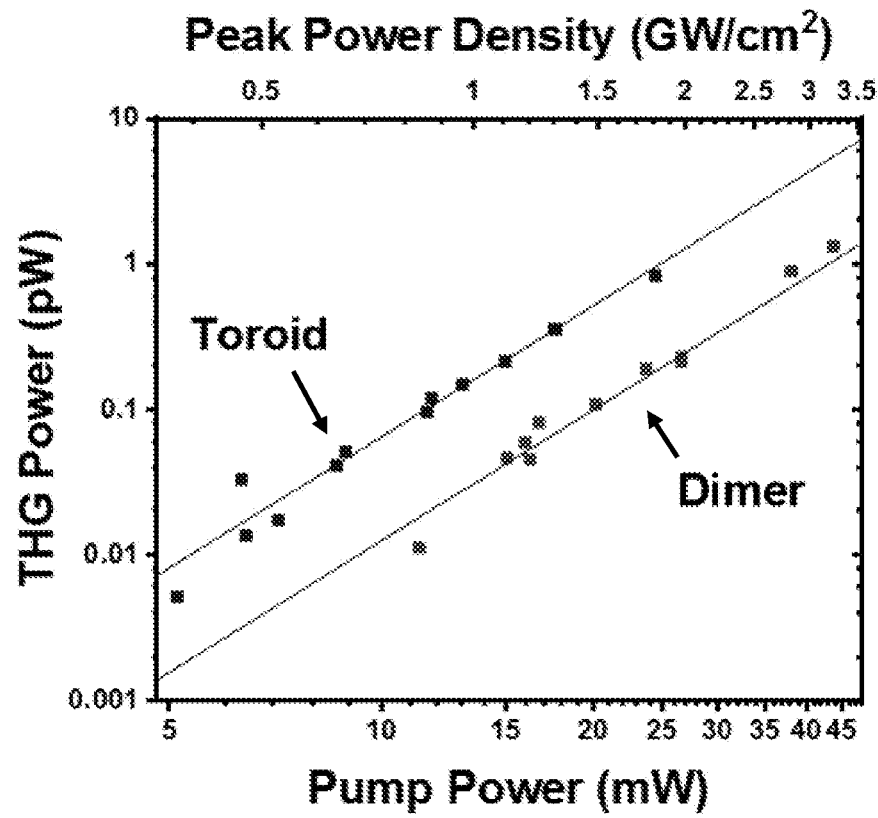
FIG. 12C is a graph of the third harmonic generation power versus the pump power of to two examples in accordance with one or more embodiments.

FIG. 12C is a graph of the third harmonic generation power versus the pump power according to two examples in accordance with one or more embodiments described herein. A log-log plot of the third harmonic signal power vs the pump power may be linear with a slope of 3. The log-log relationship is not required to be perfectly linear with a slope of 3 as defects and structural imperfections may cause heating, tuning, and other effects may cause the slope of the emission power law to slightly deviate from theoretical relationship (gray lines).

Figure 12D:
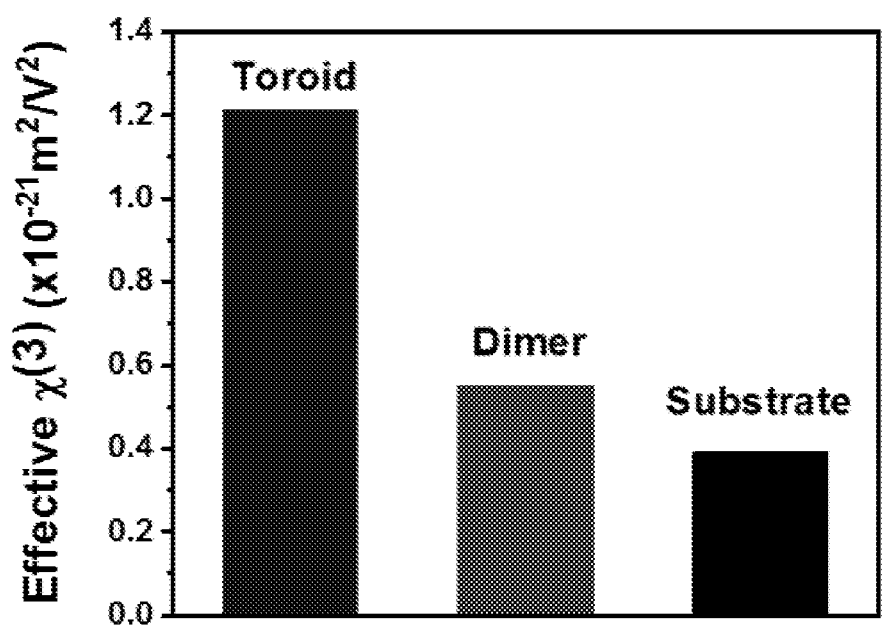
FIG. 12D is a graph of the measured effective third order susceptibilities of two examples in accordance with one or more embodiments and a comparative example of a supporting substrate with no paired structures.

FIG. 12D is a graph of the measured effective third order susceptibilities $\chi^{(3)}$ of a metasurface with a gold dimer paired structure, a metasurface with a gold split ring resonator paired structure in accordance with one or more embodiments described herein, and a bare supporting substrate of nonlinear material with no paired structure.

In one or more embodiments, the pattern of the plurality of paired structures controls an emission profile of the harmonic signal generated by the harmonic light-generating metasurface. In one or more embodiments, different periodicity of the plurality of paired structures along the x-axis and the y-axis may create different first order diffraction modes of the third harmonic signal along the x-axis and y-axis. Of course, the effect is not limited to rectilinear arrays with orthogonal coordinate axes.

In one or more embodiments, more sophisticated designs and arrangements of the plurality of structures may manipulate the energy distribution and radiation direction of the harmonic signal. In one or more embodiments, a supporting substrate with a near-zero absorption coefficient for the wavelength of the third harmonic signal may be used to effectively capture the harmonic signal that is emitted into the supporting substrate, in addition to the harmonic signal that is emitted away from the supporting substrate.

In one or more embodiments, the harmonic light-generating metasurface may be included in an optical system comprising a pump laser. The optical system may be used to generate an electromagnetic wavefront or complex radiation patterns for applications in nanopatterning, nanofabrication, or as a table-top third harmonic light source, but is not particularly limited to these applications.

In one or more embodiments, the harmonic light-generating metasurface may be included in an optical system comprising a pump laser and a spectrometer. The spectrometer may have a sensitive wavelength range comprising the VUV wavelength range, a broader UV wavelength range, a visible wavelength range, a near-infrared wavelength range, and/or an infrared wavelength range, but is not particularly limited to these ranges.

In one or more embodiments, the harmonic light-generating metasurface may be included in an optical system comprising a mirror, filter, lens, monochromator, photomultiplier tube, UV-sensitized detector, solid state detector, lock-in amplifier, optical chopper, or the like.

In one or more embodiments, the harmonic light-generating metasurface may be included in an optical system, wherein an ambient atmosphere around the system has access to a first optical path of the pump laser and a second optical path of the harmonic signal generated by the metasurface. The first optical path may be the space between the pump laser and harmonic light-generating metasurface. The second optical path may be the space between the harmonic light-generating metasurface and a housing of the system. In one or more embodiments, ambient atmosphere around the system may be excluded from the first and second optical paths by a sealed chamber or sealed vacuum chamber.

In another aspect, embodiments of the invention relate to a method of manufacturing a harmonic light-generating metasurface. The method may comprise: disposing a supporting substrate comprising a nonlinear material on a base substrate; and patterning a plurality of paired structures on a surface of the supporting substrate. Each paired structure, of the plurality of paired structures, may collectively support a toroidal dipole mode. An electromagnetic field enhancement of the toroidal dipole mode penetrates the supporting substrate to induce generation of a third harmonic signal by the supporting substrate.

In one or more embodiments, patterning the film comprises electron beam lithographic techniques. In a non-limiting example, a resist film (e.g., poly(methyl methacrylate) (e.g., 950 PMMA A2, Mircochem) is disposed on (e.g., spin coated) the surface of the supporting substrate and baked on a hot plate at 180° C. for 3 minutes. The plurality of paired structures are patterned using an electron beam microscope (e.g., FEI Quanta 650 SEM), for example with a Nanometer Pattern Generation System (NPGS) software (Nabity Lithography Systems). The beam voltage may be 30 kV, the beam current may be 40 pA, and the working distance may be 7 mm. The resist film may be developed into a mask with a developer (e.g., 1:3 methyl isobutyl ketone (MIBK)/isopropyl alcohol (IPA)) for 50 seconds. An adhesion layer (e.g., 2 nm thick titanium film) and a plasmonic material (e.g., 50 nm thick gold film) may be evaporated into and onto the mask, for example using electron beam evaporation. Lifting off the mask with a second developer (e.g., acetone) leaves the pattern of a plurality of paired structures of the plasmonic material directly on the surface of the supporting substrate. The temperatures, timing, beam voltages, beam currents, working distance, dimensions, film thicknesses, and solvents are not particularly limited to those described herein.

In one or more embodiments, an oxide layer is further disposed on the plurality of paired structures by atomic layer deposition (e.g., 50 nm thick alumina layer) and/or electron beam evaporation (e.g., 250 nm thick alumina layer). The oxide layer may be alumina or silica, but is not particularly limited to these materials or a particular thickness.

In one or more embodiments, a plurality of paired structures may be stamped directly onto the supporting substrate by a structured template stamp, embossed die, or the like. In one or more embodiments, the plurality of paired structures may be patterned by CMOS fabrication processes, laser nanofabrication, nanoimprinting, nanostencil lithography techniques, but is not particularly limited to these techniques.

Example Methods for Enhanced Third Harmonic Generation from a Gold Metasurface Excited at the Toroidal Resonance In one or more embodiments, designing the harmonic light-generating metasurface may be achieved as follows. The harmonic light-generating metasurface may comprise a multipixel metallic unit cell composed of symmetric resonators. The resonators may be deposited on a multilayer substrate may comprise of $SiO_2$ and ITO layers. By carrying out a set of simulations based on finite-difference time-domain (FDTD) and finite element method (FEM), the spectral response of the proposed meta-atom may be defined. The simulation results may show the excitation of strong toroidal dipole around the near-infrared region (NIR). By proving the nature of the induced mode as a toroidal resonance, the position of the toroidal moment may be tuned around the characterization laser wavelength to provide highly consistent results. To this end, the multipole decomposition spectra, cross-sectional vectorial magnetic-field board, and vectorial surface current map, shown in FIGS. 11B-11F, may be defined. Once the spectral response of the plasmonic nanostructure has been estimated, the nonlinear properties of the metasurface may be focused on. Using the nonlinear susceptibility of ITO and by launching a narrow beam correlating with the fundamental wavelength of the toroidal dipole, the excitation of third harmonic signal (THS) across the ultraviolet (UV) spectra may be shown. The following settings may be employed in numerical analyses: the spatial grid sizes may be set to 1.5 nm with the periodic boundary conditions to resemble a metasurface. In addition, a plane wave source with the normal incidence may be used to excite toroidal moment.

In one or more embodiments, fabrication of the harmonic light-generating metasurface may be accomplished in the following manner. The harmonic light-generating metasurface may be fabricated using electron beam lithography, as detailed below. All solvents may be commercially purchased (e.g., from Sigma-Aldrich) and used without further purification. ITO/glass substrates (e.g., from Ossila) may be rinsed with a solvent (e.g., acetone) while sonicating for a rinsing time (e.g., 5 min) and then may be rinsed with a solvent (e.g., isopropanol (IPA)) before use. The plasmonic nanostructures (e.g., gold split ring resonators) may be fabricated using e-beam lithography. The substrate may be spin-coated with poly(methyl methacrylate) (e.g., 950 PMMA A2, MicroChem), and may be baked on a hot plate at 180 C for 3 min. Subsequently, the nanostructures may be patterned using an electron beam microscope (e.g., FEI Quanta 650 SEM) with software (e.g., a Nanometer Pattern Generation System (NPGS) software). A beam voltage of 30 kV, a beam current of 40 pA, and a working distance of 7 mm may be used. Then the substrate may be developed in 1:3 methyl isobutyl ketone (MIBK)/IPA for a development time (e.g., 50 seconds). Following development, 2 nm of Titanium and 50 nm gold may be deposited using e-beam evaporation. Liftoff may be performed in a solvent (e.g. acetone) for 1 hr. Finally, the nanostructures may be coated using Atomic Layer Deposition (ALD) (e.g., 50 nm alumina layer) and may be followed by a second layer using e-beam evaporation (e.g. 250 nm alumina layer).

In one or more embodiments, optical measurements may be accomplished as follows. The linear transmission measurements may be performed using standard transmission microscopy techniques. For the nonlinear measurements an ultrafast laser system (e.g., Coherent Mira 900) may be used as an excitation source. The center wavelength position may be around 785 nm and the pulse repetition rate may be 75 MHz. The laser may be focused onto the sample with a spot size of about 177 µm2 (7.5 µm beam waist radius). The output signal may be passed through several UV bandpass filters and detected directly with a PMT (for the power measurements), or may be routed through a monochromator first (for the spectral measurements).

CONCLUSION

In summary, one or more embodiments of the present invention provides a novel harmonic light-generating metasurface that supports a toroidal dipole mode to strongly confine electromagnetic fields of incident radiation, produce intense electromagnetic field enhancements within a nonlinear material of a supporting substrate of the metasurface, and significantly increase harmonic signal generation. Furthermore, the metasurface may also manipulate the emission pattern of the generated harmonic signal for additional advantageous effects that cannot be achieved by a bare supporting substrate of nonlinear material or tradition nonlinear crystals. One or more embodiments of the present invention provides a method of manufacturing a novel harmonic light-generating metasurface that supports a toroidal dipole mode to strongly confine electromagnetic fields of incident radiation, produce intense electromagnetic field enhancements within a nonlinear material of a supporting substrate of the metasurface, and significantly increase harmonic signal generation.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A harmonic light-generating metasurface, comprising:
a base substrate;
a supporting substrate comprising a nonlinear material; and
a plurality of paired structures disposed in a pattern on a surface of the supporting substrate, wherein
each paired structure, of the plurality of paired structures, collectively supports a toroidal dipole mode, and
an electromagnetic field enhancement of the toroidal dipole mode penetrates the supporting substrate to induce generation of a harmonic signal by the supporting substrate.

2. The harmonic light-generating metasurface of claim 1, wherein the pattern controls an emission profile of the harmonic signal generated by the plurality of paired structures.

3. The harmonic light-generating metasurface of claim 1, wherein the pattern is rectilinear.

4. The harmonic light-generating metasurface of claim 1, wherein the pattern is polar and comprises polar coordinate axes.

5. The harmonic light-generating metasurface of claim 1, wherein the nonlinear material is a wide-bandgap semiconductor.

6. The harmonic light-generating metasurface of claim 5, wherein the wide-bandgap semiconductor is indium tin oxide (ITO).

7. The harmonic light-generating metasurface of claim 1, wherein the plurality of paired structures comprise a plasmonic material.

8. The harmonic light-generating metasurface of claim 1, wherein the plurality of paired structures are covered by an oxide film disposed on the surface of the supporting substrate.

9. The harmonic light-generating metasurface of claim 1, wherein
the toroidal dipole mode interacts with a second mode of the structure to generate a higher-order multi-pole mode, and
the combined toroidal dipole mode electromagnetic fields and high-order multi-pole mode electromagnetic fields penetrate the supporting substrate to induce generation of the harmonic signal.

10. A harmonic light-generating optical system, comprising:
a pump laser; and
the harmonic light-generating metasurface of claim 1.

11. The harmonic light-generating optical system according to claim 10, wherein an ambient atmosphere of the system has access to a first optical path of the pump laser and a second optical path of a harmonic signal generated by the harmonic light-generating metasurface.

12. A method of manufacturing a harmonic light-generating metasurface, the method comprising:
disposing a supporting substrate comprising a nonlinear material on a base substrate; and
patterning a plurality of paired structures on a surface of the supporting substrate, wherein
each paired structure, of the plurality of paired structures, collectively supports a toroidal dipole mode, and
an electromagnetic field enhancement of the toroidal dipole mode penetrates the supporting substrate to induce generation of a harmonic signal by the supporting substrate.

13. The method according to claim 12, wherein patterning the plurality of paired structures comprises:
disposing a resist film on the surface of the supporting substrate;
pattering the resist film using electron beam lithography;
developing the resist film into a mask with a developer;
disposing a plasmonic material into and onto the mask;
lifting-off the mask with a second developer to leave the pattern of a plurality of paired structures of the plasmonic material directly on the surface of the supporting substrate.

14. The method according to claim 12, wherein patterning the film comprises stamping the plurality of paired structure onto the surface of the supporting substrate.

15. The method according to claim 12, wherein the pattern of the plurality of paired structures controls an emission profile of the harmonic signal.

16. The method according to claim 12, further comprising disposing an oxide film on the surface of the supporting substrate to cover the plurality of paired structures.

17. The method according to claim 12, wherein
   the toroidal dipole mode interacts with a second mode of the structure to generate a higher-order multi-pole resonance, and
   the combined toroidal dipole mode electromagnetic fields and high-order multi-pole electromagnetic fields penetrate the supporting substrate to induce generation of the third harmonic signal by the supporting substrate.

18. The method according to claim 12, wherein the nonlinear material is a wide-bandgap semiconductor.

19. The method according to claim 18, wherein the wide-bandgap semiconductor is indium tin oxide (ITO).

20. The method according to claim 12, wherein the plurality of paired structures comprise a plasmonic material.

* * * * *